(12) United States Patent
Fujita

(10) Patent No.: US 12,097,426 B2
(45) Date of Patent: Sep. 24, 2024

(54) GAME APPARATUS, GAME SYSTEM, RECORDING MEDIUM, AND GAME CONTROL METHOD

(71) Applicant: Konami Digital Entertainment Co., Ltd., Tokyo (JP)

(72) Inventor: Junichi Fujita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 393 days.

(21) Appl. No.: 17/471,910

(22) Filed: Sep. 10, 2021

(65) Prior Publication Data

US 2021/0402295 A1 Dec. 30, 2021

Related U.S. Application Data

(63) Continuation of application No. PCT/JP2020/006848, filed on Feb. 20, 2020.

(30) Foreign Application Priority Data

Mar. 12, 2019 (JP) .................................. 2019-044707

(51) Int. Cl.
*A63F 13/00* (2014.01)
*A63F 13/358* (2014.01)
(Continued)

(52) U.S. Cl.
CPC ............ *A63F 13/358* (2014.09); *A63F 13/45* (2014.09); *A63F 13/525* (2014.09); *A63F 13/55* (2014.09);
(Continued)

(58) Field of Classification Search
CPC .. G07F 17/3276; G07F 17/3262; A63F 13/30; A63F 13/45; A63F 13/00
See application file for complete search history.

(56) References Cited

U.S. PATENT DOCUMENTS

2003/0022707 A1\* 1/2003 Namba .................... A63F 13/80
463/3
2009/0029753 A1\* 1/2009 Ito .......................... A63F 13/10
463/3

FOREIGN PATENT DOCUMENTS

JP     2006-263069 A    10/2006
JP      2019-13783 A     1/2019
KR  10-2010-0005228 A    1/2010

OTHER PUBLICATIONS

Japanese Office Action dated Jan. 31, 2023 in Japanese Application No. 2020-040032.

(Continued)

*Primary Examiner* — David L Lewis
*Assistant Examiner* — Eric M Thomas
(74) *Attorney, Agent, or Firm* — Sughrue Mion, PLLC

(57) ABSTRACT

A game apparatus acquires first input operation information of a user, receives second input operation information of another user of another game apparatus, stores the acquired first input operation information in the first memory area, stores the received second input operation information in the second memory area, progress the game, based on information stored in the first memory area and information stored in the second memory area, executes an initialization process, in an initialization period, progresses the game, in a first period after the initialization period, based on: the first input operation information stored in the first memory area, and initial information stored in the second memory area; and progresses the game, in a second period after the first period, based on: the first input operation information stored in the first memory area, and the second input operation information stored in the second memory area.

12 Claims, 25 Drawing Sheets

(51) Int. Cl.
 *A63F 13/45* (2014.01)
 *A63F 13/525* (2014.01)
 *A63F 13/55* (2014.01)
 *A63F 13/69* (2014.01)
 *A63F 13/77* (2014.01)
 *A63F 13/812* (2014.01)

(52) U.S. Cl.
 CPC .............. *A63F 13/69* (2014.09); *A63F 13/77* (2014.09); *A63F 13/812* (2014.09)

(56) References Cited

OTHER PUBLICATIONS

International Search Report dated Mar. 17, 2020 in Application No. PCT/JP2020/006848.
Written Opinion of the International Searching Authority dated Mar. 17, 2020 in Application No. PCT/JP2020/006848.
Communication dated Dec. 10, 2019 from the Japanese Patent Office in Application No. 2019-044707.
Communication dated Aug. 25, 2020 from the Taiwanese Patent Office in Application No. 109107580.
Korean Office Action dated Jun. 26, 2023 in Korean Application No. 10-2021-7032288.

* cited by examiner

GAME APPARATUS, GAME SYSTEM, RECORDING MEDIUM, AND GAME CONTROL METHOD

CROSS REFERENCE TO RELATED APPLICATIONS

This Application is a Continuation Application of PCT Application No. PCT/JP2020/006848, filed on Feb. 20, 2020, and is based on and claims priority from Japanese Patent Application No. 2019-044707 filed on Mar. 12, 2019, the entire contents of each of which are incorporated herein by reference.

BACKGROUND

Field of the Invention

The present invention relates to game apparatuses, game systems, recording media, and game control methods.

Description of Related Art

An online baseball game is known which is an online competitive game is using two game apparatuses communicable with each other, in which a ball object thrown by a pitcher character operated in one game apparatus is hit by a batter character operated in another game apparatus (e.g., Japanese Patent Application Laid-Open Publication No. 2006-263069).

In an online competitive game, in some cases, the game is progressed based on (i) content of an input operation made by a user of one game apparatus between two game apparatuses, and (ii) content of an input operation made by another user of another game apparatus. In this case, in one example, even when an input operation made by a user of one of the two game apparatus is executed, this game apparatus does not progress the game until the game apparatus receives input operation information representative of content of an input operation made by the other user of the other game apparatus. Accordingly, the conventional technique has a drawback in that for the one game apparatus, a time lag occurs between an input operation made by the user and game progress, which impairs real-time characteristics of the game.

SUMMARY

The present invention is made in consideration of the above-mentioned circumstances, and it has an object to provide a technique that enables superior real-time performance in either of the two game apparatuses that execute an online competitive game, as compared to conventional game apparatuses.

To achieve the stated object, a game apparatus according to an aspect of the present invention is a game apparatus for executing a game, including: at least one memory configured to store instructions, and that includes a first memory area and a second memory area; and at least one processor configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; execute an initialization process for storing, in the second memory area, one or more pieces of initial information independent from an input operation of either the user of the game apparatus or the other user of the other game apparatus, in an initialization period; progress the game, in a first period after the initialization period, based on: the first input operation information stored in the first memory area, and any one of the one or more pieces of initial information stored in the second memory area; and progress the game, in a second period after the first period, based on: the first input operation information stored in the first memory area, and the second input operation information stored in the second memory area.

A game apparatus according to another aspect of the present invention is a game apparatus for executing a game, including: at least one memory configured to store instructions, and that includes a first memory area and a second memory area; and at least one processor configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; execute an initialization process for storing, in the first memory area, one or more pieces of initial information independent from an input operation of either the user of the game apparatus or the other user of the other game apparatus, in an initialization period; progress the game, in a first period after the initialization period, based on: any one of the one or more pieces of initial information stored in the first memory area, and the second input operation information stored in the second memory area; and progress the game, in a second period after the first period, based on: the first input operation information stored in the first memory area, and the second input operation information stored in the second memory area.

A game apparatus according to another aspect of the present invention is a game apparatus for executing a game, including: at least one memory configured to store instructions, and that includes a first memory area and a second memory area; and at least one processor configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; and execute an initialization process for storing, in either the first memory or the second memory area, one or more pieces of initial information independent from an input operation of either the user of the game apparatus or the other user of the other game apparatus, in an initialization period, when the initial information is stored in the second memory area in the initialization period, the at least one processor is configured to: progress the game, in a first period after the initialization period, based on: the first input operation information stored in the first memory area, and any one of the one or more pieces of initial information stored in the second memory area, and progress the game, in a second period after the first period, based on: the first input operation information stored in the first memory area, and the second input operation information stored in the second memory area, when the one or more pieces of initial information are stored in the first memory area in the initialization period, the at least one processor is further configured to: progress the game, in the first period, based on: any one of the one or more pieces of initial information stored in the first memory area, and the second input operation information stored in the second memory area, and progress the game, in the second period, based on: the first input operation information stored in the first memory area, and the second input operation information stored in the second memory area.

A recording medium according to an aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the second memory area, one or more pieces of initial information independent from an input operation of either the user of the game apparatus or the other user of the other game apparatus, in an initialization period; progressing the game, in a first period after the initialization period, based on: the first input operation information stored in the first memory area, and any one of the one or more pieces of initial information stored in the second memory area; and progressing the game, in a second period after the first period, based on: the first input operation information stored in the first memory area, and the second input operation information stored in the second memory area.

A recording medium according to another aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the first memory area, one or more pieces of initial information independent from an input operation of either the user of the game apparatus or the other user of the other game apparatus, in an initialization period; progressing the game, in a first period after the initialization period, based on: any one of the one or more pieces of initial information stored in the first memory area, and the second input operation information stored in the second memory area; and progressing the game, in a second period after the first period, based on: the first input operation information stored in the first memory area, and the second input operation information stored in the second memory area.

A recording medium according to another aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; and executing an initialization process for storing, in either the first memory or the second memory area, one or more pieces of initial information independent from an input operation of either the user of the game apparatus or the other user of the other game apparatus, in an initialization period, when the initial information is stored in the second memory area in the initialization period, progressing the game, in a first period after the initialization period, based on: the first input operation information stored in the first memory area, and any one of the one or more pieces of initial information stored in the second memory area, and progressing the game, in a second period after the first period, based on: the first input operation information stored in the first memory area, and the second input operation information stored in the second memory area, when the one or more pieces of initial information are stored in the first memory area in the initialization period, progressing the game, in the first period, based on: any one of the one or more pieces of initial information stored in the first memory area, and the second input operation information stored in the second memory area, and progressing the game, in the second period, based on: the first input operation information stored in the first memory area, and the second input operation information stored in the second memory area.

A game system according to an aspect of the present invention is a game system including: a first game apparatus; and a second game apparatus, in which: the first game apparatus and the second apparatus are communicable with each other cooperatively execute a game, the first game apparatus includes: at least one first memory configured to store first instructions, and that includes a first memory area and a second memory area; and at least one first processor configured to implement the first instructions to: acquire first input operation information representative of content of an input operation made by a first user of the first game apparatus; receive second input operation information representative of content of an input operation made by a second user of the second game apparatus; store the acquired first input operation information in the first memory area; store the received second input operation information in the second memory area; progress the game, based on information stored in the first memory area and information stored in the second memory area; execute a first initialization process for storing, in the second memory area, one or more pieces of initial information independent from an input operation of either the first user of the first game apparatus or the second user of the second game apparatus, in a first initialization period; progress the game, in a first period after the first initialization period, based on: the first input operation information stored in the first memory area, and any one of the one or more pieces of initial information stored in the second memory area; and progress the game, in a second period after the first period, based on: the first input operation information stored in the first memory area, and the second input operation information stored in the second memory area, the second game apparatus includes: at least one second memory configured to store second instructions, and that includes a third memory area and a fourth memory area; and at least one second processor configured to implement the second instructions to: acquire the second input operation information representative of content of the input operation made by the second user of the second game apparatus; receive the first input operation information representative of content of the input operation made by the first user of the first game apparatus; store the acquired second input operation information in the third memory area; store the received first input operation information in the fourth memory area; progress the game, based on information stored in the third memory area and information stored in the fourth memory area; execute a second initialization process for storing, in the third memory area, one or more pieces of initial information independent from an input operation of either the first user of the first game apparatus or the second user of the second game apparatus, in a second initialization period; progress the game, in a third period after the second initialization period, based on: any one of the one or more pieces of initial information stored in the third memory area, and the first input operation information stored in the fourth memory area; and progress the game, in a fourth period after the third period, based on: the second input operation information stored in the third memory area, and the first input operation information stored in the fourth memory area, and a number of pieces of initial information stored in the third memory area is identical to that stored in the second memory area.

A game apparatus according to another aspect of the present invention is a game apparatus for executing a game, including: at least one memory configured to store instructions, and that includes a buffer area; and at least one processor configured to implement the instructions to: acquire first input operation information representative of content of an input operation made by a user of the game apparatus; receive second input operation information representative of content of an input operation made by another user of another game apparatus for executing the game; initialize a state of the buffer area, and store the first input operation information and the second input operation information in the buffer area; progress the game α times (the α is a natural number that is one or more), based on either the first input operation information or the second input operation information, after the state of the buffer area is initialized; and progress the game, based on the first input operation information and the second input operation information, after the game is progressed only the α times.

A game control method according to an aspect of the present invention is a game control method, implemented by a processor included in a game apparatus for executing a game, including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the second memory area, one or more pieces of initial information independent from an input operation of either the user of the game apparatus or the other user of the other game apparatus, in an initialization period; progressing the game, in a first period after the initialization period, based on: the first input operation information stored in the first memory area, and any one of the one or more pieces of initial information stored in the second memory area; and progressing the game, in a second period after the first period, based on: the first input operation information stored in the first memory area, and the second input operation information stored in the second memory area.

A game control method according to another aspect of the present invention is a game control method, implemented by a processor included in a game apparatus for executing a game, including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the first memory area, one or more pieces of initial information independent from an input operation of either the user of the game apparatus or the other user of the other game apparatus, in an initialization period; progressing the game, in a first period after the initialization period, based on: any one of the one or more pieces of initial information stored in the first memory area, and the second input operation information stored in the second memory area; and progressing the game, in a second period after the first period, based on: the first input operation information stored in the first memory area, and the second input operation information stored in the second memory area.

MODES FOR CARRYING OUT THE INVENTION

Description will be given of modes for carrying out the present invention below with reference to drawings. In each Figure, the dimensions and scale of each part differ from the actual as appropriate.

Since the embodiments to be described below are preferred specific examples of the present invention, various types of technically preferable limits are given. However, the scope of the present invention is not limited to these modes unless otherwise specified in the following description.

1. First Embodiment

Figure 1:
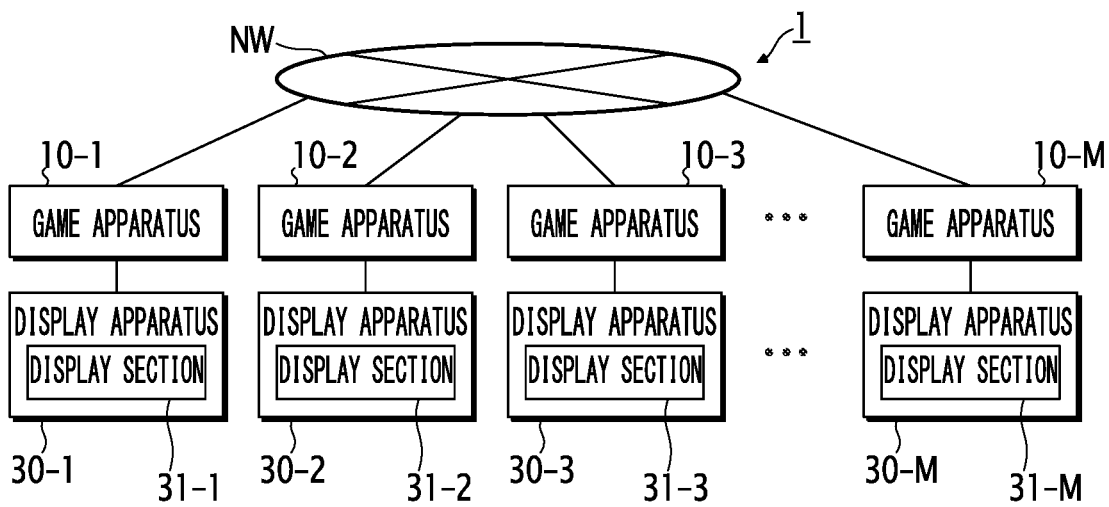
FIG. 1 is an explanatory diagram of an example overview of a game system 1 according to first embodiment of the present invention.

Description will be given of first embodiment of the present invention.
1.1. Overview of Game System FIG. 1 is an explanatory diagram of an overview of a game system 1 according to the first embodiment of the present invention. Hereafter, description will be given of the overview of the game system 1 according to the first embodiment with reference to FIG. 1.

The game system 1 includes game apparatuses 10 (10-1 to 10-M) executable for a competitive game, and display apparatuses 30 (30-1 to 30-M) provided for the respective game apparatuses 10 (10-1 to 10-M). The M is a natural number of two or more. Hereafter, the m-th game apparatus 10 from among the game apparatuses 10-1 to 10-M is occasionally referred to as a game apparatus 10-$m$ ($m$ is a natural number satisfying $1 \leq m \leq M$). Similarly, the m-th display apparatus 30 from among the display apparatuses 30-1 to 30-M is occasionally referred to as a display apparatus 30-$m$.

In this embodiment, an example case will be given in which the game apparatuses 10 are home-use game devices. However, any information processing apparatuses can be employed as the game apparatuses 10. In one example, the game apparatuses 10 may be commercial-use game apparatuses installed in a store, an amusement facility, etc., or may be mobile apparatuses, such as cell phones or smartphones, or may be terminal-type information apparatuses, such as personal computers.

The game apparatus 10-$m$ is communicable with the display apparatus 30-$m$ provided for the game apparatus 10-$m$. The game apparatus 10-$m$ can display images related to the competitive game being executed in the game apparatus 10-$m$ on a display section 31-$m$ included in the display apparatus 30-$m$ corresponding to the game apparatus 10-$m$. Examples of the display apparatuses 30 include a liquid crystal display, a television receiver, and a touch panel. The display apparatuses 30 may be Head Mounted Displays (HMDs). The display apparatuses 30 may be included in the respective game apparatuses 10.

From among game apparatuses 10-1 to 10-M, a game apparatus 10 (e.g., a game apparatus 10-1) is communicable with other game apparatuses 10 (e.g., a game apparatus 10-2) via a network NW. Specifically, the game apparatus 10-1 transmits, to the game apparatus 10-2, information on the competitive game being played on the game apparatus 10-1. In contrast, the game apparatus 10-2 transmits, to the game apparatus 10-1, information on the competitive game being played on the game apparatus 10-2. This enables information on the competitive game being played on each game apparatus 10-$m$ to be shared among the game apparatuses 10-1 to 10-M. This sharing of the information allows the users of the game apparatuses 10-1 and 10-2 to play against each other in a competitive game, or to cooperate with each other in a competitive game to complete a mission and the like. In this embodiment, description will be given of a case in which the users of the game apparatuses 10-1 and 10-2 play against each other in the competitive game.

In this embodiment, in one example, an example case is given in which the game apparatuses 10 execute the competitive game while communicating with each other via the network NW. However, the present invention is not limited to this aspect. In one example, the game apparatuses 10 may be directly communicable with other game apparatuses 10 by use of short-range wireless communication, such as infrared communication or Bluetooth (registered trademark) without going through the network NW. Alternatively, the game apparatuses 10 may be directly wired to other game apparatuses to communicate. Furthermore, the game system 1 may include a server apparatus that controls communication among the game apparatuses 10. In this case, the game apparatuses 10 may be communicable via the server apparatus. Furthermore, each game apparatus 10 may execute the competitive game independently from other game apparatuses 10 without communication. In this case, the user of each game apparatus 10 is able to play the competitive game independently.

In this embodiment, description is given of an example case in which each game apparatus 10 is operated by a single user. However, the present invention is not limited to this aspect. By a single game apparatus 10 being operated by multiple users, these users who operate this single game apparatus 10 may play against each other (or cooperate with each other).

In this embodiment, in one example, the "competitive game executed in the game apparatuses 10" refers to a game in which a competition corresponding to a competitive game is carried out by one player and other players. Here, the "virtual space" refers to a space in which a virtual object or other similar objects related to the competitive game exists. The "virtual object related to the competitive game" is an example of "game element," and it may be a concept including a character related to the competitive game and an object related to the competitive game. Furthermore, the "game element" is not limited to the "virtual object existing in the virtual space," and it may be a "virtual camera that captures images of the virtual space. In one example, the "game element" may be a virtual camera that captures images of the virtual space from the viewpoint of a pilot in a flight simulator, or may be a virtual camera that captures images of the virtual space from the viewpoint of a main character in a survival game.

The "competition corresponding to a competitive game" may be a competition in which an action of one player is prevented by other players, who are opponents of the one player. The "competition in which an action of one player is prevented by other players, who are opponents of the one player" relates to common ball games, examples of which include baseball, softball, cricket, soccer, basketball, tennis, table tennis, and volleyball. In baseball, examples of the "action of one player" include a pitch, a hit, stealing a base and a defense. In soccer and basketball, examples of the "action of one player" include dribbling, passing, and shooting. In tennis, table tennis, volleyball and other similar sports, examples of the "action of one player" include sending a ball to the opponent's court so that it is not returned.

In other words, the competitive game executed on the game apparatuses 10 is a ball game, such as a baseball game, a softball game, a cricket game, a soccer game, a basketball games, a tennis game, a table tennis game, and a volleyball game. In this embodiment, description will be given of a case in which a baseball game is applied to the competitive game played on the game apparatuses 10-1 and 10-2.

1.2. Overview of Baseball Game

Description of overview will be given of the baseball game played on the game apparatuses 10 with reference to FIG. 2.

Figure 2:
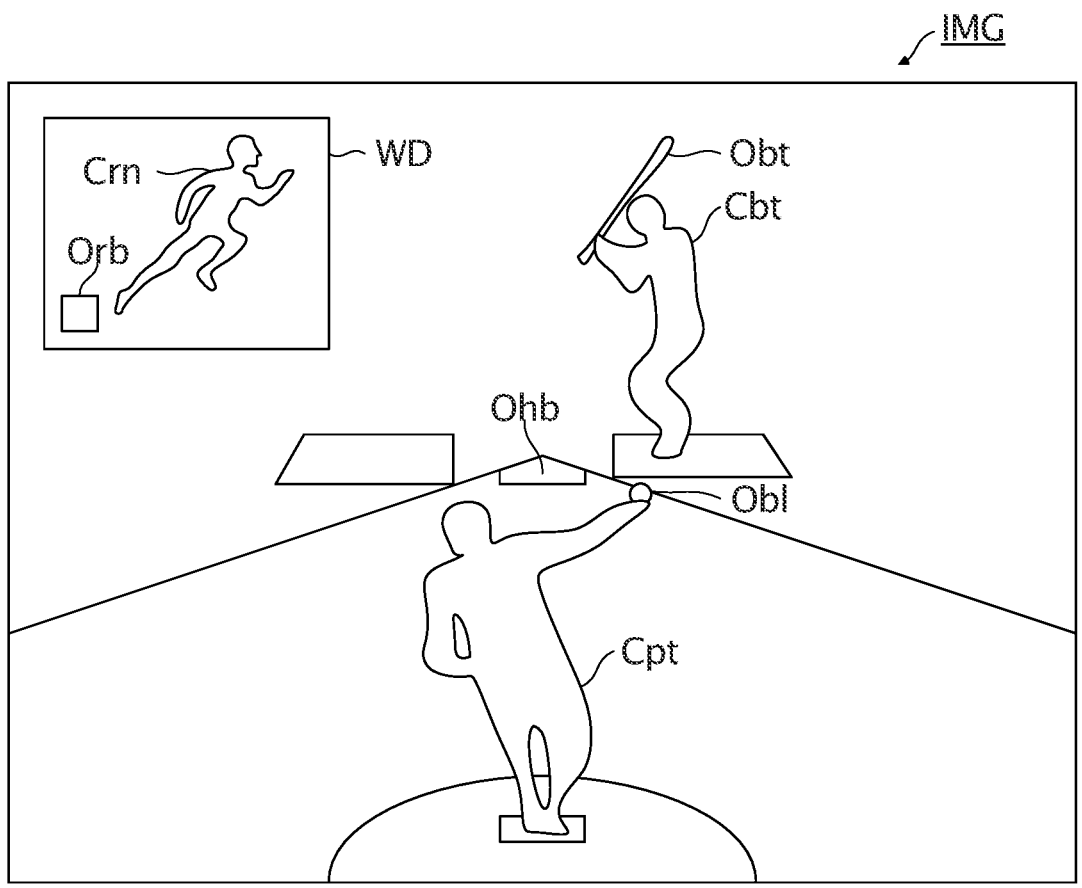
FIG. 2 is an explanatory diagram of an example image IMG displayed on a display section 31.

FIG. 2 is an explanatory diagram of an example image IMG displayed on the display section 31. In one example, in the baseball game, an image IMG captured of the virtual space in which a baseball field is virtually realized is displayed on the display section 31. Specifically, there exists the following in the virtual space: a pitcher character Cpt corresponding to a pitcher; a batter character Cbt corresponding to a batter; a ball object Ob1 corresponding to a ball; a baseball bat object Obt corresponding to a baseball bat; a home base object Ohb corresponding to a home base, etc.

In one example, the image IMG shown in FIG. 2 is an image from a virtual camera (viewpoint) provided behind (on the side of the back of the head) the pitcher character Cpt, and is displayed on the display section 31 corresponding to the game apparatus 10 used for controlling the pitcher character Cpt. In one example, a window WD is displayed when there exists a runner character Crn corresponding to a runner. In addition to the runner character Crn, a base object Orb corresponding to a base, such as first base, may be displayed in the window WD. The following is an example of the "virtual object related to the competitive game" described with reference with FIG. 1: the pitcher character Cpt; the batter character Cbt; the runner character Crn; the ball object Ob1; the baseball bat object Obt; the home base object Ohb; the base object Orb, etc. In FIG. 2, a catcher character corresponding to a catcher and an umpire character corresponding to an umpire, etc. are omitted for the sake of clarity. In one example, an image from a virtual camera (a viewpoint) behind the batter character Cbt (at the side of the back of the head) is displayed on the display section 31 corresponding to the game apparatus 10 used for controlling the batter character Cbt (not shown in the drawings).

In the baseball game of this embodiment, a pitch is executed by the pitcher character Cpt, and a hit is executed by the batter character Cbt. A stolen base is executed by the runner character Crn. The users of the game apparatuses 10-1 and 10-2 carry out the following (i) and (ii) one after the other: (i) a defense input operation for operating a defense character corresponding a defense player; and (ii) an offense input operation for operating an offense character corresponding to an offense player. It is of note that the defense character includes the pitcher character Cpt, the catcher character, etc., and the offense character includes the batter character Cbt, the runner character Crn, etc.

In one example, when the user of the game apparatus 10-1 carries out an offense input operation, the other user of the other game apparatus 10-2 carries out a defense input operation. In this case, in one example, the user of the game apparatus 10-1 may use this game apparatus 10-1 to input a stolen base instruction to make the runner character Crn steal a base. Furthermore, the user of the game apparatus 10-2 may use this game apparatus 10-2 to input an input operation to prevent stealing a base. In addition, the user may use the game apparatus 10-2 to input a pitch instruction to make the pitcher character Cpt pitch. When offense is changed to defense, and as a result, the user of the game apparatus 10-2 carries out the offense input operation, the other user of the other game apparatus 10-1 carries out the defense input operation.

1.3. Configuration of Game Apparatus

Description will now be given of configuration of each of the game apparatuses 10 with reference to FIGS. 3 and 4.

Figure 3:
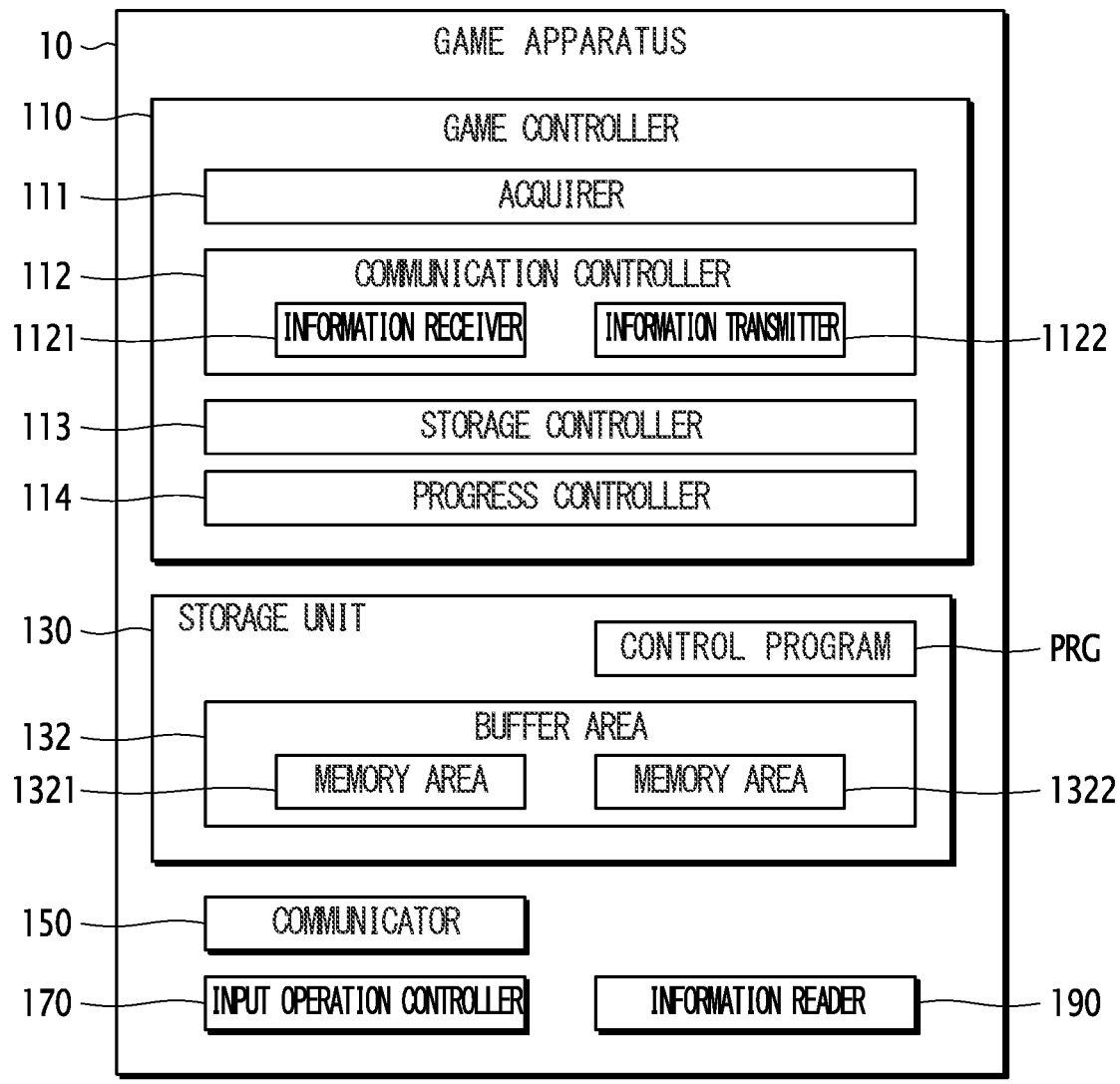
FIG. 3 is a functional block diagram showing an example configuration of each game apparatus 10.

FIG. 3 is a functional block diagram showing an example configuration of each of the game apparatuses 10. Each game apparatus 10 includes a game controller 110, a storage unit 130 for storing various information, a communicator 150 for communicating with external apparatuses, such as other game apparatuses 10, an input operation controller 170, such as a game controller for inputting input operation information by the user of the game apparatus 10, and an information reader 190 for reading information from a recording medium, such as an optical disk. The communicator 150 outputs, to the display apparatus 30, image data of an image IMG to be displayed on the display section 31.

The game controller 110 controls each part of the game apparatus 10. Furthermore, the game controller 110 controls progress of a competitive game, such as a baseball game, executed in the game apparatus 10. In one example, the game controller 110 includes an acquirer 111, a communication controller 112, a storage controller 113, and a progress controller 114.

Hereinafter, a game apparatus 10 used for controlling one or both of the runner character Crn and the batter character Cbt is occasionally referred to as an "offensive game apparatus 10." A game apparatus 10 used for controlling the pitcher character Cpt is occasionally referred to as a "defensive game apparatus 10."

In one example, a case is given in which the game apparatus 10-1 is used for controlling the runner character Crn and the game apparatus 10-2 is used for controlling the pitcher character Cpt. In this case, the game apparatus 10-1 is occasionally referred to as the "offensive game apparatus 10," and the game apparatus 10-2 is occasionally referred to as the "defensive game apparatus 10."

The acquirer 111 acquires input operation information (an example of "first input operation information") representative of content of an input operation made by the user of the game apparatus 10. In one example, when the user of the game apparatus 10 operates the input operation controller 170, the acquirer 111 acquires input operation information representative of the content of the input operation. In other words, the acquirer 111 receives an input operation by the user of the game apparatus 10 via the input operation controller 170. In one example, the acquirer 111 of the offensive game apparatus 10 receives the following (i) and (ii) via the input operation controller 170: (i) an input operation for making the runner character Crn steal a base (hereinafter, occasionally referred to as a "stolen base instruction"); and (ii) an input operation for making the batter character Cbt hit the ball object Ob1 (hereinafter, occasionally referred to as a "hit instruction"), etc. Furthermore, the acquirer 111 of the defensive game apparatus 10 receives, via the input operation controller 170, an input operation for making the pitcher character Cpt perform a pitch (hereinafter, occasionally referred to as a "pitch instruction").

The "input operation information representative of content of an input operation" may be information representative of an input operation made by the user to the input operation controller 170, such as a game controller, or may be information representative of process assigned to the input operation made by the user.

In one example, in a case in which the user presses one operation button from among operation buttons provided on the input operation controller 170, the "information representative of an input operation" may be information for identifying one operation button from among the operation buttons. Alternatively, in one example, in a case in which the input operation made by the user is to select one of choices listed in a menu, the "information representative of an input operation" may be information for identifying one of choices listed in a menu. Specifically, in a case in which the input operation made by the user is to select a choice "B" from among choices "A", "B", and "C" listed in a menu, the "information representative of an input operation" may be information representative of the selection of the choice "B."

Furthermore, in one example, in a case in which a press of an operation button is assigned to an instruction to move the character upward in the game, and in this state the user presses one operation button, the "information representative of process assigned to an input operation" may be information representative of an instruction to move the character upward.

In one example, the communication controller 112 includes an information receiver 1121 that receives information from other game apparatuses 10 via the communicator 150, and an information transmitter 1122 that transmits information to other game apparatuses 10 via the communicator 150. Specifically, the information receiver 1121 receives, via the communicator 150, input operation information (an example of "second input operation information") representative of content of an input operation made by another user of another game apparatus 10 which executes the game. In addition, the information transmitter 1122 transmits, via the communicator 150, the input operation information (an example of "first input operation information") acquired by the acquirer 111 to another game apparatus 10.

Here, in the game system 1 in which two game apparatuses 10 cooperatively execute a game, for example, when attention is focused on one of the two, the other one corresponds to "the other game apparatus 10 for executing the game." In one example, the information receiver 1121 of the offensive game apparatus 10 receives, via the communicator 150, input operation information representative of content of an input operation made by a user of the defensive game apparatus 10. Similarly, the information receiver 1121 of the defensive game apparatus 10 receives, via the communicator 150, input operation information representative of content of an input operation made by a user of the offensive game apparatus 10. Hereinafter, input operation information representative of content of an input operation made by the other user of the other game apparatus 10 is occasionally referred to as an "input operation information of the other game apparatus 10."

The storage controller 113 stores, in a memory area 1321 described below, the input operation information acquired by the acquirer 111, and stores, in a memory area 1322, the input operation information received by the communication controller 112. Furthermore, the storage controller 113 executes an initialization process in an initialization period. The initialization process is a process for storing, in either the memory areas 1321 or 1322, one or more pieces of initial information independent from an input operation of either (i) the user of the defensive game apparatus 10 or (ii) the user of the offensive game apparatus 10. In one example, the "initialization period" may be a period before the game progress is started by the progress controller 114, which is described below.

The progress controller 114 progresses the game, based on the information stored in the memory area 1321 and the information stored in the memory area 1322. In one example, a case is given in which the initial information is stored in the memory area 1322 in the initialization period. In this case, in a first period after the initialization period, the progress controller 114 progresses the game, based on the input operation information stored in the memory area 1321 and the initial information stored in the memory area 1322. In contrast, a case is given in which the initial information is stored in the memory area 1321 in the initialization period. In this case, in the first period, the progress controller 114 progresses the game, based on the initial information stored in the memory area 1321 and the input operation information stored in the memory area 1322.

Then, in a second period after the first period, the progress controller 114 progresses the game, based on the input operation information stored in the memory area 1321 and the input operation information stored in the memory area 1322. In other words, the progress controller 114 progresses the game, based on a set of (i) the input operation information acquired by the acquirer 111 and (ii) the input operation information (input operation information of the other game apparatus 10) received by the information receiver 1121.

Here, "progressing a game" is an aspect of updating a game situation in synchronization with an update timing that arrives periodically or regularly.

The "updating a game situation" may be a concept including "changing the game situation," and "maintaining the game situation without any change."

In one example, "changing a game situation" corresponds to "progressing a game."

In one example, the "update timing" may be a timing of updating an image IMG displayed on the display section 31 of the display apparatus 30. In this case, the cycle of the "update timing" corresponds to the reciprocal of a frame rate at which the image IMG is displayed on the display section 31.

In one example, the "game situation" may be a situation of a game element in the virtual space related to the game. The "situation of a game" may be a position and state of a game element. The "state of a game element" may be a concept including a movement of the game element. In one example, in the baseball game, the "movement of the game element" corresponds to a movement of a character, such as a pitch, a hit, and stealing a base.

The progress controller 114 displays, on the display section 31, an image IMG that shows a result of a game progress. In one example, the progress controller 114 displays, on the display section 31, an image IMG corresponding to the updated game situation.

The storage unit 130 stores a variety of information required for the progress of the baseball game executed in the game apparatus 10, and a control program PRG of the game apparatus 10. The game apparatus 10 is controlled by the control program PRG. In this embodiment, in one example, the control program PRG includes an operation system program for controlling each part of the game apparatus 10, and an application program (an example of a "program") for executing the baseball game by the game apparatus 10. In one example, when the baseball game is started by the user of the game apparatus 10, the application program may be read from the information reader 190, and may then be stored in the storage unit 130.

In this embodiment, the storage unit 130 includes a buffer area 132 that stores input operation information, initial information, etc. The buffer area 132 includes a memory area 1321 (an example of "first memory area") for storing input operation information acquired by the acquirer 111, and a memory area 1322 (an example of "second memory area") for storing input operation information received by the communication controller 112. The configuration of each game apparatus 10 is not limited to the example shown in FIG. 3. In one example, the game controller 110 may include the buffer area 132.

Figure 4:
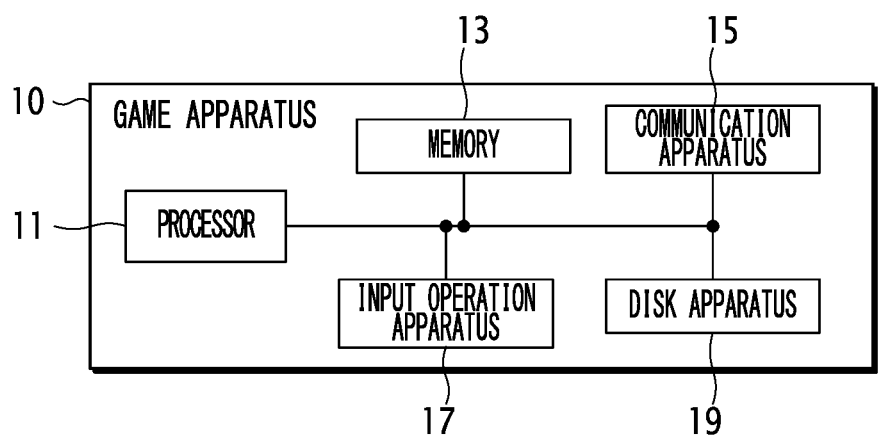
FIG. 4 is an example hardware configuration of each game apparatus 10.

FIG. 4 is an example hardware configuration of each of the game apparatuses 10.

Each game apparatus 10 includes a processor 11 that controls each part of the game apparatus 10, a memory 13 that stores a variety of information, a communication apparatus 15 that communicates with an external apparatus existing outside the game apparatus 10, an input operation apparatus 17 that receives input operations by the user of the game apparatus 10, and a disk apparatus 19 that reads information from a recording medium.

The memory 13 is a non-transitory storage medium, and provides a function as the storage unit 130. The memory 13 includes a volatile memory, such as a Random Access Memory (RAM) that acts as a work area of the processor 11, and a non-volatile memory, such as an Electrically Erasable Programmable Read-Only Memory (EEPROM) that stores a variety of information, such as the control program PRG of the game apparatus 10. In this embodiment, the memory 13 is illustrated as the "recording medium" in which the control program PRG is recorded. However, the present invention is not limited to this aspect. The "recording medium" in which the control program PRG is recorded may be a memory apparatus provided in an external apparatus that exists outside the game apparatus 10. In one example, the "storage medium" in which the control program PRG is recorded may be a memory apparatus in which the control program PRG is recorded. This memory apparatus may be provided in a distribution server that exists outside the game apparatus 10 and distributes the control program PRG.

In one example, the processor 11 is a Central Processing Unit (CPU), and acts as the game controller 110 by executing the control program PRG stored in the memory 13, and by operating in accordance with the control program PRG.

The communication apparatus 15 is constituted of hardware for communicating with an external apparatus that exists outside the game apparatus 10 via one or both of a wired network and a wireless network. The communication apparatus 15 provides a function as the communicator 150.

The input operation apparatus 17 provides a function as the input operation controller 170 that receives input operations made by the user of the game apparatus 10. In one example, the input operation apparatus 17 may comprise one or more devices including some or all of operation buttons, a touch panel, a keyboard, a joystick, and a pointing device such as a mouse.

In one example, the disk apparatus 19 is an optical disk apparatus, and provides a function as the information reader 190 that reads a variety of information, such as the control program PRG recorded on a recording medium such as an optical disk.

In addition to or instead of the CPU, the processor 11 may be constituted of hardware, such as a Graphics Processing Section (GPU), a Digital Signal Processor (DSP), or Field Programmable Gate Array (FPGA). In this case, some or all of the game controller 110 realized by the processor 11 may be realized by hardware, such as a DSP. The processor 11 may comprise some or all of one or more CPUs, and one or more hardware elements. In one example, in a case in which the processor 11 includes multiple CPUs, some or all of the functions of the game controller 110 may be realized by these CPUs working together in accordance with a program for the baseball game.

1.4. Operations of Game Apparatus

Description will be given of example operations of each of the game apparatuses 10 with reference to FIGS. 5 to 12.

Figure 5:
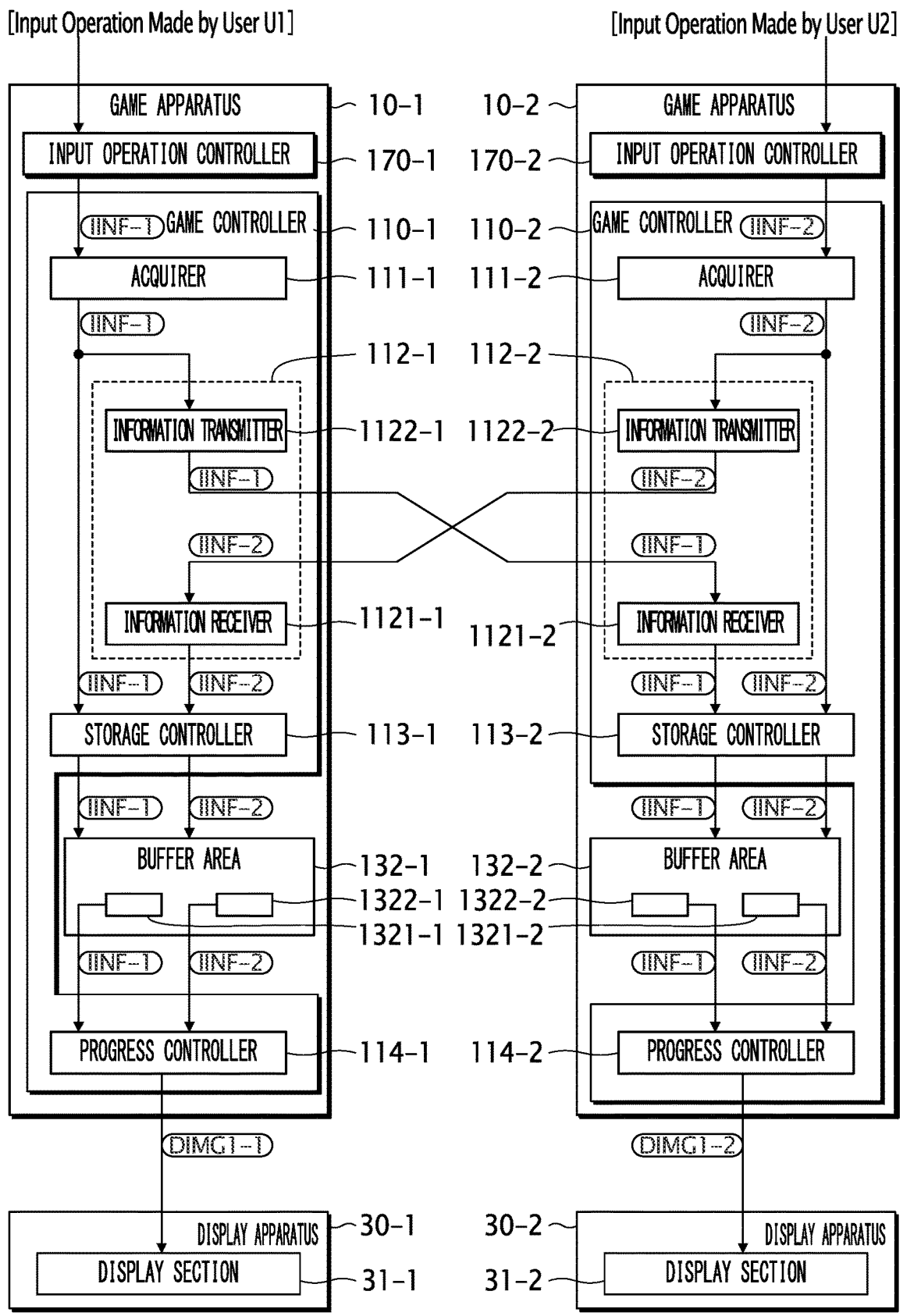
FIG. 5 is an explanatory diagram of a flow of input operation information IINF in the game system 1.

FIG. 5 is an explanatory diagram of a flow of input operation information IINF in the game system 1. In FIG. 5, the flow of information, such as the input operation information IINF (IINF-1 and IINF-2), is schematically shown. The input operation information IINF-1 refers to input operation information IINF representative of content of an input operation made by a user U1 of a game apparatus 10-1. The input operation information IINF-2 refers to input operation information IINF representative of content of an input operation made by a user U2 of a game apparatus 10-2.

Image data DIMG1-1 refers to image data DIMG1 of an image IMG displayed on the display section 31-1. Image data DIMG1-2 refers to image data DIMG1 of an image IMG displayed on the display section 31-2. In FIG. 5, illustrations of the communicator 150 and other sections are omitted for the sake of clarity of the flow of information. Hereinafter, the users U1 and U2 may be occasionally referred to as "users U" without any particular distinction.

When attention is focused on the game apparatus 10-1, the input operation information IINF-1 is an example of "first input operation information," and the input operation information IINF-2 is an example of "second input operation information." In contrast, when attention is focused on the game apparatus 10-2, the input operation information IINF-2 is an example of "first input operation information," and the input operation information IINF-1 is an example of "second input operation information."

When attention is focused on the game system 1, one of the game apparatuses 10-1 and 10-2 is an example of "first game apparatus," and the other one is an example of "second game apparatus." A case is given in which the game apparatus 10-1 is an example of "first game apparatus," and the game apparatus 10-2 is an example of "second game apparatus." In this case, the input operation information IINF-1 is an example of "first input operation information," and the input operation information IINF-2 is an example of "second input operation information."

Furthermore, the memory area 1321-1 is an example of "first memory area," the memory area 1322-1 is an example of "second memory area," the memory area 1321-2 is an example of "third memory area," and the memory area 1322-2 is an example of "fourth memory area."

When the user U1 of the game apparatus 10-1 operates the input operation controller 170-1, the acquirer 111-1 acquires, from the input operation controller 170-1, the input operation information IINF-1 representative of content of an input operation made by the user U1. The acquirer 111-1 may acquire the input operation information IINF-1 from the input operation controller 170-1 via the storage unit 130, etc. Then, the acquirer 111-1 outputs the input operation information IINF-1 to the information transmitter 1122-1 and the storage controller 113-1.

The information transmitter 1122-1 transmits the input operation information IINF-1 to the game apparatus 10-2. By this transmission, the information receiver 1121-2 of the game apparatus 10-2 receives the input operation information IINF-1 representative of content of the input operation on the input operation controller 170-1 of the game apparatus 10-1. Then, the information receiver 1121-2 outputs the input operation information IINF-1 to the storage controller 113-2.

When the user U2 of the game apparatus 10-2 operates the input operation controller 170-2, the acquirer 111-2 acquires, from the input operation controller 170-2, the input operation information IINF-2 representative of content of the input operation made by the user U2. Then, the acquirer 111-2 outputs the input operation information IINF-2 to the information transmitter 1122-2 and the storage controller 113-2.

The information transmitter 1122-2 transmits the input operation information IINF-2 to the game apparatus 10-1. Thus, the information receiver 1121-1 of the game apparatus 10-1 receives the input operation information IINF-2 representative of content of the input operation on the input operation controller 170-2 of the game apparatus 10-2. Then, the information receiver 1121-1 outputs the input operation information IINF-2 to the storage controller 113-1.

The storage controller 113-1 of the game apparatus 10-1 stores, in the memory area 1321-1 of the buffer area 132-1, the input operation information IINF-1 acquired by the acquirer 111-1. In addition, the storage controller 113-11 stores, in the memory area 1322-1 of the buffer area 132-1, the input operation information IINF-2 received by the communication controller 112-1.

When both of the following are stored in the buffer area 132-1: the input operation information IINF-1 of the game apparatus 10-1; and the input operation information IINF-2 of the game apparatus 10-2, the progress controller 114-1 of the game apparatus 10-1 progresses the game, based on the input operation information IINF-1 and IINF-2. Then, the progress controller 114-1 generates image data DIMG1-1 of an image IMG to be displayed on the display section 31-1, based on a result of the game progress, and outputs the generated image data DIMG1-1 to the display section 30-1. Thus, the image IMG updated in accordance with input operations of both of the users U1 and U2 is displayed on the display section 31-1.

Similarly, the storage controller 113-2 of the game apparatus 10-2 stores, in the memory area 1321-2 of the buffer area 132-2, the input operation information IINF-2 acquired by the acquirer 111-2. In addition, the storage controller 113-2 stores, in the memory area 1322-2 of the buffer area 132-2, the input operation information IINF-1 received by the communication controller 112-2.

Since both the input operation information IINF-1 of the game apparatus 10-1 and the input operation information IINF-2 of the game apparatus 10-2 are stored in the buffer area 132-2, the progress controller 114-2 of the game apparatus 10-2 progresses the game, based on the input operation information IINF-1 and IINF-2. Then, the progress controller 114-2 generates image data DIMG1-2 of an image IMG to be displayed on the display section 31-2, based on a result of the game progress, and outputs the generated image data DIMG1-2 to the display section 30-2. Thus, the image IMG updated in response to input operations of both of the users U1 and U2 is displayed on the display section 31-2.

The flow of the input operation information IINF is not limited to the example shown in FIG. 5. In one example, after the input operation information IINF-1 is stored in the memory area 1321-1, the information transmitter 1122-1 may transmit the input operation information IINF-1 stored in the memory area 1321-1 to the game apparatus 10-2.

Next, description will be given of an overview of operations of the game system 1 with reference to FIG. 6.

Figure 6:
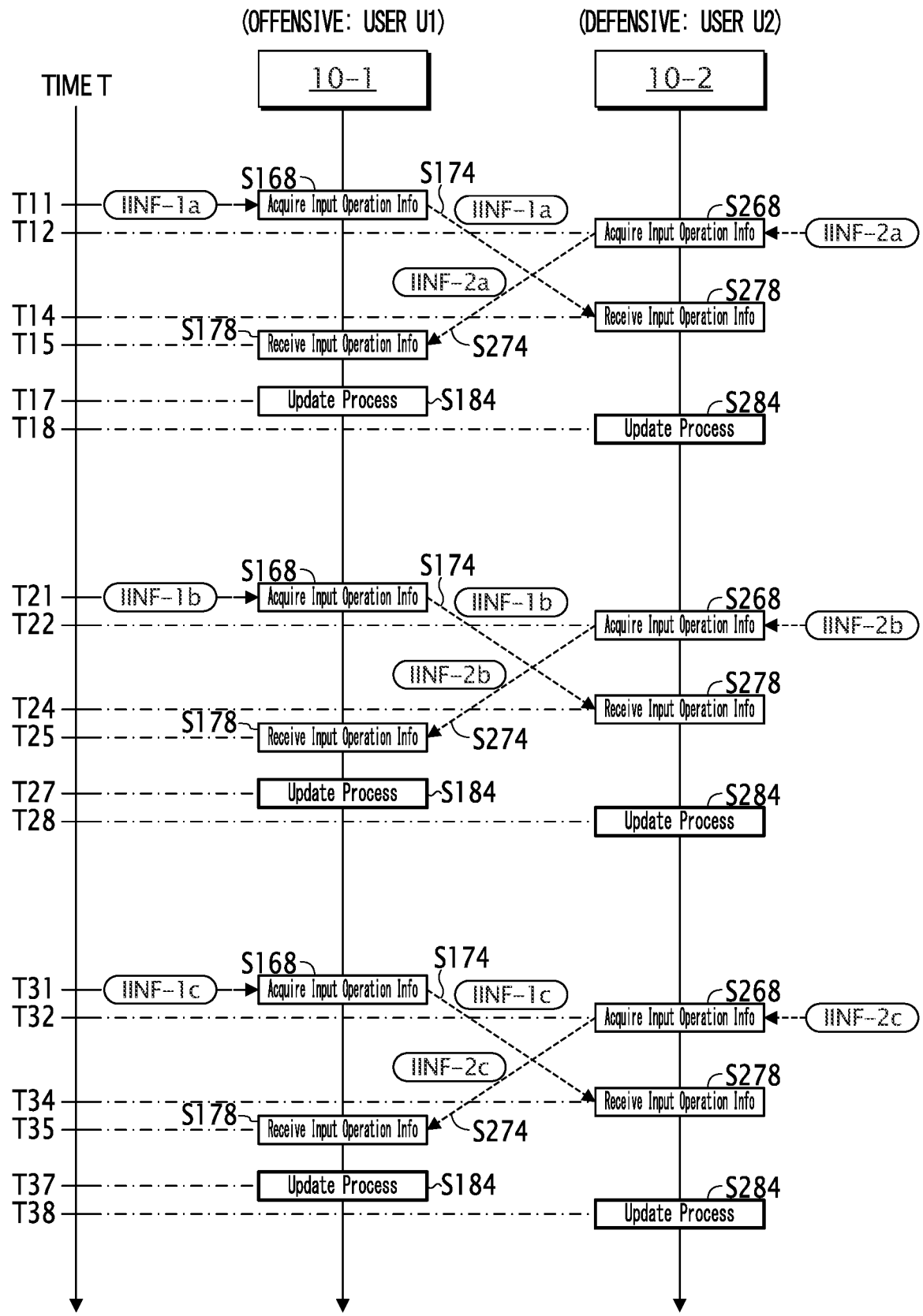
FIG. 6 is a sequence chart showing example operations of the game system 1.

FIG. 6 is a sequence chart showing example operations of the game system 1. In FIG. 6, a lowercase letter (a, b or c) is added to the end of each of the reference signs to distinguish pieces of input operation information IINF-1 from each other. Similarly, a lowercase letter (a, b or c) is added to the end of each of the reference signs to distinguish pieces of input operation information IINF-2 from each other. Acquisition processes (S168 and S268) of input operation information shown in FIG. 6 refer to processes executed by the acquirer 111. Reception processes (S178 and S278) of input operation information refer to processes executed by the information receiver 1121. Update processes (S184 and S284) shown in FIG. 6 refer to processes executed by the progress controller 114.

In FIG. 6, an interval between two consecutive times in times T17, T27 and T37 corresponds to a cycle of an update timing of the game in the game apparatus 10-1. An interval between two consecutive times in times T18, T28 and T38 corresponds to a cycle of an update timing of the game in the game apparatus 10-2. To clear the drawing of FIG. 6, a sequence of operations of the game system 1 is shown using an example case in which a transfer time of the input operation information IINF between the game apparatuses 10-1 and 10-2 is shorter than the cycle of the update timing of the game. In an example shown in FIG. 6, the time at which the game is updated in the game apparatus 10-2 is later than that in the game apparatus 10-1. The time at which the game is updated in the game apparatus 10-2 may be prior to the time at which the game is updated in the game apparatus 10-1, or may be the same time as that in the game apparatus 10-1.

First, at time T11, the acquirer 111-1 of the game apparatus 10-1 acquires input operation information IINF-1a (S168). When the acquirer 111-1 acquires the input operation information IINF-1a, the information transmitter 1122-1 transmits the input operation information IINF-1a to the game apparatus 10-2 (S174). Thus, the information receiver 1121-2 of the game apparatus 10-2 receives the input operation information IINF-1a at time T14 (S278).

At time T12, the acquirer 111-2 of the game apparatus 10-2 acquires input operation information IINF-2a (S268). When the acquirer 111-2 acquires the input operation information IINF-2a, the information transmitter 1122-2 transmits the input operation information IINF-2a to the game apparatus 10-1 (S274). Thus, the information receiver 1121-1 of the game apparatus 10-1 receives the input operation information IINF-2a at time T15 (S178).

Since both the input operation information IINF-1 of the game apparatus 10-1 and the input operation information IINF-2 of the game apparatus 10-2 are input, the progress controller 114-1 of the game apparatus 10-1 progresses the game, based on the input operation information IINF-1 and IINF-2 at time T17 (S184). Thus, the game situation of game apparatus 10-1 is updated to a situation corresponding to the input operations of both of the users U1 and U2.

Similarly, since both the input operation information IINF-1 of the game apparatus 10-1 and the input operation information IINF-2 of the game apparatus 10-2 are input, the progress controller 114-2 of the game apparatus 10-2 progresses the game, based on the input operation information IINF-1 and IINF-2, at time T18 (S284). Thus, the game situation of the game apparatus 10-2 is updated to the situation corresponding to the input operations of both of the users U1 and U2.

Operations carried out by the game apparatus 10-1 at times T21, T25 and T27 are the same as those at times T11, T15 and T17, except that input operation information IINF-1b is acquired instead of the input operation information IINF-1a. Similarly, operations carried out by the game apparatus 10-2 at times T22, T24 and T28 are the same as those at times T12, T14 and T18, except that input operation information IINF-2b is acquired instead of the input operation information IINF-2a.

Operations carried out by the game apparatus 10-1 at times T31, T35 and T37 are the same as those at times T11, T15 and T17, except that input operation information IINF-1c is acquired instead of the input operation information IINF-1a. Similarly, operations carried out by the game apparatus 10-2 at times T32, T34 and T38 are the same as those at times T12, T14 and T18, except that input operation information IINF-2c is acquired instead of the input operation information IINF-2a.

Thus, in the game system 1, the progress controller 114-1 of the game apparatus 10-1 and the progress controller 114-2 of the game apparatus 10-2 progress the game, based on the set of the input operation information IINF-1 and IINF-2. Thus, in one example, between the two game apparatuses 10-1 and 10-2, content of the game progress coincide with each other.

Next, detailed description will be given of operations of the game system 1 will be described with reference to FIGS. 7 to 10.

FIGS. 7 to 10 each are an explanatory diagram of example operations of the game system 1. Positions P1, . . . , Pn shown next to the memory area 1321 in FIGS. 7 to 10 represent positions where information (initial information or input operation information IINF, etc.) is stored in the memory areas 1321 and 1322. Furthermore, each of "D", "X" and lowercase letters (a, b, c, etc.) shown in the memory areas 1321 and 1322 represents a state of each position Pin the memory areas 1321 and 1322. In one example, the "D" represents that the initial information is stored, and the "X" represents that neither the initial information nor the input operation information IINF is stored. Each lowercase letter represents that the input operation information IINF with the same lowercase letter at the end of the reference sign is stored. In one example, the "a" shown in the memory area 1321-1 or 1322-2 represents that input operation information IINF-1a is stored, and the "a" in the memory area 1322-1 or 1321-2 represents that input operation information IINF-2a is stored. The shaded areas in the memory areas 1321 and 1322 in the drawings represent information (the initial information or the input operation information IINF) that has already been used for the game progress. First, description will be given of operations of the game system 1 with reference to FIG. 7.

Figure 7:
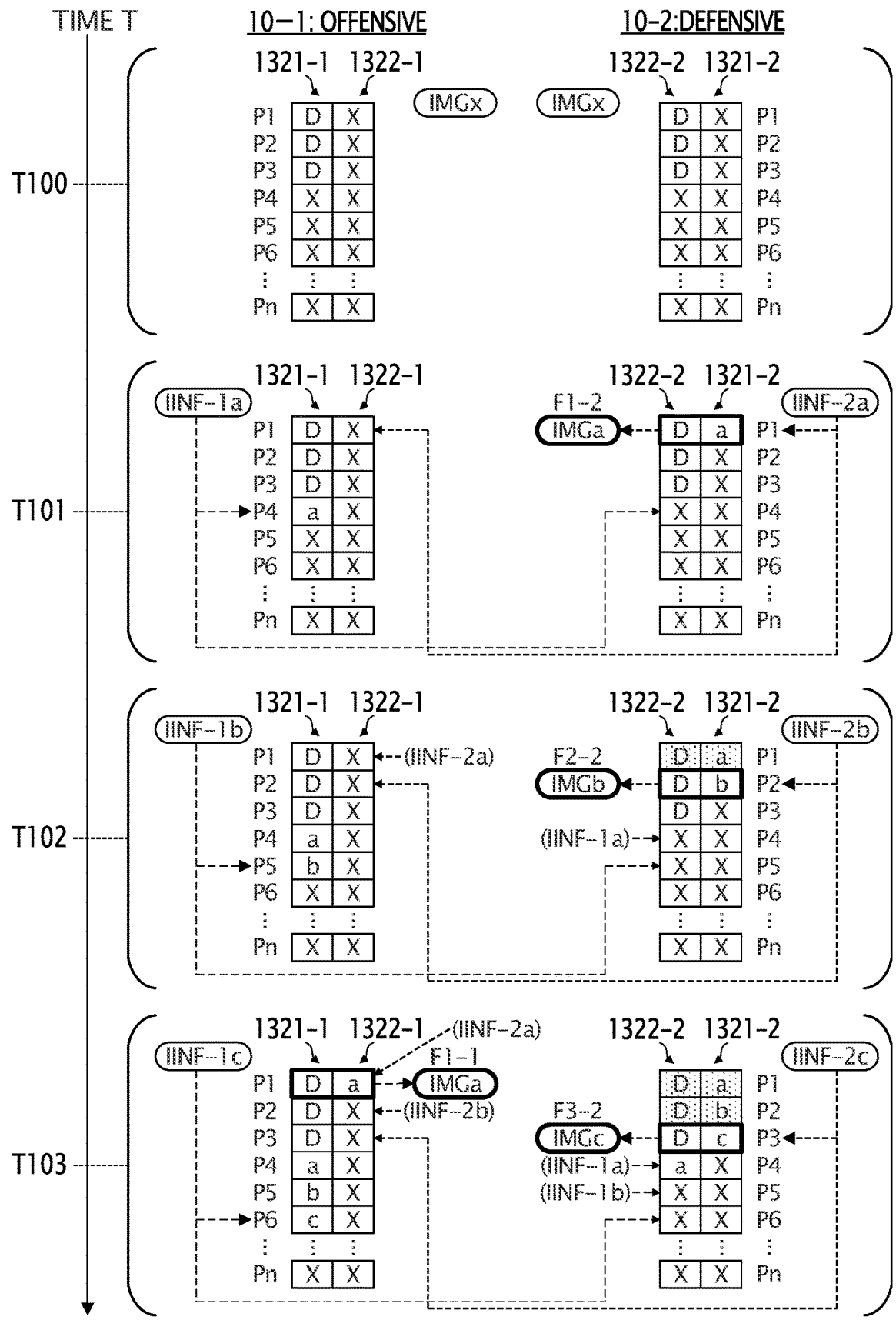
FIG. 7 is an explanatory diagram of example operations of the game system 1.

In an example shown in FIG. 7, time T100 refers to a time within the initialization period. An interval between two consecutive times in times T100, T101, T102 and T103 shown in FIG. 7 corresponds to a cycle of an update timing of the game in the game apparatuses 10-1 and 10-2. In FIG. 7, to clear the drawing, the time at which the game is updated in game apparatus 10-1 and the time at which the game is updated in game apparatus 10-2 are the same. Furthermore, in FIG. 7, a case is assumed in which transfer time of the input operation information IINF between game apparatuses 10-1 and 10-2 is longer than the cycle of the update timing of the game.

In an example shown in FIG. 7, the game apparatus 10-1 is used to control the batter character Cbt, and the game apparatus 10-2 is used to control the pitcher character Cpt. Accordingly, when the initialization process for initializing the state of the buffer area 132-1 is executed in the game apparatus 10-1, the initial information independent from the input operations of the users U1 and U2 is stored in the memory area 1321-1. Similarly, when the initialization process for initializing the state of the buffer area 132-2 is executed in the game apparatus 10-2, the initial information independent from the input operations of the users U1 and U2 is stored in the memory area 1322-2.

In one example, at time T100, the storage controller 113-1 of the game apparatus 10-1 executes the initialization process for storing the initial information at the positions P1, P2, and P3 in the memory area 1321-1. Similarly, the storage controller 113-2 of the game apparatus 10-2 executes the initialization process of storing the initial information at the positions P1, P2 and P3 in the memory area 1322-2. At time T100, an image IMGx independent from the input operation information IINF is displayed on each of the display section 31-1 and 31-2. The image IMGx displayed on the display section 31-1 may be a different image from the image IMGx displayed on the display section 31-2.

At time T101, the storage controller 113-1 of the game apparatus 10-1 stores, at the position P4 in the memory area 1321-1, the input operation information IINF-1a acquired by the acquirer 111-1. Furthermore, the information transmitter 1122-1 transmits the input operation information IINF-1a to the game apparatus 10-2. In an example shown in FIG. 7, the game apparatus 10-2 receives the input operation information IINF-1a at time T103, which corresponds to a time at which the image IMG two frames later is displayed.

In contrast, at time T101, the storage controller 113-2 of the game apparatus 10-2 stores, at the position P1 in the memory area 1321-2, the input operation information IINF-2*a* acquired by the acquirer 111-2. By the initialization process executed at the time T100, the initial information is stored at the position P1 in the memory area 1322-2. Accordingly, at time T101, the progress controller 114-2 progresses the game, based on the set of (i) the input operation information IINF-2*a* stored at the position P1 in the memory area 1321-2, and (ii) the initial information stored at the position P1 in the memory area 1322-2. Then, the progress controller 114-2 causes the display section 31-2 to display an image IMGa representative of a result of the game progress, as an image IMG of a first frame F1-2 after the initialization.

The information transmitter 1122-2 transmits the input operation information IINF-2*a* to the game apparatus 10-1 at time T101. In an example shown in FIG. 7, the game apparatus 10-1 receives the input operation information IINF-2*a* at time T103, which corresponds to a time at which the image IMG two frames later is displayed. The progress controller 114-1 of the game apparatus 10-1 waits for the game progress until time T103, at which the input operation information IINF-2*a* is received. Accordingly, at time T101, in one example, an image IMGx independent from the input operation information IINF is displayed on the display section 31-1.

Thus, the defensive game apparatus 10-2 can reflect, in the game progress, the input operation (represented by the input operation information IINF-2*a*) made by the user U2 of the game apparatus 10-2 before receiving the input operation information IINF-1*a* from the offensive game apparatus 10-1. A conventional game apparatus, which does not have initial information corresponding to the input operation information IINF-2*a* stored in the memory area 1322-2, does not progress the game until the game apparatus receives input operation information IINF from another game apparatus (e.g., input operation information IINF-1*a* from the game apparatus 10-1). In other words, as compared to the conventional game apparatus, the defensive game apparatus 10-2 can reduce delay until the content of the input operation is reflected in the game progress.

At time T102, the storage controller 113-1 of the game apparatus 10-1 stores, at the position P5 in the memory area 1321-1, the input operation information IINF-1*b* acquired by the acquirer 111-1. The information transmitter 1122-1 transmits the input operation information IINF-1*b* to the game apparatus 10-2.

The storage controller 113-2 of the game apparatus 10-2 stores, at the position P2 in the memory area 1321-2, the input operation information IINF-2*b* acquired by the acquirer 111-2. The progress controller 114-2 progresses the game, based on the set of (i) the input operation information IINF-2*b* stored at the position P2 in the memory area 1321-2, and (ii) the initial information stored at the position P2 in the memory area 1322-2. Then, the progress controller 114-2 causes the display section 31-2 to display an image IMGb representative of a result of the game progress as an image IMG of a frame F2-2. The information transmitter 1122-2 transmits the input operation information IINF-2*b* to the game apparatus 10-1.

At time T103, the storage controller 113-1 of the game apparatus 10-1 stores, at the position P6 in the memory area 1321-1, the input operation information IINF-1*c* acquired by the acquirer 111-1. The information transmitter 1122-1 transmits the input operation information IINF-1*c* to the game apparatus 10-2. The information receiver 1121-1 receives the input operation information IINF-2*a* transmitted from the game apparatus 10-2. Accordingly, at time T103, the storage controller 113-1 stores, at the position P1 in the memory area 1322-1, the input operation information IINF-2*a* received by the information receiver 1121-1.

By the initialization process executed at the time T100, the initial information is stored at the position P1 in the memory area 1321-1. Accordingly, at time T103, the progress controller 114-1 proceeds with the game, based on the set of (i) the initial information stored at the position P1 in the memory area 1321-1, and (ii) the input operation information IINF-2*a* stored at the position P1 in the memory area 1322-1. Then, at time T103, the progress controller 114-1 causes the display section 31-1 to display the image IMGa representative of a result of the game progress, as an image IMG of a first frame F1-1 after the initialization. In other words, the image IMGa, which represents a game situation updated based on the initial information and the input operation information IINF-2*a*, is displayed on the display section 31-2 of the defensive game apparatus 10-2 at time T101, and is displayed on the display section 31-1 of the offensive game apparatus 10-1 at time T103.

The storage controller 113-2 of the game apparatus 10-2 stores, at the position P3 in the memory area 1321-2, the input operation information IINF-2*c* acquired by the acquirer 111-2. The progress controller 114-2 proceeds with the game, based on the set of (i) the input operation information IINF-2*c* stored at the position P3 in the memory area 1321-2, and (ii) the initial information stored at the position P3 in the memory area 1322-2. Then, the progress controller 114-2 causes the display section 31-2 to display an image IMGc representative of a result of the game progress as an image IMG of a frame F3-2.

The information transmitter 1122-2 transmits the input operation information IINF-2*c* to the game apparatus 10-1. The information receiver 1121-2 receives the input operation information IINF-1*a* transmitted from the game apparatus 10-1. Accordingly, at time T103, the storage controller 113-2 stores, at the position P4 in the memory area 1322-2, the input operation information IINF-1*a* received by the information receiver 1121-2.

When attention is focused on the game apparatus 10-2, a period from time T101 to time T103 shown in FIG. 7 corresponds to the first period after the initialization period. When attention is focused on the game apparatus 10-1, a period from time T101 shown in FIG. 7 to time T105 shown in FIG. 8 corresponds to the first period after the initialization period.

Next, description will be given of operations following FIG. 7 with reference to FIG. 8.

Figure 8:
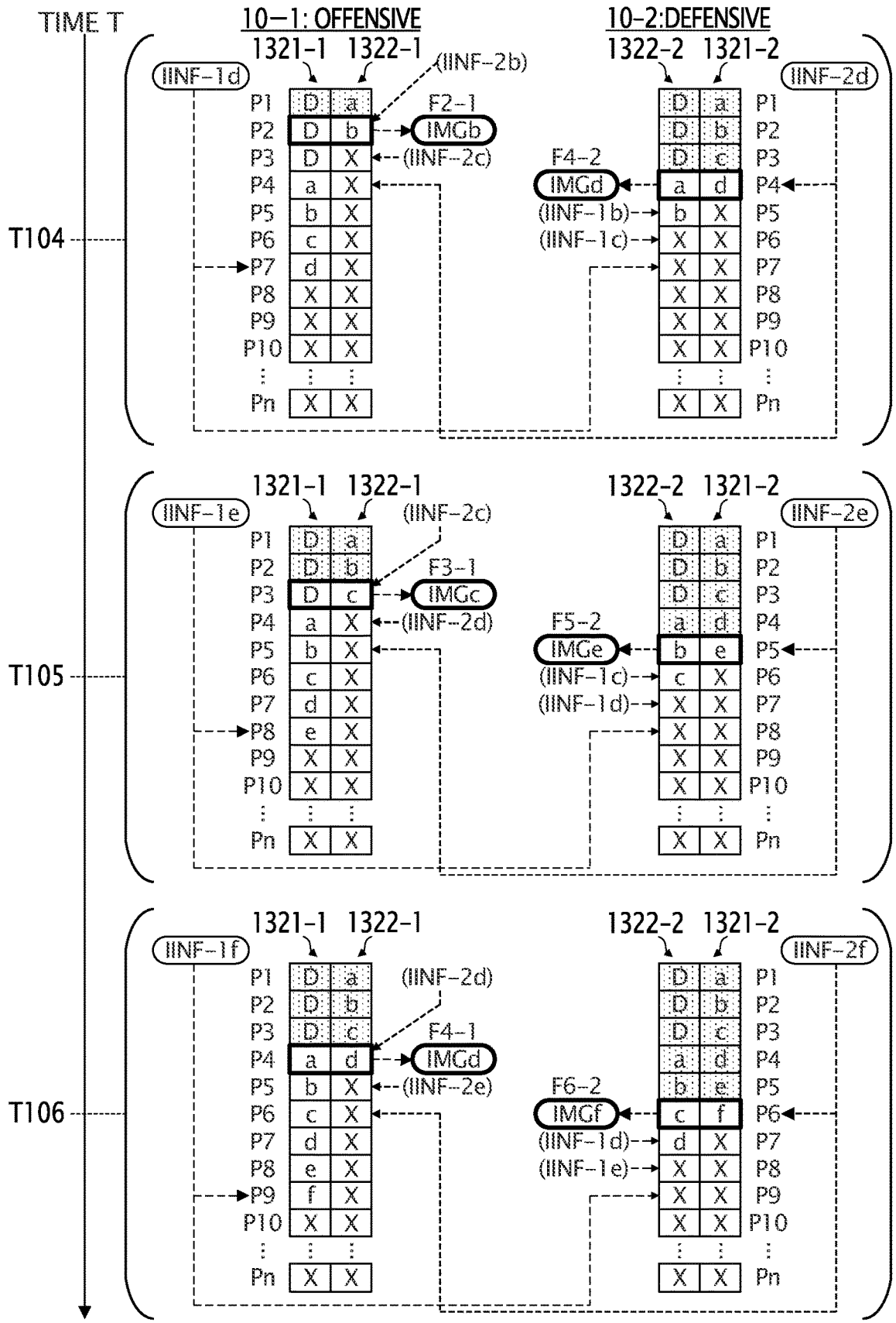
FIG. 8 is an explanatory diagram of example operations of the game system 1.

FIG. 8 is an explanatory diagram of operations following FIG. 7. When attention is focused on the game apparatus 10-2, a period after time T104 shown in FIG. 8 corresponds to the second period after the first period. When attention is focused on the game apparatus 10-1, a period after time T106 corresponds to the second period after the first period. Detailed description will be omitted for operations similar to those described in FIG. 7.

At time T104, the storage controller 113-1 of the game apparatus 10-1 stores, at the position P7 in the memory area 1321-1, the input operation information IINF-1*d* acquired by the acquirer 111-1. In addition, the storage controller 113-1 stores, at the position P2 in the memory area 1322-1, the input operation information IINF-2*b* received by the information receiver 1121-1. The progress controller 114-1 proceeds the game, based on the set of (i) the initial information stored in the position P2 in the memory area 1321-1, and (ii)

the input operation information IINF-2b stored in the position P2 in the memory area 1322-1. Then, the progress controller 114-1 causes the display section 31-1 to display the image IMGb representative of a result of the game progress as an image IMG of a frame F2-1. The information transmitter 1122-1 transmits the input operation information IINF-1d to the game apparatus 10-2.

In contrast, the storage controller 113-2 of the game apparatus 10-2 stores, at the position P4 in the memory area 1321-2, the input operation information IINF-2d acquired by the acquirer 111-2. In addition, the storage controller 113-2 stores, at position P5 in the memory area 1322-2, the input operation information IINF-1b received by the information receiver 1121-2. The progress controller 114-2 progresses the game, based on the set of (i) the input operation information IINF-2d stored at the position P4 in the memory area 1321-2, and (ii) the input operation information IINF-1a stored at the position P4 in the memory area 1322-2. Then, the progress controller 114-2 causes the display section 31-2 to display an image IMGd representative of a result of the game progress as an image IMG of a frame F4-2. Furthermore, the information transmitter 1122-2 transmits the input operation information IINF-2d to the game apparatus 10-1. Thus, at time T104, the game apparatus 10-2 proceeds the game, based on the set of (i) the input operation information IINF-1a of the game apparatus 10-1, and (ii) the input operation information IINF-2d of the game apparatus 10-2.

Each of the operations of the game apparatus 10-1 at times T105 and T106 is the same as that of the game apparatus 10-1 at time T104, except for the input operation information IINF to be processed. In one example, at time T106, the progress controller 114-1 of the game apparatus 10-1 progresses the game, based on the set of (i) the input operation information IINF-1a stored at the position P4 in the memory area 1321-1, and (ii) the input operation information IINF-2d stored at the position P4 in the memory area 1322-1. Then, the progress controller 114-1 causes the display section 31-1 to display the image IMGd representative of a result of the game progress as an image IMG of a frame F4-1.

Each of the input operations of the game apparatus 10-2 at times T105 and T106 is the same as that of the game apparatus 10-2 at time T104, except for the input operation information IINF to be processed.

Next, description will be given of operations following FIG. 8 with reference to FIG. 9.

Figure 9:
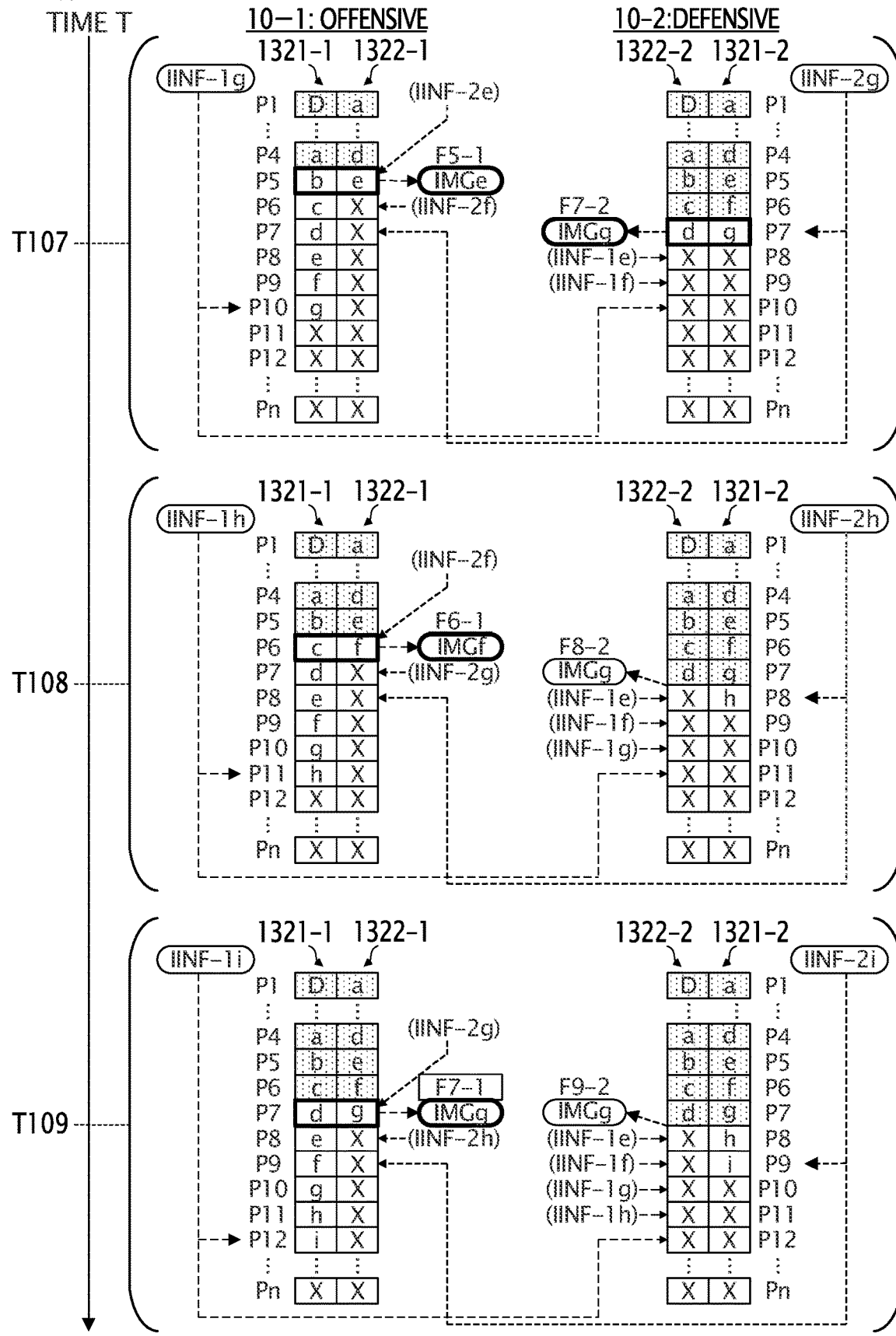
FIG. 9 is an explanatory diagram of example operations of the game system 1.

FIG. 9 is an explanatory diagram of operations following FIG. 8. Detailed description will be omitted for operations similar to those described in FIGS. 7 and 8. In examples shown in FIGS. 7 to 10, a case is assumed in which a delay occurs from time T107 to time T112 in arrival of the input operation information IINF-1 transmitted from the game apparatus 10-1 to the game apparatus 10-2. Accordingly, each of the operations at times T107, T108, and T109 carried out by the game apparatus 10-2 differs from that at time T104 carried out by the game apparatus 10-2 described in FIG. 8. It is assumed that the time until the input operation information IINF-2 transmitted from the game apparatus 10-2 reaches the game apparatus 10-1 is the same as in the examples shown in FIGS. 8 and 9. In this case, each of the operations at times T107, T108 and T109 carried out by the game apparatus 10-1 is the same as that at time T104 carried out by the game apparatus 10-1 described in FIG. 8, except for the input operation information IINF to be processed.

Accordingly, in FIG. 9, description will focus on the operations at times T107, T108 and T109 carried out by the game apparatus 10-2.

At time T107, the storage controller 113-2 of the game apparatus 10-2 stores, at the position P7 in the memory area 1321-2, input operation information IINF-2g acquired by the acquirer 111-2. The progress controller 114-2 progresses the game, based on (i) the input operation information IINF-2g stored at the position P7 in the memory area 1321-2, and (ii) the input operation information IINF-1d stored at the position P7 in the memory area 1322-2. Then, the progress controller 114-2 causes the display section 31-2 to display an image IMGg representative of a result of the game progress as an image IMG of a frame F7-2. The information transmitter 1122-1 transmits the input operation information IINF-1g to the game apparatus 10-2. Since input operation information IINF-1e transmitted from the game apparatus 10-1 has not yet reached the game apparatus 10-2 at time T107, the input operation information IINF-1e is not stored at the position P8 in the memory area 1322-2.

At time T108, the storage controller 113-2 of the game apparatus 10-2 stores, at the position P8 in the memory area 1321-2, input operation information IINF-2h acquired by the acquirer 111-2. Since the input operation information IINF-1e has not yet reached the game apparatus 10-2 at time T108, the input operation information IINF-1e is not stored at the position P8 in the memory area 1322-2. In other words, at time T108, the input operation information IINF-1e corresponding to the input operation information IINF-2h is not stored in the memory area 1322-2. In this case, the progress controller 114-2 waits for the game progress until the input operation information IINF-1e corresponding to the input operation information IINF-2h is stored in the memory area 1322-2. Accordingly, the image IMG displayed on the display section 31-2 is not updated. In one example, the progress controller 114-2 causes the display section 31-2 to display the image IMGg of the previous frame F7-2 as an image IMG of a frame F8-2.

Thus, updating a game situation in synchronization with the update timing may be a concept that includes "changing the game situation" and "maintaining the game situation without any change. The "changing the game situation" is an example of "progressing the game." In one example, even when the game is progressed, when both of the following indicate that an input operation of the user U is not carried out: the input operation information IINF-1 of the game apparatus 10-1; and the input operation information IINF-2 of the game apparatus 10-2, the game situation may be maintained without any change.

At time T109, the storage controller 113-2 of the game apparatus 10-2 stores, at the position P9 in the memory area 1321-2, input operation information IINF-2i acquired by the acquirer 111-2. Even at time T109, the input operation information IINF-1e has not yet reached the game apparatus 10-2. Accordingly, the image IMG displayed on the display section 31-2 is not updated. In one example, the input operation information IINF-1e reached the game apparatus 10-2 at time T110 shown in FIG. 10.

Next, description will be given of operations following FIG. 9 with reference to FIG. 10.

Figure 10:
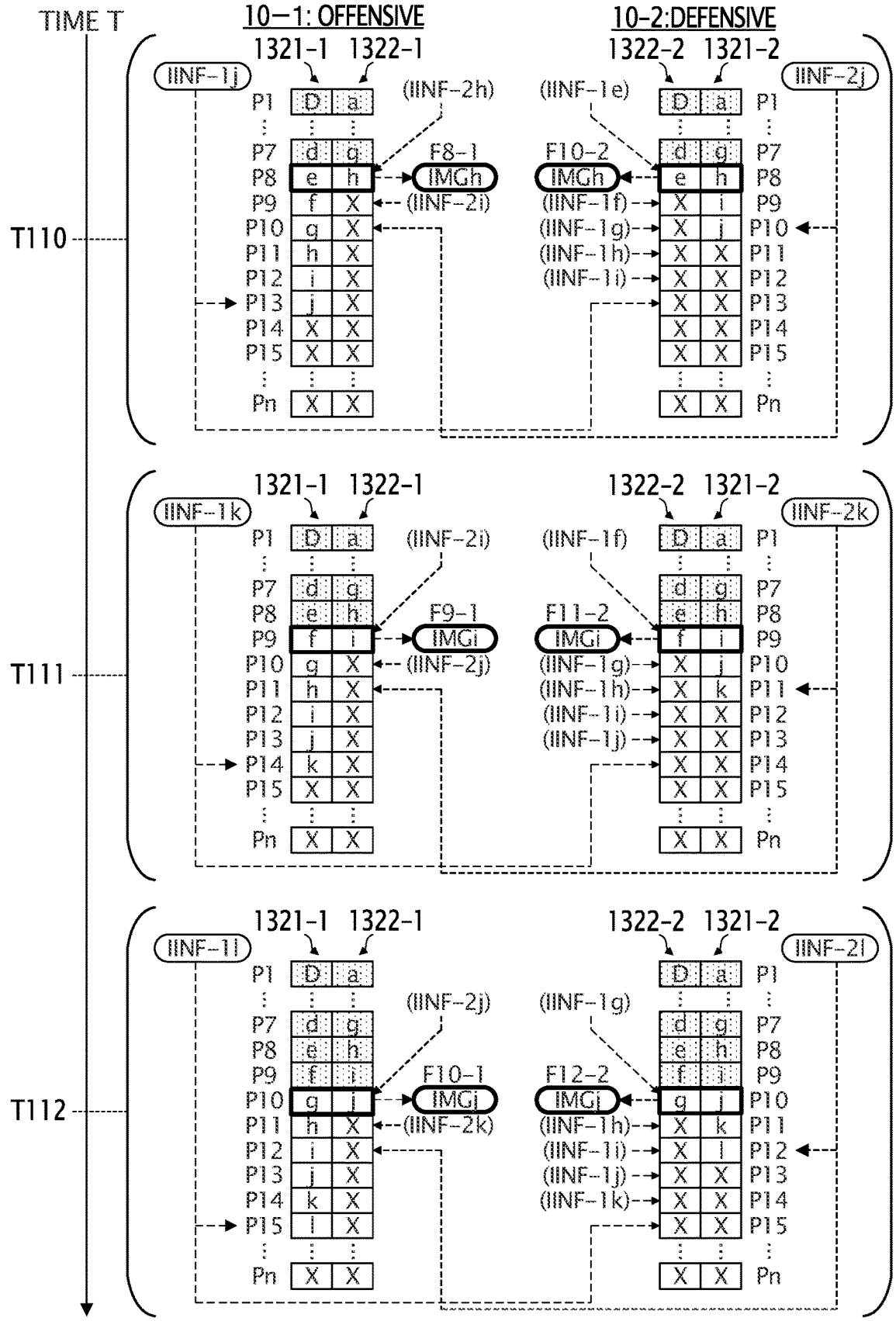
FIG. 10 is an explanatory diagram of example operations of the game system 1.

FIG. 10 is an explanatory diagram of operations following FIG. 9. Detailed description will be omitted for operations similar to those described in FIGS. 7 to 9. Each of the operations at times T110, T111 and T112 carried out by the game apparatus 10-1 is the same as that at time T104 carried out by the game apparatus 10-1 described in FIG. 8, except for the input operation information IINF to be processed.

Accordingly, in FIG. 10, description will focus on operations at times T110, T111 and T112 carried out by the game apparatus 10-2.

At time T110, the information receiver 1121-2 of the game apparatus 10-2 receives the input operation information IINF-1e transmitted from the game apparatus 10-1. Then, the storage controller 113-2 stores, at the position P8 in the memory area 1322-2, the input operation information IINF-1e received by the information receiver 1121-2. In other words, at time T110, the input operation information IINF-1e corresponding to the input operation information IINF-2h is stored in the memory area 1322-2. Accordingly, the progress controller 114-2 progresses the game, based on the set of (i) the input operation information IINF-2h stored at the position P8 in the memory area 1321-2, and (ii) the input operation information IINF-1e stored at the position P8 in the memory area 1322-2. Then, the progress controller 114-2 causes the display section 31-2 to display an image IMGh representative of a result of the game progress as an image IMG of a frame F10-2.

The storage controller 113-2 stores, at the position P10 in the memory area 1321-2, input operation information IINF-2j acquired by the acquirer 111-2. The information transmitter 1122-2 transmits the input operation information IINF-2j to the game apparatus 10-1.

Each of the operations at times T111 and T112 carried out by the game apparatus 10-2 is the same as that at time T110 carried out by the game apparatus 10-2, except for the input operation information IINF to be processed. The operations of the game system 1 are not limited to the examples shown in FIGS. 7 to 10. In one example, when the game apparatus 10-2 is waiting for the game progress, the game apparatus 10-2 may wait for a transmission of the input operation information IINF to the game apparatus 10-1.

Figure 11:
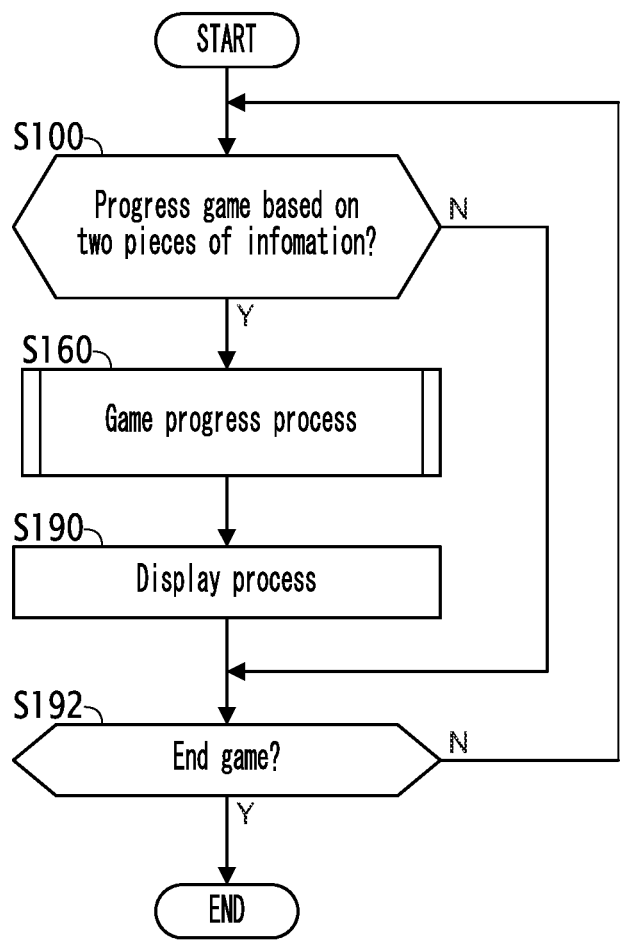
FIG. 11 is a flowchart showing example operations of each game apparatuses 10.

FIG. 11 is a flowchart showing example operations of each of the game apparatuses 10. The operations shown in FIG. 11 are executed in accordance with an update timing for progressing the game. In one example, the operations shown in FIG. 11 are repeatedly executed in the same cycle as that of the update timing.

First, at step S100, the progress controller 114 determines whether to progress the game, based on two pieces of information: (i) information stored in the memory area 1321, and (ii) information stored in the memory area 1322. In one example, when the game apparatus 10 displays, on the display section 31, a demonstration screen independent from input operations of the users U1 and U2, a result of the determination at step S100 is negative. When the result of the determination at step S100 is affirmative, the game controller 110 executes the game progress process at step S160, and then moves the process to step S190. In contrast, when the result of the determination at step S100 is negative, the progress controller 114 moves the process to step S192. A game progress process will be described in detail in relation to FIG. 12, which will be described later. Hereinafter, progressing the game based on the two pieces of information may be occasionally referred to as "input synchronization mode."

At step S190, the progress controller 114 causes the display section 31 to display an image IMG representative of a result of the game progress obtained by the process at step S160.

Next, at step S192, the progress controller 114 determines whether to end the game. In one example, the progress controller 114 determines to end the game, when the acquirer 111 acquires input operation information IINF representative of an input operation representative of end of the game. When a result of the determination at step S192 is affirmative, the progress controller 114 ends the game. In contrast, when the result of the determination at step S192 is negative, the progress controller 114 returns the process to step S100, and continues the game.

Next, description will be given of an example game progress process at step S160 with reference to FIG. 12.

Figure 12:
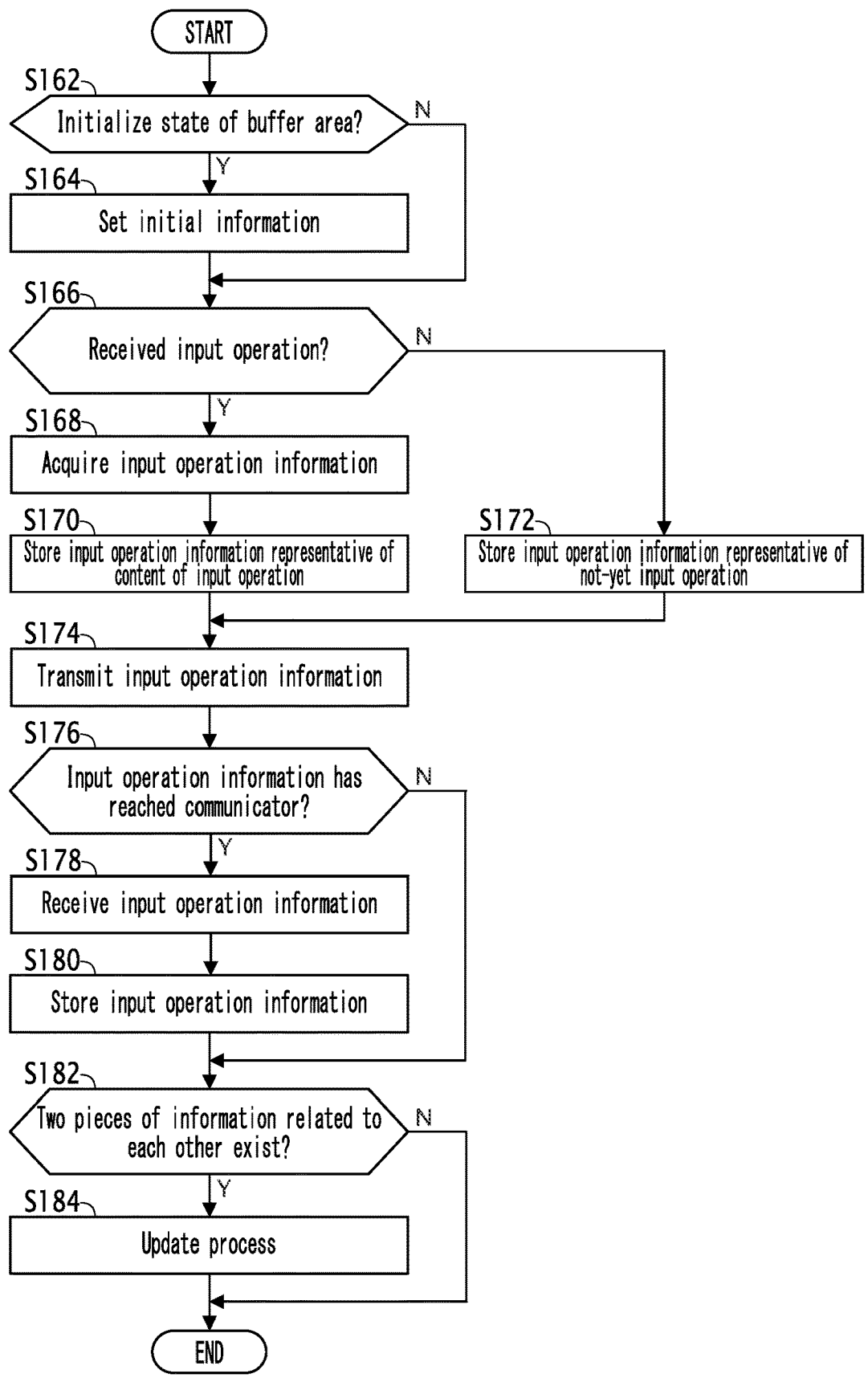
FIG. 12 is a flowchart showing an example game progress process.

FIG. 12 is a flowchart showing an example game progress process. Each of the operations shown in FIG. 12 is an example of the game progress process at step S160 shown in FIG. 11. Accordingly, a process at step S162 is executed when the result of the determination at step S100 shown in FIG. 11 is affirmative. Furthermore, in FIG. 12, steps similar to those described in FIG. 6 are denoted by the same reference signs used in FIG. 6.

First, at step S162, the progress controller 114 determines whether to initialize the state of the buffer area 132. In one example, when a process for progressing the game is started based on the two pieces of information (the game progress process in the input synchronization mode), the progress controller 114 determines to initialize the state of the buffer area 132. In the baseball game, as described in FIG. 2, when offense and defense are switched, in some cases, the game progress process in the input synchronization mode is started anew. When the game progress process in the input synchronization mode is started anew, the progress controller 114 determines to initialize the state of the buffer area 132.

When a result of the determination at step S162 is affirmative, the progress controller 114 moves the process to step S164. In contrast, when the result of the determination at step S162 is negative, the progress controller 114 moves the process to step S166.

At step S164, the storage controller 113 carries out the initialization process in which one or more pieces of initial information independent from an input operation of the user U are stored in either the memory areas 1321 or 1322. In one example, the storage controller 113 determines a memory area that stores one or more pieces of initial information from among the memory area 1321 and 1322, based on inning information. Here, the inning information represents which one of the pitcher character Cpt and the batter character Cbt is operated by the game apparatus 10. Specifically, when the game apparatus 10 is used for operating the pitcher character Cpt, the storage controller 113 stores one or more pieces of initial information in the memory area 1322. In one example, when the game apparatus 10 is used for operating the batter character Cbt, the storage controller 113 stores one or more pieces of initial information in the memory area 1321. After the execution of the process at step S164, the storage controller 113 moves the process to step S166.

At step S166, the acquirer 111 determines whether an input operation has been received by the input operation controller 170. When a result of the determination at step S166 is affirmative, the acquirer 111 acquires input operation information IINF at step S168, and moves the process to step S170. In contrast, when the result of the determination at step S166 is negative, the progress controller 114 moves the process to step S172.

At step S170, the storage controller 113 stores, in the memory area 1321, the input operation information IINF representative of content of an input operation made by the user U. In other words, the storage controller 113 stores, in the memory area 1321, the input operation information IINF acquired by the acquirer 111. After the process at step S170, the storage controller 113 moves the process to step S174.

At step S172, the storage controller 113 stores, in the memory area 1321, input operation information IINF representing that no input operation made by the user U has been carried out (hereinafter, occasionally referred to as "input operation information IINF representative of a not-yet input operation"). After the process at step S172, the storage controller 113 moves the process to step S174.

At step S174, the information transmitter 1122 transmits, to another game apparatus 10, the input operation information IINF acquired by the acquirer 111 or the input operation information IINF representative of a not-yet input operation. In one example, the information transmitter 1122 transmits the input operation information stored in the memory area 1321 to another game apparatus 10.

Next, at step S176, the information receiver 1121 determines whether the input operation information IINF of the other game apparatus 10 has reached the communicator 150. When a result of the determination at step S176 is affirmative, the information receiver 1121 receives the input operation information IINF of the other game apparatus 10 at step S178, and moves the process to step S180. In contrast, when the result of the determination at step S176 is negative, the information receiver 1121 moves the process to step S182. At step S180, the storage controller 113 stores, in the memory area 1322, the input operation information IINF received by the information receiver 1121, and then moves the process to step S182.

At step S182, the progress controller 114 determines whether two pieces of information related to each other exist. In one example, the "two pieces of information related to each other" comprises a set of information required for a game progress. Specifically, in a defensive game apparatus 10, when input operation information IINF used for the game progress is stored at the position Pm in the memory area 1321, the progress controller 114 refers to the position Pm in the memory area 1322. Then, when the initial information or the input operation information IINF is stored at the position Pm in the memory area 1322, the progress controller 114 determines that two pieces of information related to each other exist.

When a result of the determination at step S182 is affirmative, the progress controller 114 executes the update process at step S184, and ends the game progress process at the current update timing. In contrast, when the result of the determination at step S182 is negative, the progress controller 114 ends the game progress process at the current update timing without executing the update process at step S184. In other words, the update process at step S184 is not executed until the two pieces of information related to each other (e.g., both (i) the input operation information IINF acquired by the acquirer 111, and (ii) the input operation information IINF received by the information receiver 1121) exist.

At step S184, the progress controller 114 updates a game situation to progress the game, based on the two pieces of information related to each other. In one example, in the first period after the initialization period, the progress controller 114 updates the game situation, based on the set of the initial information and the input operation information IINF, and progresses the game. In the second period after the first period, the progress controller 114 updates the game situation on the basis of the set of (i) the input operation information IINF acquired by the acquirer 111, and (ii) the input operation information IINF received by the information receiver 1121, and progresses the game.

The operations of the game apparatus 10 are not limited to the example shown in FIG. 12. In one example, the process at step S174 may be executed before the process at step S170 or S172. Furthermore, a series of processes at steps S166-S174 may be executed after a series of processes at steps S176-S180, or may be executed in parallel with a series of processes at steps S176-S180.

1.5. Summary of First Embodiment

From the foregoing description, according to the first embodiment, in the initialization period, the storage controller 113 executes an initialization process in which one or more pieces of initial information independent from an input operation made by the user U are stored in either the memory area 1321 or 1322.

When the initial information is stored in the memory area 1322 in the initialization period, the progress controller 114 progresses the game in the first period after the initialization period, based on (i) the input operation information IINF stored in the memory area 1321, and (ii) the initial information stored in the memory area 1322. Thus, in the first period, each of the game apparatuses 10 progresses the game, based on the set of (i) the initial information and (ii) the input operation information IINF of the game apparatus 10. Accordingly, each game apparatus 10 can reflect, in the game progress, an input operation made by the user U of the game apparatus 10 (an input operation indicated by the input operation information IINF of the game apparatus 10) before receiving the input operation information IINF from another game apparatus 10. This enables each game apparatus 10 to reduce delay until content of the input operation is reflected in the game progress, as compared to a conventional game apparatus that does not use initial information for the game progress.

When the initial information is stored in the memory area 1321 in the initialization period, the progress controller 114 progresses the game in the first period, based on (i) the initial information stored in the memory area 1321, and (ii) the input operation information IINF stored in the memory area 1322. This case enables the delay until content of the input operation is reflected in the game progress to be reduced in another game apparatus 10 used by an opponent of the user U of the game apparatus 10. Thus, in the first embodiment, it provides superior real-time performance in either of the two game apparatuses that execute an online competitive game, as compared to a conventional game apparatus.

1.6. Modifications of First Embodiment

The foregoing embodiment may be modified in various ways.

Examples will be given of specific aspects of modifications below. Two or more aspects freely selected from the following examples may be combined as appropriate within the scope, as long as there is no conflict. In the modifications and embodiments shown in the following, elements having the same functions or actions as in the first embodiment are denoted by the same respective reference signs as used for like elements in the description of the first embodiment, and detailed description thereof is omitted where appropriate.

Modification 1.1.

In the foregoing first embodiment, the information transmitter 1122 transmits input operation information IINF to another game apparatus 10 at each update timing. However, the present invention is not limited to such an aspect. In one example, the information transmitter 1122 may wait for a transmission of the input operation information IINF to another game apparatus 10 when the game is not in progress, as shown in FIG. 13.

Figure 13:
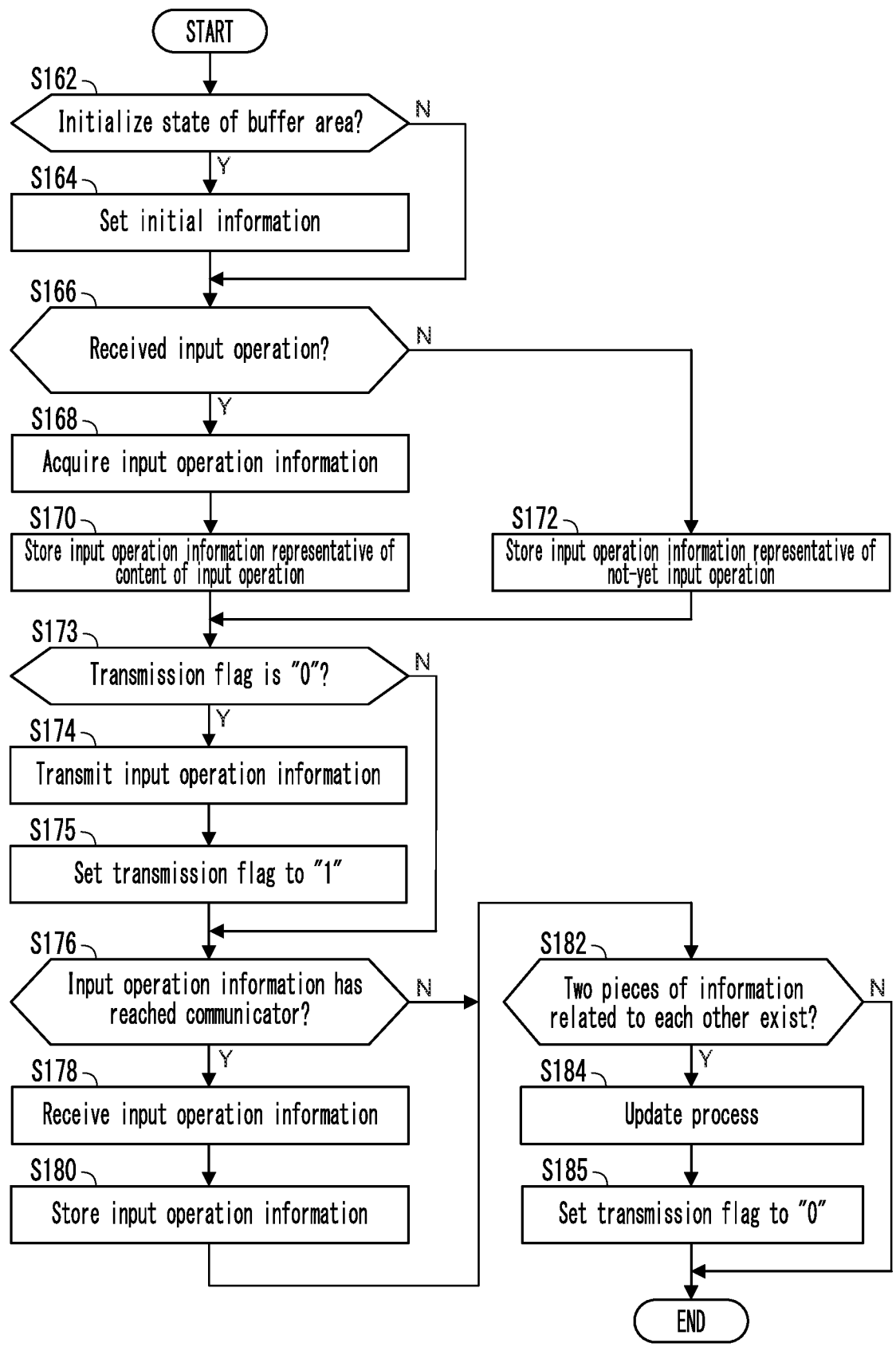
FIG. 13 is a flowchart showing an example game progress process in Modification 1.1.

FIG. 13 is a flowchart showing an example game progress process in Modification 1.1. Operations shown in FIG. 13 are the same as those shown in FIG. 12, except that steps S173, S175 and S185 are added to the operations shown in FIG. 12. For this reason, in FIG. 13, description will focus on each of process at steps S173, S175 and S185.

Step S173 is executed after the process at step S170 or after the process at step S172. In one example, at step S173, the information transmitter 1122 determines whether a transmission flag is "0." The transmission flag refers to a flag representative of whether to transmit input operation information IINF to another game apparatus 10. The initial value is set to "0."

When a result of the determination at step S173 is affirmative, the information transmitter 1122 transmits the input operation information IINF to another game apparatus 10 at step S174, and moves the process to step S175. In contrast, when the result of the determination at step S173 is negative, the information transmitter 1122 moves the process to step S176. In other words, when the transmission flag is "1," the input operation information IINF is not transmitted to the other game apparatus 10 at this update timing.

At step S175, the information transmitter 1122 sets the transmission flag to "1," and moves the process to step S176.

Step S185 is executed after the update process at Step S184. In one example, at step S185, the progress controller 114 sets the transmission flag to "0," and ends the game progress process at this update timing. Accordingly, in the operations shown in FIG. 13, in one example, the transmission flag is "1" at the next update timing following the update timing at which the update process at step S184 has not been executed. Thus, at the next update timing following the update timing at which the update process at step S184 has not been not executed, the information transmitter 1122 does not transmit the input operation information IINF to the other game apparatus 10. In this modification, the same effects as those of the foregoing first embodiment can be obtained.

Modification 1.2.

In the foregoing first embodiment, one or more pieces of initial information independent from an input operation of the user U are stored in either the memory area 1321 or 1322. However, the present invention is not limited to such an aspect. In one example, a case is given in which the storage controller 113 controls writing of the input operation information IINF to the memory areas 1321 and 1322 by use of respective write pointers, and controls reading of the input operation information IINF from the memory areas 1321 and 1322 by use of read pointers. In this case, the storage controller 113 may not store the initial information in either the memory area 1321 or 1322. Specifically, when the storage controller 113-1 of a game apparatus 10-1 controls write positions of the input operation information IINF-1 and IINF-2 with the respective write pointers, the storage controller 113-1 may have one, or more than one offset in the initial value of either of the two write pointers. In this case, when the read pointer is the offset value or less, the progress controller 114-1 of the game apparatus 10-1 may progress the game, based on either the input operation information IINF-1 or IINF-2 (one with no offset in the initial value of the write pointer). Then, when the read pointer is greater than the offset value, the progress controller 114-1 may progress the game, based on the set of the input operation information IINF-1 and IINF-2.

In other words, when the offset value is set to a ("a" is a natural number that is 1 or more), the progress controller 114-1 of the game apparatus 10-1 may progress the game only a times, based on either the input operation information IINF-1 or IINF-2 after the state of the buffer area 132-1 is initialized. Then, after the game is progressed for a times, the progress controller 114-1 may progress the game, based on the input operation information IINF-1 and IINF-2. In this modification, the same effect as that in the foregoing first embodiment can be obtained.

Modification 1.3.

In the foregoing first embodiment, the storage controller 113 executes an initialization process in which initial information is stored in either the memory area 1321 or 1322 in the initialization period. However, the present invention is not limited to such an aspect. In one example, the storage controller 113 may execute an initialization process in which the initial information is stored in the memory area 1321 in the initialization period. Alternatively, the storage controller 113 may execute an initialization process in which the initial information is stored in the memory area 1322 in the initialization period. In this modification, the same effect as that in the foregoing first embodiment can be obtained.

Modification 1.4.

In the foregoing first embodiment, the number of pieces of initial information to be stored in either the memory area 1321 or 1322 may be a predetermined number for each game, or may be variable during the game. In one example, the number of pieces of initial information to be stored in either the memory area 1321 or 1322 may be determined in accordance with communication status between one and another game apparatuses 10. The communication status between one and the other game apparatuses 10 refers to a time taken for communication between one and the other game apparatuses 10, communication speed, presence or absence of communication delay, or degree thereof. In this modification, the same effect as that in the foregoing first embodiment can be obtained. Furthermore, in this modification, the number of pieces of initial information to be stored in either the memory area 1321 or 1322 can be appropriately determined in accordance with the communication status between one and the other game apparatuses 10.

2. Second Embodiment

Description will be given of second embodiment of the present invention.

2.1. Overview of Game System

Figure 14:
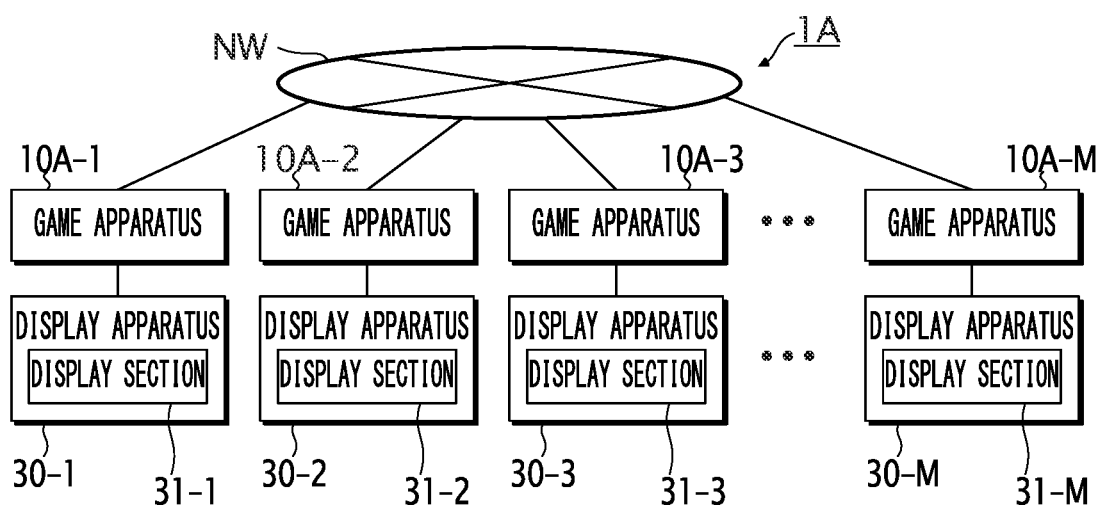
FIG. 14 is an explanatory diagram of an overview of a game system 1A according to second embodiment of the present invention.

FIG. 14 is an explanatory diagram of an overview of a game system 1A according to the second embodiment of the present invention. Elements similar to those described in FIGS. 1 to 13 are denoted by the same reference signs, and detailed description thereof is omitted. The game system 1A is the same as the game system 1 shown in FIG. 1, except that game apparatuses 10A are provided instead of the game apparatuses 10 shown in FIG. 1.

In one example, the game system 1A includes the game apparatuses 10A (10A-1 to 10A-M) executable for a competitive game, and display apparatuses 30 (30-1 to 30-M) provided for the respective game apparatuses 10A (10A-1 to 10A-M). The M is a natural number of two or more. Hereinafter, the m-th game apparatus 10A from among the game apparatuses 10A-1 to 10A-M is occasionally referred to as a game apparatus 10A-$m$ ($m$ is a natural number satisfying $1 \leq m \leq M$).

Figure 15:
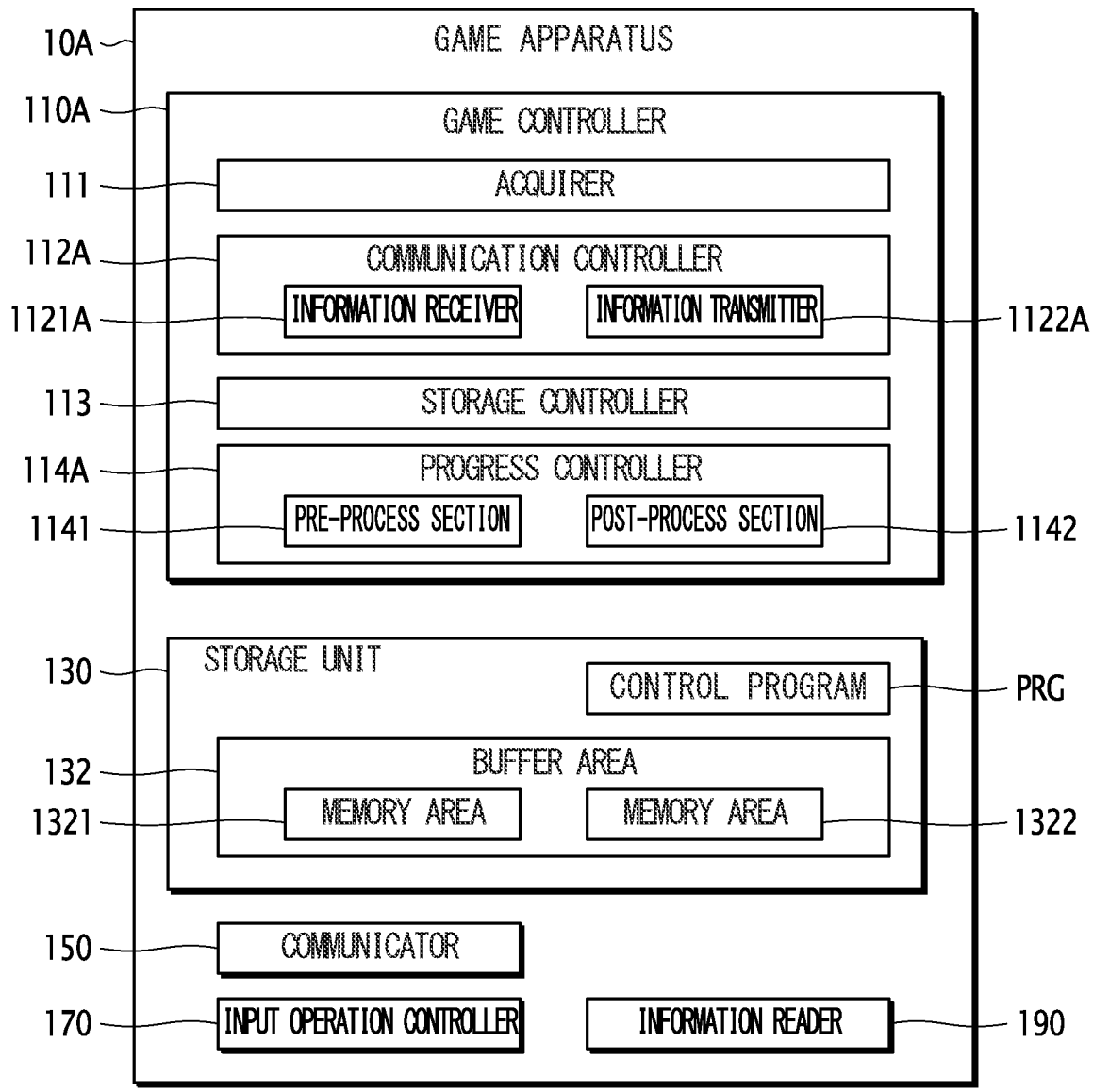
FIG. 15 is a functional block diagram showing an example configuration of each game apparatus 10A.

Next, description will be given of configuration of each of the game apparatuses 10A with reference to FIG. 15.

2.2. Configuration of Game Apparatus FIG. 15 is a functional block diagram showing an example configuration of each of the game apparatuses 10A. Each game apparatus 10A is the same as a game apparatus 10 shown in FIG. 3, except that a game controller 110A is provided instead of the game controller 110 shown in FIG. 3. In one example, each game apparatus 10A includes a game controller 110A, a storage unit 130 for storing various information, a communicator 150 for communicating with external apparatuses, such as display apparatuses 30 and other game apparatuses 10A, an input operation controller 170, such as a game controller for inputting input operation information by a user of the game apparatus 10A, and an information reader 190 for reading information from a recording medium, such as an optical disk.

The game controller 110A controls each part of the game apparatus 10A. Furthermore, the game controller 110A controls progress of a competitive game, such as a baseball game, executed in the game apparatus 10A. In one example, the game controller 110A includes an acquirer 111, a communication controller 112A, a storage controller 113, and a progress controller 114A. In other words, the game controller 110A includes the communication controller 112A instead of the communication controller 112 shown in FIG. 3, and the progress controller 114A instead of the progress controller 114 shown in FIG. 3. Other functions of the game controller 110A are the same as those of the game controller 110 shown in FIG. 3. For this reason, in FIG. 15, description will be focused on the communication controller 112A and the progress controller 114A. First, description will be given of the progress controller 114A.

The progress controller 114A controls a game progress by using the following (i) and (ii): (i) a result synchronization mode (an example of "second progress mode") for progressing the game, based on input operation information IINF acquired by the acquirer 111; and (ii) an input synchronization mode (an example of "first progress mode") for progressing the game, based on the input operation information IINF acquired by the acquirer 111 and input operation information IINF of another game apparatus 10A. In one example, the progress controller 114A switches between the result synchronization mode and the input synchronization mode, in accordance with a game situation to progress the game. In the result synchronized mode, the input operation information IINF of the other game apparatus 10A is not used for the game progress. In other words, the input operation information IINF representative of content of an input operation made by a user U of another game apparatus 10A is not used for the game progress. However, in the result synchronization mode, the game may be progressed based on the result information of the other game apparatus 10A described later.

The game progress in the input synchronization mode corresponds to a game progress by the progress controller 114 shown in FIG. 3 (e.g., the game progress process at step S160 shown in FIG. 11). In other words, the progress controller 114A enables progress the game in the result synchronization mode, and in this regard the progress controller 114A differs from the progress controller 114 shown in FIG. 3. Other operations of the progress controller 114A are the same as those of the progress controller 114 shown in FIG. 3.

In one example, the progress controller 114A includes a pre-process section 1141 and a post-process section 1142. In the result synchronization mode, the pre-process section 1141 progresses the game, based on the input operation information IINF acquired by the acquirer 111. In the result synchronization mode, the result information representative of a result of the game progress by the pre-process section 1141 is transmitted by an information transmitter 1122A described below to another game apparatus 10A.

In the input synchronization mode, the pre-process section 1141 progresses the game, based on the set of (i) the input operation information IINF acquired by the acquirer 111, and (ii) input operation information IINF (input operation information IINF of another game apparatus 10A) received by an information receiver 1121A described below. In the input synchronization mode, a result of the game progress by the pre-process section 1141 may not be notified to another game apparatus 10A.

Here, the "result information" may be information representative of a game situation updated in the "result synchronization mode." In one example, when attention is focused on an offensive game apparatus 10A, the "result information" may be stolen base information for instructing to start stealing a base determined based on input operation information representative of content of a stolen base instruction. In one example, when attention is focused on a defensive game apparatus 10A, the "result information" may be pitching information for instructing to start an operation of the pitcher character Cpt, which performs a pitch in accordance with a "pitch type" and a "course" determined based on input operation information representative of content of a pitch instruction.

The post-process section 1142 progresses the game, based on a result of the game progress by the pre-process section 1141. In the result synchronization mode, when the information receiver 1121A receives result information of another game apparatus 10A, the post-process section 1142 progresses the game, based on the result information of the other game apparatus 10A. In one example, the result information of another game apparatus 10A represents a result of the game progress in the other game apparatus 10A. Accordingly, by progressing the game, based on the result information of another game apparatus 10A, the game apparatus 10A can reflect, in the game progress, the input operation made by the user of the other game apparatus 10A.

Here, the phrase "controlling the game progress" may be a process of updating a game situation at an update timing for progressing the game. Alternatively, the phrase "controlling the game progress" may be a process of determining whether to update a game situation at an update timing for progressing the game. Alternatively, the phrase "controlling the game progress" may be a process for carrying out the following (i) and (ii): (i) determining whether to update a game situation at an update timing for progressing the game; and (ii) updating the game situation when the game situation is updated.

The "result synchronization mode" may be a progress mode, in which, at an update timing for progressing the game, (i) the game situation is updated based on the input operation information IINF when the input operation information IINF is acquired by the acquirer 111, and (ii) the game situation is updated based on the result information when the result information is received by the information receiver 1121A.

The "input synchronization mode" may be a progress mode, in which when input operation information of both of two game apparatuses 10A exists at the update timing to progress the game, the game situation is updated based on the input operation information of both of the two.

The post-process section 1142 causes the display section 31 to display an image IMG representative of a result of the game progress. In one example, the post-process section 1142 causes the display section 31 to display an image IMG corresponding to a game situation updated by the result synchronization mode or the input synchronization mode.

Next, description will be given of the communication controller 112A.

The communication controller 112A includes an information receiver 1121A instead of the information receiver 1121 shown in FIG. 3, and an information transmitter 1122A instead of the information transmitter 1122 shown in FIG. 3. Other functions of the communication controller 112A are the same as those of the communication controller 112 shown in FIG. 3. The information receiver 1121A is the same as the information receiver 1121 shown in FIG. 3, except that the information receiver 1121A receives result information of another game apparatus 10A via the communicator 150.

When the progress controller 114A progresses the game by the result synchronization mode, the information transmitter 1122A transmits, to another game apparatus 10A via the communicator 150, result information representative of a result of the game progress in the progress controller 114A. In one example, the result information representative of the result of the game progress in the progress controller 114A represents a result of the game progress by the pre-process section 1141, as described above. The information transmitter 1122A is the same as the information transmitter 1122 shown in FIG. 3, except that the information transmitter 1122A transmits, to another game apparatus 10A, result information representative of a result of the game progress by the pre-process section 1141. In one example, when the progress controller 114A progresses the game by the input synchronization mode, the information transmitter 1122A transmits the input operation information IINF acquired by the acquirer 111 to another game apparatus 10A via the communicator 150. The configuration of each game apparatus 10A is not limited to the example shown in FIG. 15. The hardware configuration of each game apparatus 10A is the same as that of the game apparatus 10 shown in FIG. 4.

2.3. Operation of Game Apparatus

Description will be given of example operations of each of the game apparatuses 10A with reference to FIGS. 16 to 25. First, description will be given of an overview of the result synchronization mode with reference to FIGS. 16 and 17.

Figure 16:
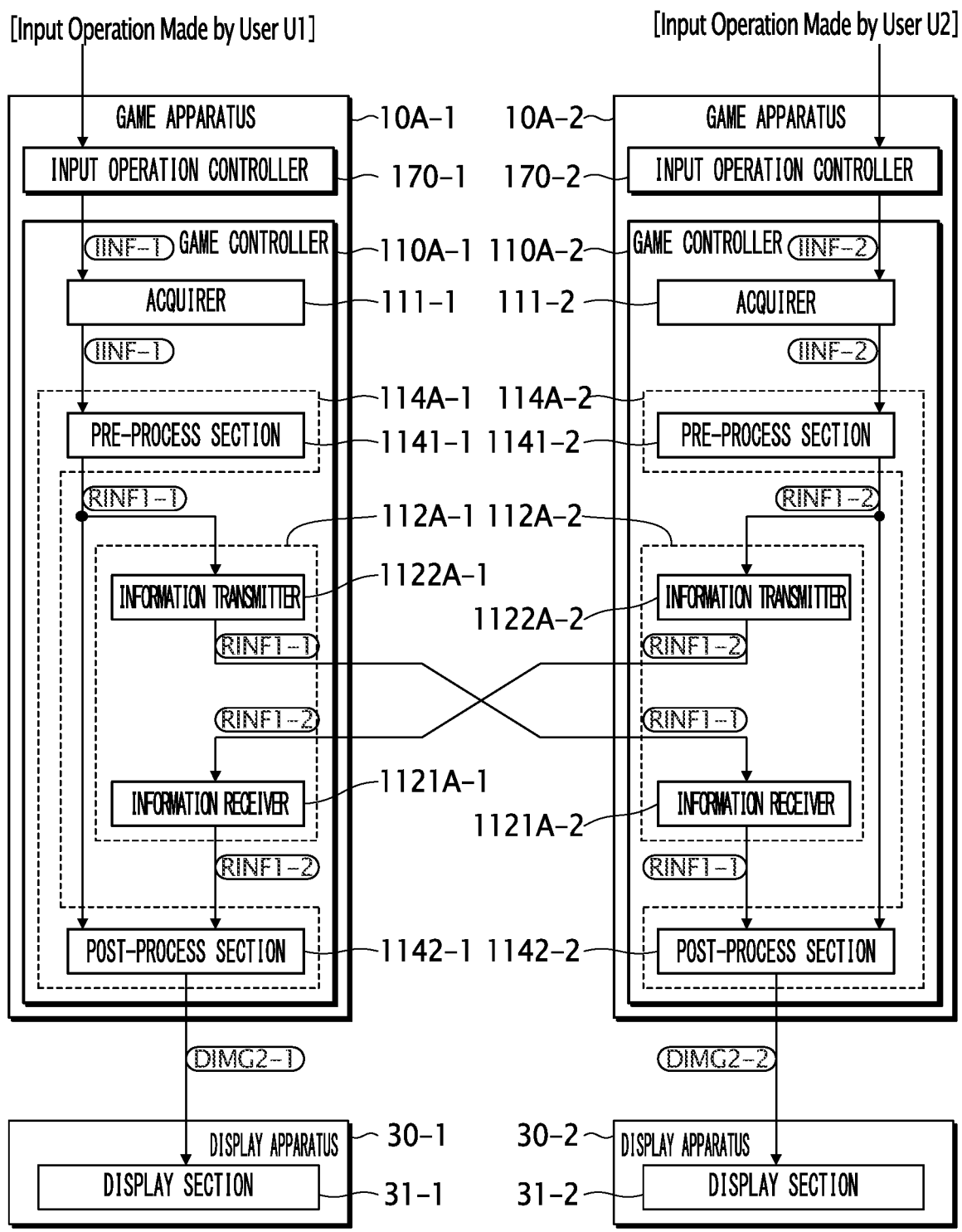
FIG. 16 is an explanatory diagram of a result synchronization mode.

FIG. 16 is an explanatory diagram of the result synchronization mode. In FIG. 16, the flow of information, such as input operation information IINF (IINF-1 and IINF-2) and result information RINF (RINF-1 and RINF-2), is schematically shown. The input operation information IINF-1 refers to input operation information IINF representative of content of an input operation made by a user U1 of a game apparatus 10A-1. The input operation information IINF-2 refers to input operation information IINF representative of content of an input operation made by a user U2 of a game apparatus 10A-2. The result information RINF-1 refers to result information RINF representative of a result of a game progress in the game apparatus 10A-1. The result information RINF-2 refers to result information RINF representative of a result of a game progress in the game apparatus 10A-2. Image data DIMG2 (DIMG2-1 and DIMG2-2) represents image data DIMG generated in the result synchronization mode. The image data DIMG2-1 refers to image data DIMG2 of an image IMG displayed on the display section 31-1. The image data DIMG2-2 refers to image data DIMG2 of an image IMG displayed on the display section 31-2.

In FIG. 16, illustrations of the storage unit 130, the communicator 150, and other elements are omitted for the sake of clarity of the flow of information.

When attention is focused on the game apparatus 10A-1, the input operation information IINF-1 is an example of "first input operation information," and the input operation information IINF-2 is an example of "second input operation information." In contrast, when attention is focused on the game apparatus 10A-2, the input operation information IINF-2 is an example of "first input operation information," and the input operation information IINF-1 is an example of "second input operation information." In FIG. 16, attention will focus on operations of the game apparatuses 10A-1 and 10A-2 when the user U1 of the game apparatuses 10A-1 operates the input operation controller 170-1, and description will be given of the flow of the input operation information IINF, etc., until input operations made by the respective users U1 and U2 are reflected in a game progress.

First, when the user U1 of the game apparatus 10A-1 operates the input operation controller 170-1, the acquirer 111-1 acquires, from the input operation controller 170-1, the input operation information IINF-1 representative of content of an input operation made by the user U1. The acquirer 111-1 may acquire the input operation information IINF-1 from the input operation controller 170-1 via the storage unit 130, etc. Then, the acquirer 111-1 outputs the input operation information IINF-1 to the pre-process section 1141-1 of the progress controller 114A-1.

The pre-process section 1141-1 progresses the game, based on the input operation information IINF-1. Then, the pre-process section 1141-1 outputs result information RINF-1 representative of a result of the game progress to the information transmitter 1122A-1 and the post-process section 1142-1. In one example, the pre-process section 1141-1 determines a game situation for a case in which the game is progressed based on the input operation information IINF-1, and outputs the result information RINF-1 representative of the determined game situation (i.e., the result of the game progress) to the information transmitter 1122A-1 and the post-process section 1142-1. The information transmitter 1122A-1 transmits the result information RINF-1 to the game apparatus 10A-2.

The post-process section 1142-1 progresses the game, based on the result information RINF-1. In one example, the post-process section 1142-1 progresses the game such that the game situation is a situation indicated by the result information RINF-1. Then, the post-process section 1142-1 generates, based on a result of the game progress, image data DIMG2-1 of an image IMG to be displayed on the display section 31-1, and outputs the generated image data DIMG2-1 to the display section 30-1. Thus, the image IMG updated in response to the input operation made by the user U1 is displayed on the display section 31-1.

In game apparatus 10A-1, when the game apparatus 10A-2 transmits result information RINF-2, the information receiver 1121A-1 receives the result information RINF-2. Then, the information receiver 1121A-1 outputs the result information RINF-2 to the post-process section 1142-1 of the progress controller 114A-1. In one example, when the preprocess section 1141-2 of the game apparatus 10A-2 progresses the game, based on the input operation information IINF-2, the result information RINF-2 is transmitted from the game apparatus 10A-2 to the game apparatus 10A-1.

The post-process section 1142-1 progresses the game, based on the result information RINF-2. Then, the post-process section 1142-1 generates, based on the result of the game progress, the image data DIMG2-1 of the image IMG to be displayed on the display section 31-1, and outputs the generated image data DIMG2-1 to the display section 30-1.

Thus, the image IMG updated in response to the input operation made by the user U2 is displayed on the display section 31-1.

The transfer of information, such as the input operation information IINF (IINF-1 and IINF-2) and the result information RINF (RINF-1 and RINF-2), may be executed via the storage unit 130, etc. Description of the operation of the game apparatus 10A-2 is given by switching the numerical signs "1" and "2" with each other (the numerical signs after the hyphen), each of which is provided at the end of the reference sign of the game apparatus 10A, etc., in the description of the game apparatus 10A-1.

Next, description will be given of the result synchronization mode in the game apparatuses 10A-1 and 10A-2 with reference to FIG. 17.

Figure 17:
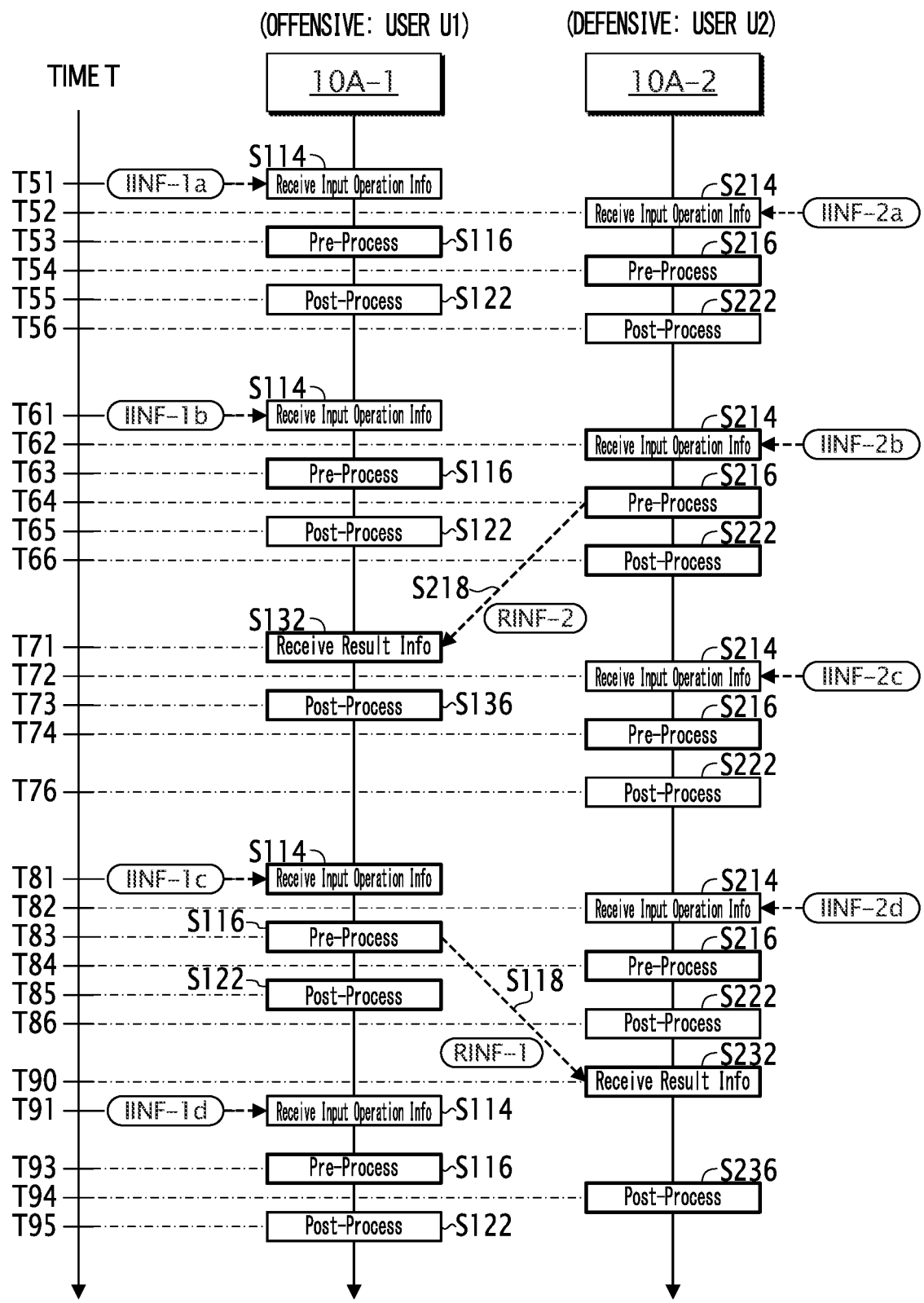
FIG. 17 is a sequence chart showing example operations in the result synchronization mode of the game system 1A.

FIG. 17 is a sequence chart showing example operations in the result synchronization mode of the game system 1A. In FIG. 17, similarly to FIG. 6, a lowercase letter (a, b, c, or d) is added to the end of each of the reference signs to distinguish pieces of input operation information IINF-1 from each other. Similarly, a lowercase letter (a, b, c or d) is added to the end of each of the reference signs to distinguish pieces of input operation information IINF-2 from each other. Acquisition processes (S114 and S214) of input operation information shown in FIG. 17 refer to processes executed by the acquirer 111. Pre-process (S116 and S216) refer to processes executed by the pre-process section 1141. Post-processes (S122 and S222) are processes executed by the post-process section 1142.

In FIG. 17, an interval between two consecutive times in times T53, T63, T73, T83 and T93 corresponds to a cycle of an update timing of the game in the game apparatus 10A-1. An interval between two consecutive times in times T54, T64, T74, T84 and T94 corresponds to a cycle of an update timing of the game in the game apparatus 10A-2. In the example shown in FIG. 17, a time at which the game is updated in the game apparatus 10A-2 is later than a time at which the game is updated in the game apparatus 10A-1. The time at which the game is updated in the game apparatus 10A-2 may be prior to the time at which the game is updated in the game apparatus 10A-1, or may be at the same time as the time at which the game is updated in the game apparatus 10A-1.

In FIG. 17, description will be given of a case as follows: (i) an input operation indicated by input operation information IINF-1c corresponds to an input operation that is reflected in a game progress in the game apparatus 10A-2, and (ii) an input operation indicated by input operation information IINF-2b corresponds to an input operation that is reflected in a game progress in the game apparatus 10A-1. In other words, it is not required to reflect input operations indicated by the respective pieces of input operation information IINF-1a, IINF-1b, and IINF-1d in the game apparatus 10A-2. Furthermore, it is not required to reflect input operations indicated by the respective pieces of input operation information IINF-2a, IINF-2c, and IINF-2d in the game apparatus 10A-1.

First, at time T51, the acquirer 111-1 of the game apparatus 10A-1 acquires input operation information IINF-1a (S114). Then, at time T53, the pre-process section 1141-1 progresses the game, based on the input operation information IINF-1a (S116). At time T55, the post-process section 1142-1 progresses the game, based on a result of the game progress by the pre-process section 1141-1 (S122). Thus, the in game apparatus 10A-1, the game situation is updated to a situation corresponding to the input operation information IINF-1a.

At time T52, the acquirer 111-2 of the game apparatus 10A-2 acquires input operation information IINF-2a (S214). Then, at time T54, the pre-process section 1141-2 progresses the game, based on the input operation information IINF-2a (S216). At time T56, the post-process section 1142-2 progresses the game, based on a result of the game progress by the pre-process section 1141-2 (S222). Thus, in the game apparatus 10A-2, the game situation is updated to a situation corresponding to the input operation information IINF-2a.

Operations carried out by the game apparatus 10A-1 at times T61, T63 and T65 are the same as those at times T51, T53 and T55, except that input operation information IINF-1b is acquired instead of the input operation information IINF-1a.

Operations carried out by the game apparatus 10A-2 at times T62, T64, and T66 are the same as those at times T52, T54, and T56, except that input operation information IINF-2b is acquired instead of the input operation information IINF-2a. However, the input operation indicated by the input operation information IINF-2b is reflected in the game progress in the game apparatus 10A-1. Accordingly, at time T64, when the pre-process section 1141-2 progresses the game, based on the input operation information IINF-2b (S216), the information transmitter 1122A-2 transmits result information RINF-2 to the game apparatus 10A-1 (S218).

Then, at time T71, the information receiver 1121A-1 of the game apparatus 10A-1 receives the result information RINF-2 (S132). Thus, at time T73, the post-process section 1142-1 progresses the game, based on the result information RINF-2 (S136). Thus, in the game apparatus 10A-1, the game situation is also updated to a situation corresponding to the input operation information IINF-2b. In other words, in the game apparatus 10A-1, at time T65, an image IMG, which corresponds to the game situation updated in response to the input operation information IINF-1b, is displayed on display section 31-1. At time T73, an image IMG, which corresponds to the game situation updated in accordance with the input operation information IINF-2b, is displayed on the display section 31-1.

Operations carried out by the game apparatus 10A-2 at times T72, T74, and T76 are the same as those at times T52, T54, and T56, except that input operation information IINF-2c is acquired instead of the input operation information IINF-2a.

Operations carried out by the game apparatus 10A-1 at times T81, T83 and T85 are the same as those at times T51, T53 and T55, except that input operation information IINF-1c is acquired instead of the input operation information IINF-1a. However, the input operation indicated by the input operation information IINF-1c is reflected in the game apparatus 10A-2. Accordingly, at time T83, when the pre-process section 1141-1 progresses the game, based on the input operation information IINF-1c (S116), the information transmitter 1122A-1 transmits result information RINF-1 to the game apparatus 10A-2 (S118).

Then, at time T90, the information receiver 1121A-2 of the game apparatus 10A-2 receives the result information RINF-1 (S232). Thus, at time T94, the post-process section 1142-2 progresses the game, based on the result information RINF-1 (S236). Thus, in the game apparatus 10A-2, the game situation is also updated to a situation corresponding to the input operation information IINF-1c. In other words, in the game apparatus 10A-2, at time T86, an image IMG corresponding to the game situation updated in accordance with the input operation information IINF-2d is displayed on the display section 31-2. At time T94, an image IMG corresponding to a game situation updated in response to the input operation information IINF-1c is displayed on the display section 31-2.

Operations carried out by the game apparatus 10A-1 at times T91, T93 and T95 are the same as those at times T51, T53 and T55, except that input operation information IINF-1d is acquired instead of the input operation information IINF-1a. As shown in FIG. 17, in the result synchronization mode, the input operation information IINF of another game apparatus 10A is not used for the game progress. Accordingly, in the result synchronization mode, as compared to an input synchronization mode in which input operation information IINF of another game apparatus 10A is used for a game progress, it allows for reduction of delay from an acquisition of the input operation information IINF by the acquirer 111 to the update of the image IMG displayed on the display section 31.

The input operations of the game system 1A in the result synchronization mode is not limited to the example shown in FIG. 17. In one example, at an update timing, the progress controller 114A may progress the game, based on both (i) the input operation information IINF acquired by the acquirer 111, and (ii) the result information RINF received by the information receiver 1121A. In one example, a case is given in which the game is progressed in game apparatus 10A-1, based on the input operation information IINF-1 representative of content of input operations that are not required to be reflected in the game apparatus 10A-2. In this case, processes (e.g., generation of image data DIMG2-1) carried out by the post-process section 1142-1 may be executed by the pre-process section 1141-1.

Operations of the game system 1A in the input synchronization mode is the same as those of the game system 1 shown in FIG. 1 (e.g., the operations described in FIGS. 5 and 6). In one example, when the game is progressed in the input synchronization mode, the progress controller 114A-1 updates the game situation, based on (i) either the input operation information IINF-1 or IINF-2, and (ii) the initial information, in the first period after the initialization period. Then, in the second period after the first period, the progress controller 114A-1 updates the game situation, based on the set of the input operation information IINF-1 and IINF-2. Similarly, when the game is progressed in the input synchronization mode, the progress controller 114A-2 updates the game situation, based on (i) either the input operation information IINF-1 or IINF-2, and (ii) the initial information, in the first period after the initialization period. Then, in the second period after the first period, the progress controller 114A-2 updates the game situation, based on the set of the input operation information IINF-1 and IINF-2. Accordingly, in the input synchronization mode, the game situations are identical between the game apparatuses 10A-1 and 10A-2.

In the result synchronization mode shown in FIG. 17, in one example, at time T73, the game situation of the game apparatus 10A-1 is updated to a situation corresponding to the input operation information IINF-2b. However, the following (i) and (ii) are not always identical to each other: (i) a game situation of the game apparatus 10A-1 in a period from time T61 to time T65; and (ii) a game situation of the game apparatus 10A-2 in a period from time T52 to time T56. Accordingly, the result synchronization mode is not suitable for executing an event having a premise that positions and states (game situations) of characters and objects, etc., are identical between the game apparatuses 10A-1 and 10A-2.

In contrast, as described above, in the input synchronization mode, the game situations are identical between the game apparatuses 10A-1 and 10A-2. Accordingly, the input synchronization mode is suitable for executing an event having a premise that positions and states of characters and objects, etc., are identical between the game apparatuses 10A-1 and 10A-2. Here, an example case is given in which the game executed by the game apparatus 10-A is a baseball game. In this case, the event, which has a premise that positions and states (game situations) of characters and objects, etc., are identical between the game apparatuses 10A-1 and 10A-2, corresponds to an event in which a stolen base is blocked prior to a pitch.

In addition, in the input synchronization mode, each of the game apparatuses 10A-1 and 10A-2 progresses the game, when both of the following (a) and (b) exist: (a) the input operation information IINF-1 of the game apparatus 10A-1; and (b) the input operation information IINF-2 of the game apparatus 10A-2. In other words, each of the game apparatuses 10A-1 and 10A-2 waits for the game progress until both of the above (a) and (b) exist. Accordingly, the degree of difference in the game progress between the two game apparatuses (10A-1 and 10A-2) in the input synchronization mode is the same, or is less than those in the result synchronization mode.

Next, description will be given of operations of the game apparatuses 10A-1 and 10A-2 when the game system 1A executes a baseball game with reference to FIG. 18. Hereinafter, an example will be given in which attention is focused on a scene in which an attempt is made to steal a base, and description will be given of operations of the game apparatus 10A. Detailed description of the baseball game in general will be omitted.

Figure 18:
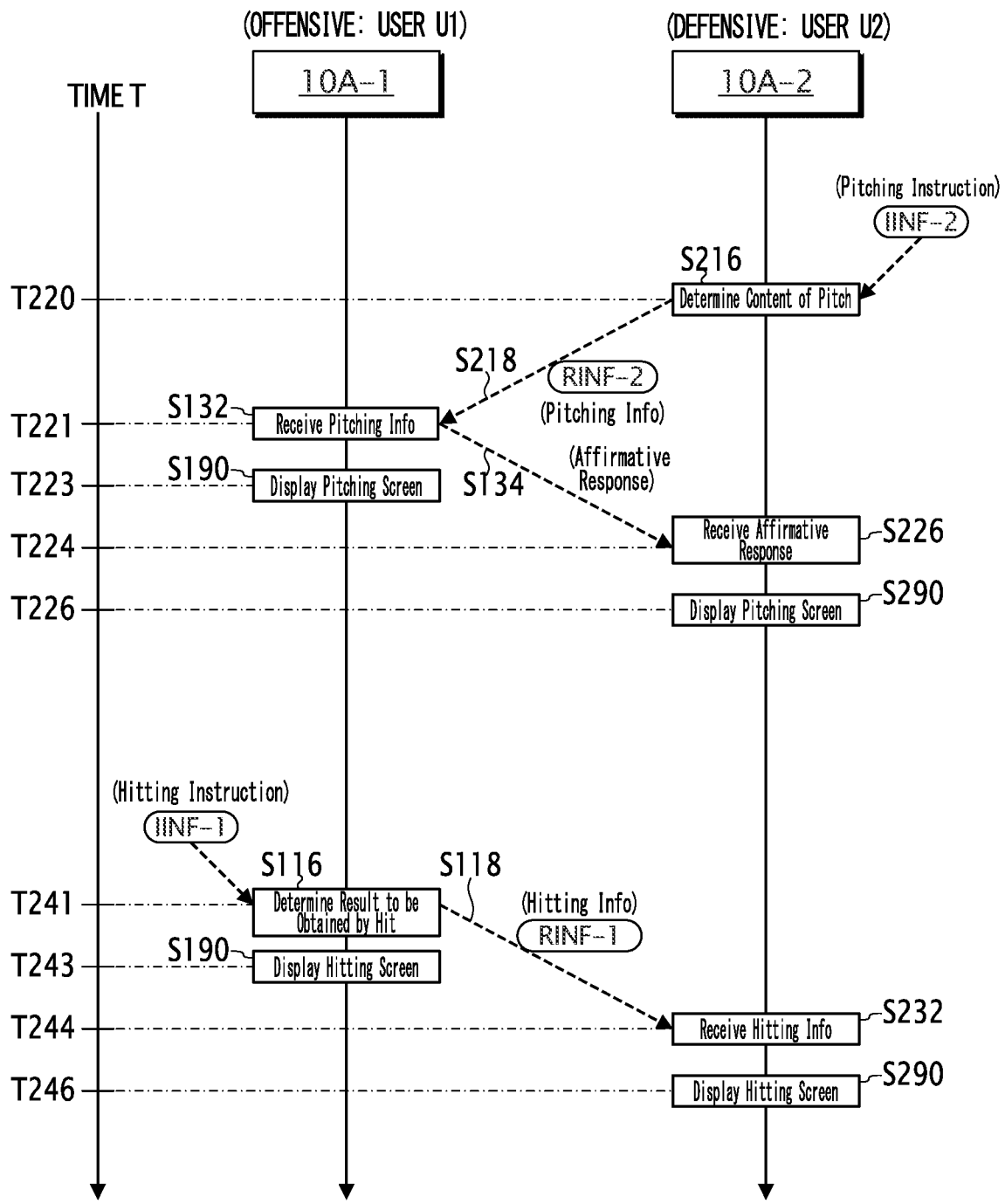
FIG. 18 is a sequence chart showing example operations of the game system 1A for executing a baseball game.

FIG. 18 is a sequence chart showing example operations of the game system 1A for executing a baseball game. In FIG. 18, a sequence chart of example operations of the game apparatuses 10A-1 and 10A-2 is shown in which the batter character Cbt is operated by the user U1 of the game apparatus 10A-1, and the pitcher character Cpt is operated by the user U2 of the game apparatus 10A-2. In the example shown in FIG. 18, the game apparatuses 10A-1 and 10A-2 progress the game situation in the period from a pitching performed by the pitcher character Cpt to the ball object Ob1 being hit by the batter character Cbt in the result synchronization mode. Steps similar to those described in FIG. 17 are denoted by the same reference signs used in FIG. 17.

First, at time T220, when the acquirer 111-2 of the game apparatus 10A-2 acquires input operation information IINF-2 representative of a pitching instruction, the pre-process section 1141-2 of the progress controller 114A-2 determines content of a pitch, such as "pitch type" and "course," based on the input operation information IINF-2 (S216). Then, the information transmitter 1122A-2 transmits pitching information as the result information RINF-2 to the game apparatus 10A-1 (S218). The pitching information represents an instruction for an operation of the pitcher character Cpt, which starts a pitch in accordance with the pitching information that is determined based on the input operation information IINF-2. A process of determining content of the pitch corresponds to a process of the game progress. Hereinafter, the pitching information may be occasionally referred to as "pitching information RINF-2," using the same reference sign as the result information RINF-2.

At time T221, the information receiver 1121A-1 of the game apparatus 10A-1 receives pitching information RINF-2 (S132). Then, the information transmitter 1122A-1 transmits, to the game apparatus 10A-2, an affirmative response representative of the game being proceeded based on the pitching information RINF-2 (S134). The post-process section 1142-1 of the progress controller 114A-1 progresses the game, based on the pitching information RINF-2.

At time T223, the progress controller 114A-1 of the game apparatus 10A-1 causes the display section 31-1 to display a pitching screen representative of the game situation updated based on the pitching information RINF-2 (S190). Thus, the pitcher character Cpt, which performs a pitch in accordance with content of the pitching that is determined based on the input operation information IINF-2, is displayed on the display section 31-1.

At time T224, the information receiver 1121A-2 of the game apparatus 10A-2 receives the affirmative response to the pitching information RINF-2 (S226). Thus, the post-process section 1142-2 of the progress controller 114A-2 progresses the game, based on the pitching information RINF-2. In one example, the post-process section 1142-2 causes the pitcher character Cpt to start a pitch based on the pitching information RINF-2.

At time T226, the progress controller 114A-2 of the game apparatus 10A-2 causes the display section 31-2 to display a pitching screen representative of the game situation updated based on the pitching information RINF-2 (S290). Thus, the pitcher character Cpt, which performs a pitch in accordance with content of the pitching determined based on the input operation information IINF-2, is displayed on the display section 31-2.

At time T241, when the acquirer 111-1 of the game apparatus 10A-1 acquires input operation information IINF-1 representative of a hitting instruction, the pre-process section 1141 of the progress controller 114A-1 determines a result to be obtained by the hit performed by the batter character Cbt, based on the input operation information IINF-1 (S116). Then, the information transmitter 1122A-1 transmits, to the game apparatus 10A-2 as a result information RINF-1, hitting information representative of a result to be obtained by the hit that is determined based on the input operation information IINF-1 (S118). A process of determining a result to be obtained by a hit corresponds to a process of the game progress. Hereinafter, the hitting information may occasionally be referred to as "hitting information RINF-1," using the same reference sign as the result information RINF-1.

At time T243, the progress controller 114A-1 of the game apparatus 10A-1 causes the display section 31-1 to display a hitting screen representative of the game situation updated based on the hitting information RINF-1 (S190). Thus, the batter character Cbt, which executes a hit based on the input operation information IINF-1, is displayed on the display section 31-1.

At time T244, the information receiver 1121A-2 of the game apparatus 10A-2 receives hitting information RINF-1 (S232). Thus, the post-process section 1142-2 of the progress controller 114A-2 progresses the game, based on the hitting information RINF-1.

At time T246, the progress controller 114A-2 of the game apparatus 10A-2 causes the display section 31-2 to display a hitting screen representative of the game situation updated based on the hitting information RINF-1 (S290). Thus, the batter character Cbt, which executes a hit based on the input operation information IINF-1, is displayed on the display section 31-2.

Next, description will be given of operations of the game apparatuses 10A-1 and 10A-2 when a stolen base instruction is executed, with reference to FIG. 19.

Figure 19:
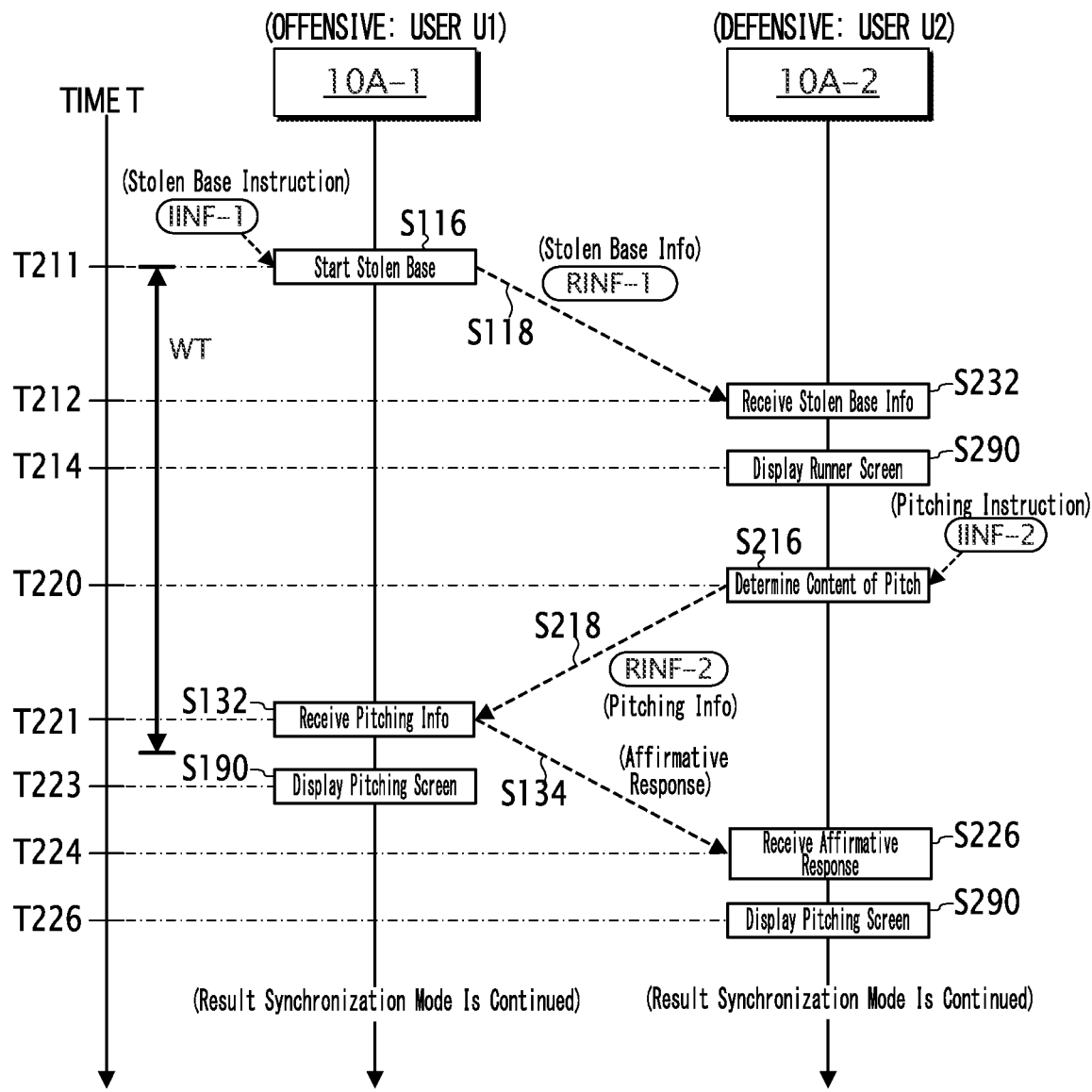
FIG. 19 is a sequence chart showing other example operations of the game system 1A for executing the baseball game.

FIG. 19 is a sequence chart showing other example operations of the game system 1A for executing the baseball game. Operations shown in FIG. 19 are the same as those shown in FIG. 18, except that the stolen base instruction is executed. Detailed description of the operations shown in FIG. 18 is omitted. In an example shown in FIG. 19, the stolen base instruction made by the user U1 is input before the pitcher character Cpt, which is displayed on the display 31-1, starts a pitch.

First, at time T211, when the acquirer 111-1 of the game apparatus 10A-1 acquires input operation information IINF-1 representative of a stolen base instruction, the pre-process section 1141-1 of the progress controller 114A-1 progresses the game, based on the input operation information IINF-1, such that the runner character Crn starts to steal a base (S116). Then, the information transmitter 1122A-1 transmits, to the game apparatus 10A-2 as the result information RINF-1, stolen base information representing that the stolen base based on the input operation information IINF-1 is started (S118). Furthermore, the progress controller 114A-1 starts to measure an elapsed time, as initiated by the input operation information IINF-1 representative of the stolen base instruction being acquired by the acquirer 111-1. Hereinafter, the stolen base information is occasionally referred to as "stolen base information RINF-1," using the same reference sign as the result information RINF-1.

At time T212, the information receiver 1121A-2 of the game apparatus 10A-2 receives the stolen base information RINF-1 (S232). Then, at time T214, the post-process section 1142-2 of the progress controller 114A-2 progresses the game, based on the stolen base information RINF-1. In one example, the progress controller 114A-2 causes the display section 31-2 to display a runner screen representative of the game situation updated based on the stolen base information RINF-1 (S290). Thus, on the display section 31-2 are displayed a window WD that includes the runner character Crn that executes stealing the base based on the input operation information IINF-1, and the pitcher character Cpt that has not been yet performed a pitch. By checking the window WD, the user U2 is able to know that the runner character Crn has started to steal a base.

Description will be given of a case in which the user U2 makes the pitcher character Cpt perform a pitch without notifying of a stolen base, as shown in FIG. 19. This description also applies to a case in which the user U2 is aware of a stolen base, but does not peg the runner character Crn that attempts to steal a base.

At time T220, when the acquirer 111-2 acquires the input operation information IINF-2 representative of a pitching instruction, the pre-process section 1141-2 determines content of a pitch, based on input operation information IINF-2 (S216). Then, the information transmitter 1122A-2 transmits pitching information RINF-2 to the game apparatus 10A-1 (S218).

At time T221, the information receiver 1121A-1 of the game apparatus 10A-1 receives the pitching information RINF-2 (S132). In an example shown in FIG. 19, a period from time T211 to time T221 is shorter than the waiting period WT for switching. The former time T211 represents a time at which the progress controller 114A-1 starts to measure the elapsed time. The later time T221 represents a time at which the information receiver 1121A-1 receives the pitching information RINF-2. In other words, the information receiver 1121A-1 receives the pitching information RINF-2 in the period from time T211, which is the timing of the input operation information IINF-1 acquired by the acquirer 111-1, until the waiting period WT for switching elapses. Accordingly, the progress controller 114A-1 continues the game progress in the result synchronization mode. In one example, the information transmitter 1122A-1 transmits, to the game apparatus 10A-2, an affirmative response representative of progressing the game based on the pitching information RINF-2 (S134).

In an example shown in FIG. 19, the game continues to progress in the result synchronization mode, so that operations of the game apparatuses 10A-1 and 10A-2 after time T220 are the same as those shown in FIG. 18. In other words, in an example shown in FIG. 19, an event of blocking a stolen base does not occur before a pitch.

Next, description will be given of operations of the game apparatuses 10A-1 and 10A-2 when the game progress switches from the result synchronization mode to the input synchronization mode, with reference to FIG. 20.

Figure 20:
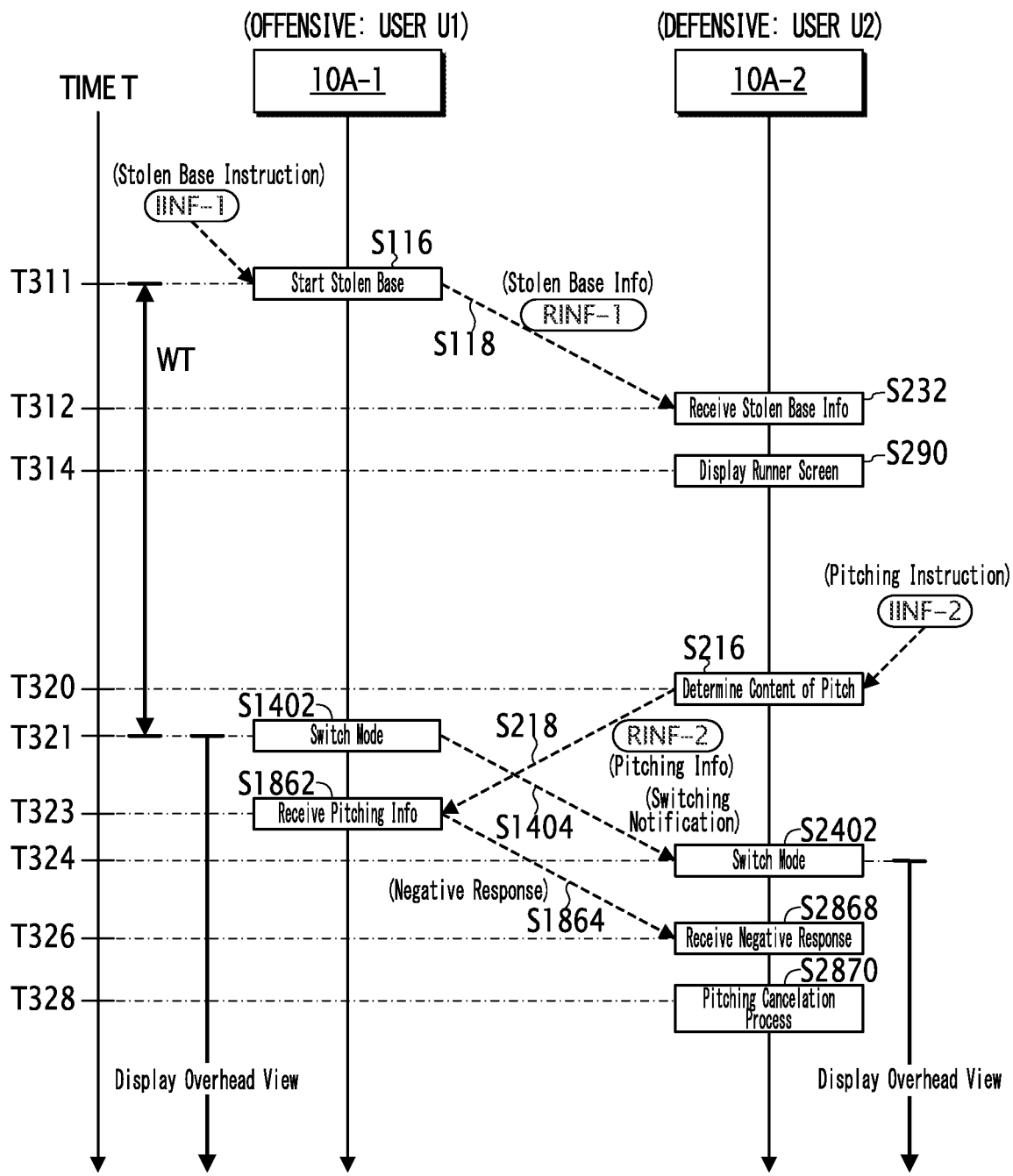
FIG. 20 is a sequence chart showing other of operations of the game system 1A for executing the baseball game.

FIG. 20 is a sequence chart showing other example operations of the game system 1A for executing the baseball game. Operations shown in FIG. 20 are the same as those shown in FIG. 19, except that the game progress is switched from the result synchronization mode to the input synchronization mode. Detailed description of the operations shown in FIG. 19 is omitted.

A sequence of operations of the game apparatuses 10A-1 and 10A-2 at times T311, T312 and T314 is the same as that at times T211, T212 and T214 shown in FIG. 19. In one example, at time T314, the progress controller 114A-2 of the game apparatus 10A-2 causes the display section 31-2 to display a runner screen representative of the game situation updated based on the stolen base information RINF-1 (S290).

At time T320, when the acquirer 111-2 of the game apparatus 10A-2 acquires input operation information IINF-2 representative of a pitching instruction, the pre-process section 1141-2 determines content of the pitch, based on the input operation information IINF-2 (S216). Then, the information transmitter 1122A-2 transmits the pitching information RINF-2 to the game apparatus 10A-1 (S218).

The pitching information RINF-2 transmitted from the game apparatus 10A-2 reaches the game apparatus 10A-1 at time T323. Time T323 represents a time later than time T321 at which the waiting period WT for switching has elapsed from time T311, which is the acquisition timing of the input operation information IINF-1 by the acquirer 111-1 of the game apparatus 10A-1.

Accordingly, the progress controller 114A-1 switches the game progress from the result synchronization mode to the input synchronization mode at time T321, at which the waiting period WT for switching has elapsed from time T311 (S1402). In other words, the progress controller 114A-1 switches the game progress from the result synchronization mode to the input synchronization mode, when the pitching information RINF-2 is not received by the information receiver 1121A-1 by the time at which the waiting period WT for switching elapses from the timing of acquisition of the input operation information IINF-1 by the acquirer 111-1. Since the game progress has been switched from the result synchronous mode to the input synchronous mode, the progress controller 114A-1 causes the display section 31-1 to display an image of an overhead view of the virtual space related to the game, for example. Furthermore, the information transmitter 1122A-1 transmits, to the game apparatus 10A-2, a notification of switching the game progress from the result synchronization mode to the input synchronization mode (S1404).

Since the game progress has been switched from the result synchronization mode to the input synchronization mode at time T321, the storage controller 113-1 executes an initialization process for storing the initial information in the memory area 1321-1 in the initialization period at the time after time T321.

At time T323, as described above, the information receiver 1121A-1 receives the pitching information RINF-2 (S1862). The game apparatus 10A-1 transmits, to the game apparatus 10A-2, a notification of cancelling the game progress based on the pitching information RINF-2, since the game has been progressing in the input synchronization mode. In one example, the information transmitter 1122A-1 transmits, to the game apparatus 10A-2, a negative response to the pitching information RINF-2 (S1864).

At time T324, the information receiver 1121A-2 of the game apparatus 10A-2 receives a switching notification of switching the game progress from the result synchronization mode to the input synchronization mode. Thus, the progress controller 114A-2 switches the game progress from the result synchronization mode to the input synchronization mode (S2402). The progress controller 114A-2 switches the game progress from the result synchronous mode to the input synchronous mode, and thereby the progress controller 114A-2 causes the display section 31-2 to display an image of an overhead view of the virtual space related to the game, for example.

Since the game progress has switched from the result synchronization mode to the input synchronization mode at time T324, the storage controller 113-2 executes an initialization process for storing the initial information in the memory area 1322-2 in the initialization period after time T324.

At time T326, the information receiver 1121A-2 of the game apparatus 10A-2 receives a negative response to the pitching information RINF-2 (S2868). Thus, the progress controller 114A-2 cancels the pitch based on the pitching information RINF-2 at time T328 (S2870). In other words, the progress controller 114A-2 cancels the game progress, based on the pitching information RINF-2.

The game progresses is switched from the result synchronized mode to the input synchronized mode, and thereby, the positions and states of the runner character Cm, the pitcher character Cpt, the ball object Ob1, etc., are identical between the game apparatuses 10A-1 and 10A-2. Thus, the user U1 of the game apparatus 10A-1 is able to make a decision on whether to advance by a stolen base on the basis of the condition of the pitcher character Cpt. In contrast, the user U2 of the game apparatus 10A-2 is able to determine where the user makes the pitcher character Cpt throw the ball object Ob1 on the basis of the condition of the runner character Cm.

Next, description will be given of an operational flow of the game apparatus 10A with reference to FIG. 21.

Figure 21:
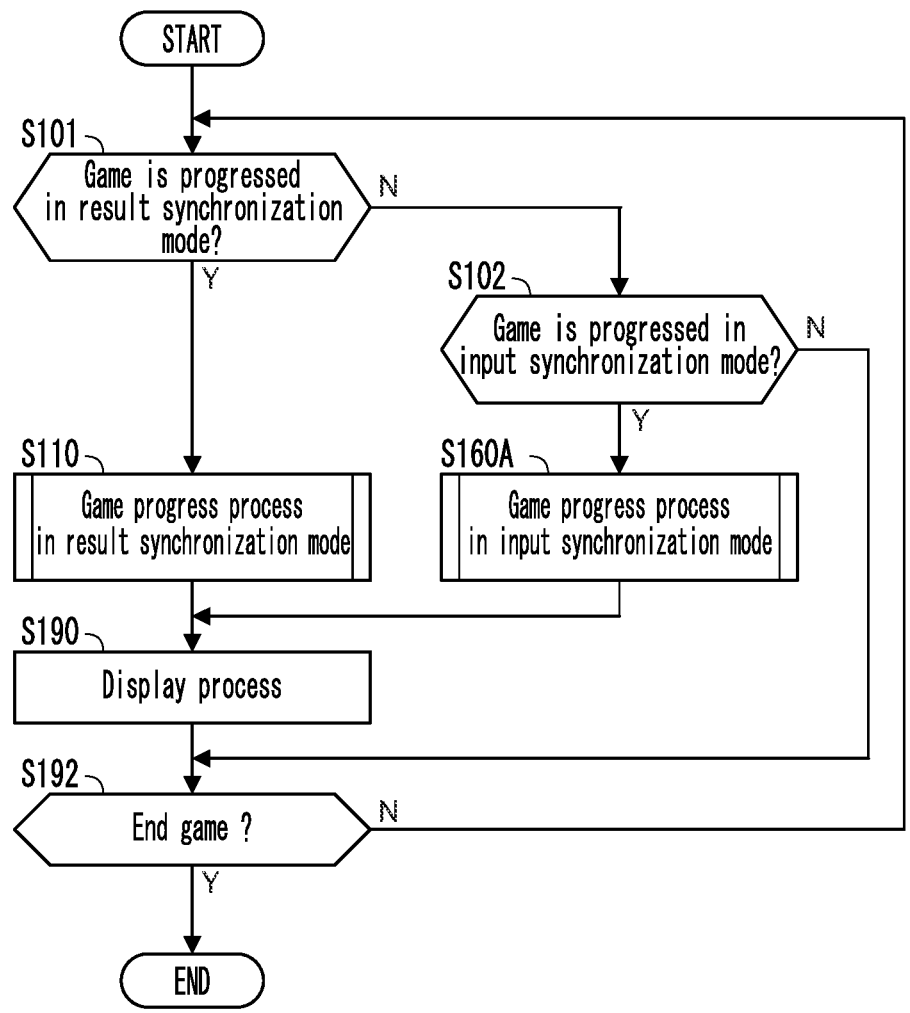
FIG. 21 is a flowchart showing example operations of each game apparatus 10A.

FIG. 21 is a flowchart showing example operations of each of the game apparatuses 10A. Operations shown in FIG. 21 are executed in accordance with an update timing for progressing the game. In one example, the operations shown in FIG. 21 are repeated in the same cycle as the cycle of the update timing. Steps similar to those shown in FIG. 18 are denoted by the same reference signs used in FIG. 18.

First, at step S101, the progress controller 114A determines whether the game is being progressed in the result synchronization mode. When a result of the determination at step S101 is affirmative, the progress controller 114A executes the game progress process in the result synchronization mode at step S110, and then move the process to step S190. A game progress process in the result synchronization mode will be described in detail with reference to FIGS. 22 and 23, which will be described later. In contrast, when the result of the determination at step S101 is negative, the progress controller 114A moves the process to step S102.

At step S102, the progress controller 114A determines whether to progress the game in the input synchronization mode. The determination at step S102 corresponds to the determination at step S100 shown in FIG. 11. When a result of the determination at step S102 is affirmative, the progress controller 114A executes the game progress process at step S160A, and then moves the process to step S190. In contrast, when the result of the determination at step S102 is negative, the progress controller 114A moves the process to step S192. A game progress process in the input synchronization mode will be described in detail with reference to FIGS. 24 and 25, which will be described later.

At step S190, the progress controller 114A causes the display section 31 to display an image IMG representative of the result of the game progress carried out by the process at step S110 or at step S160A.

Next, at step S192, the progress controller 114A determines whether to end the game. When a result of the determination at step S192 is affirmative, the progress controller 114A ends the game. In contrast, when the result of the determination at step S192 is negative, the progress controller 114A returns the process to step S101, and continues the game.

Next, description will be given of the game progress process in the result synchronization mode with reference to FIGS. 22 and 23.

Figure 22:
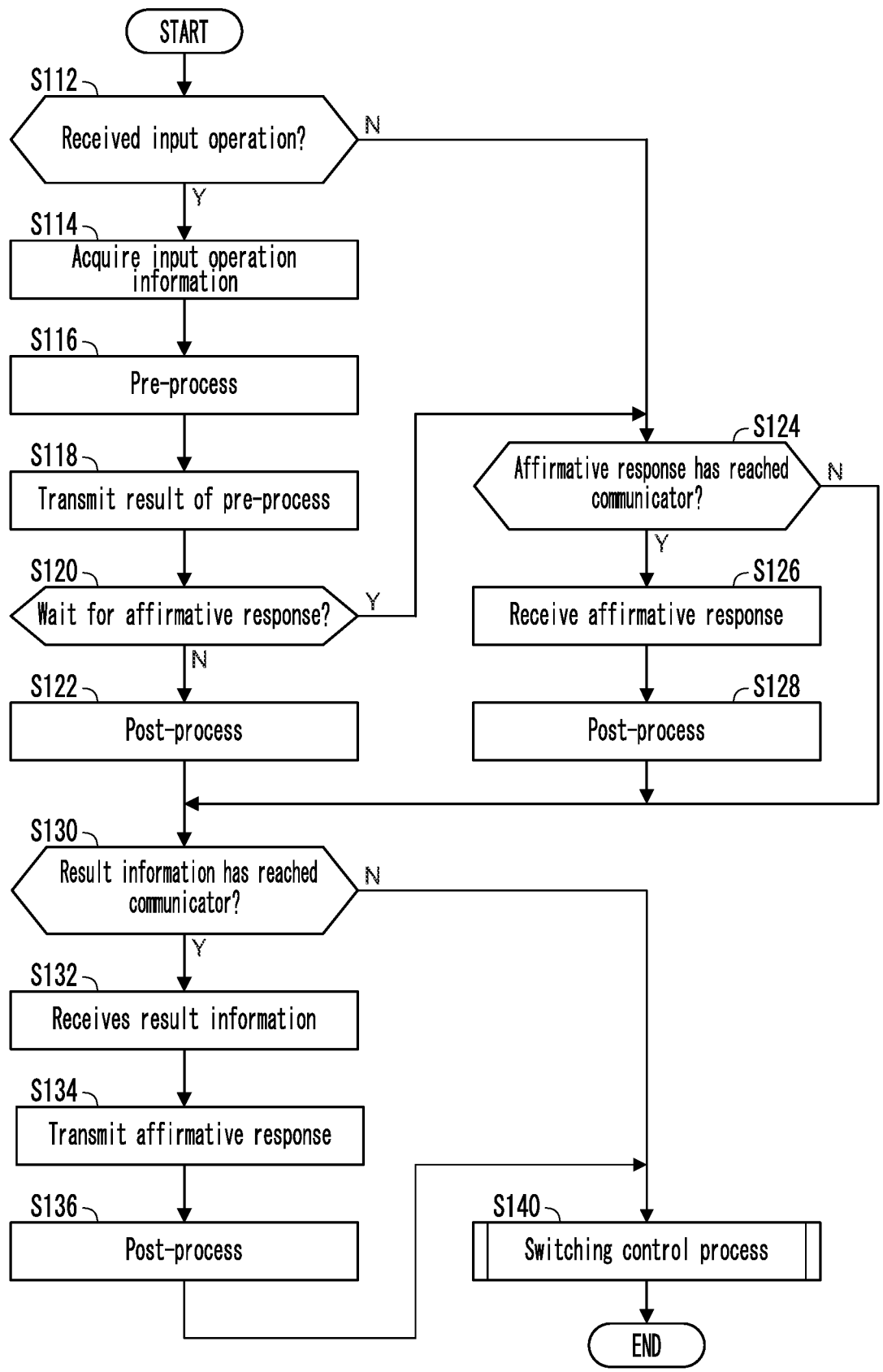
FIG. 22 is a flowchart showing an example game progress process in the result synchronization mode.

FIG. 22 is a flowchart showing an example game progress process in the result synchronization mode. When a result of the determination at step S101 in shown FIG. 21 is affirmative, the process at step S112 shown in FIG. 22 is executed. In other words, in the period during which the result synchronization mode is continued, the operations shown in FIG. 22 are repeated in the same cycle as the cycle of an update timing. A series of processes at steps S114-S122 is an example of a process in accordance with the input operation information IINF acquired by the acquirer 111. In addition, a series of processes at steps S124-S128 is an example of a process in accordance with a positive response to the result information RINF transmitted to another game apparatus 10A. A series of processes at steps S132-S136 is an example of a process in accordance with the result information RINF received by the information receiver 1121A.

At step S112, the acquirer 111 determines whether an input operation has been received by the input operation controller 170. When a result of the determination at step S112 is affirmative, that is, when an input operation has been received by the input operation controller 170, the acquirer 111 acquires the input operation information IINF at step S114, and moves the process to step S116. In contrast, when the result of the determination at step S112 is negative, that is, when no input operation has been received by the input operation controller 170, the progress controller 114A moves the process to step S124. In other words, when no input operation has been received by the input operation controller 170, the series of processes at steps S114-S122 is not carried out.

At step S116, the pre-process section 1141 of the progress controller 114A executes a pre-process, based on the input operation information IINF acquired by the acquirer 111, and progresses the game. Then, the progress controller 114A moves the process to step S118.

At step S118, the information transmitter 1122A transmits, to another game apparatus 10A via the communicator 150, the result information RINF representative of a result of the pre-process at step S116, and moves the process step S120.

In a case in which the input operation indicated by the input operation information IINF acquired at step S114 is not required to be reflected in the game progress in another game apparatus 10A, the process at step S118 may be omitted. In other words, in a case in which the input operation indicated by the input operation information IINF acquired by the acquirer 111 is not required to be reflected in the game progress in another game apparatus 10A, the transmission of the result information RINF to the other game apparatus 10A may be omitted.

At step S120, the post-process section 1142 of the progress controller 114A determines whether the post-process based on the result of the pre-process at step S116 is waiting for an affirmative response. Here, in one example, the phrase "post-process is waiting for an affirmative response" refers to a process that is determined to be executed or not depending on an affirmative response from another game apparatus 10A with respect to the result information RINF transmitted at step S118. This post-process is waiting until the affirmative response is received by information receiver 1121A. Thus, in one example, when the post-process based on the result of the pre-process at step S116 is a process that is determined to be executed or not depending on the response from another game apparatus 10A with respect to the result information RINF transmitted at step S118, the post-process section 1142 determines that the post-process is waiting for a positive response.

In contrast, in one example, when the post-process based on the result of the pre-process at step S116 is a process to be executed independent of the game situation or the like of another game apparatus 10A, the post-process section 1142 determines that the post-process is not waiting for an affirmative response. When the result of the determination at step S120 is affirmative, that is, the post-process is waiting until the affirmative response is received by the information receiver 1121A, the post-process section 1142 moves the process to step S124. In contrast, when the result of the determination at step S120 is negative, that is, when the post-process is executed independently of the game situation or the like of another game apparatus 10A, the post-process section 1142 moves the process to step S122.

At step S122, the post-process section 1142 of the progress controller 114A executes the post-process, based on the result of the pre-process at step S116, and progresses the game. Thus, the game situation is updated to a situation corresponding to the input operation information IINF acquired at step S114. After the post-process, the progress controller 114A moves the process to step S130. Prior to description of operations after step S130, a series of processes at steps S124-S128 will be described. As described above, the process at step S124 is executed, when the result of the determination at step S112 is negative, or when the result of the determination at step S120 is affirmative.

At step S124, the information receiver 1121A determines whether an affirmative response to the result information RINF transmitted with respect to another game apparatus 10A has reached the communicator 150. When a result of the determination at step S124 is affirmative, that is, when the affirmative response has reached the communicator 150, the information receiver 1121A moves the process to step S126. In contrast, when the result of the determination at step S124 is negative, that is, the positive response has not yet reached the communicator 150, the information receiver 1121A moves the process to step S130. In other words, when the positive response has not yet reached the communicator 150, the processes at steps S126 and S128 are not executed.

At step S126, the information receiver 1121A receives the affirmative response to the result information RINF, and moves the process to step S128. At step S128, the post-process section 1142 of the progress controller 114A executes the post-process, based on the result information RINF corresponding to the affirmative response, and progress the game. In other words, the post-process section 1142 of the progress controller 114A executes the post-process which has been waiting until the positive response is received. Thus, the game situation is updated to a situation corresponding to the input operation information IINF acquired by the acquirer 111. After the post-process, the progress controller 114A moves the process to step S130.

At step S130, the information receiver 1121A determines whether the result information RINF of another game apparatus 10A has reached the communicator 150. When a result of the determination at step S130 is affirmative, that is, when the result information RINF of the other game apparatus 10A has reached the communicator 150, the information receiver 1121A moves the process to step S132. In contrast, when the result of the determination at step S130 is negative, that is, when the result information RINF of the other game apparatus 10A has not yet reached the communicator 150, the information receiver 1121A moves the process to step S140. In other words, when the result information RINF of the other game apparatus 10A has not yet reached the communicator 150, the series of processes at steps S132-S136 is not executed.

At step S132, the information receiver 1121A receives the result information RINF representative of the result of the pre-process executed by another game apparatus 10A, and moves the process to step S134. At step S134, the information transmitter 1122A transmits, to the other game apparatus 10A, an affirmative response to the result information RINF received by the information receiver 1121A. When the post-process section 1142 of the progress controller 114A does not execute the post-process based on the result information RINF, the information transmitter 1122A may transmit a negative response to the other game apparatus 10A instead of an affirmative response.

Next, at step S136, the post-process section 1142 of the progress controller 114A executes the post-process, based on the result information RINF received by the information receiver 1121A, and progresses the game. Thus, the game situation is updated to a situation corresponding to the result information RINF (i.e., a situation in accordance with the input operation executed on the input operation controller 170 of another game apparatus 10A). After the post-process, the progress controller 114A moves the process to step S140.

At step S140, the progress controller 114A executes a switching control process regarding the control of switching the game progress from the result synchronization mode to the input synchronization mode. A switching control process will be described in detail with reference to FIG. 23, which will be described later.

The game progress process in the result synchronization mode is not limited to the example shown in FIG. 22. In one example, the determinations at steps S112, S124, and S130 may be executed by the progress controller 114A. Alternatively, the following steps may be executed in parallel: a series of processes at steps S112-S122; a series of processes at steps S124-S128; a series of processes at steps S130-S136; and the switching control process at step S140. Next, description will be given of a switching control process at step S140 with reference to FIG. 23.

Figure 23:
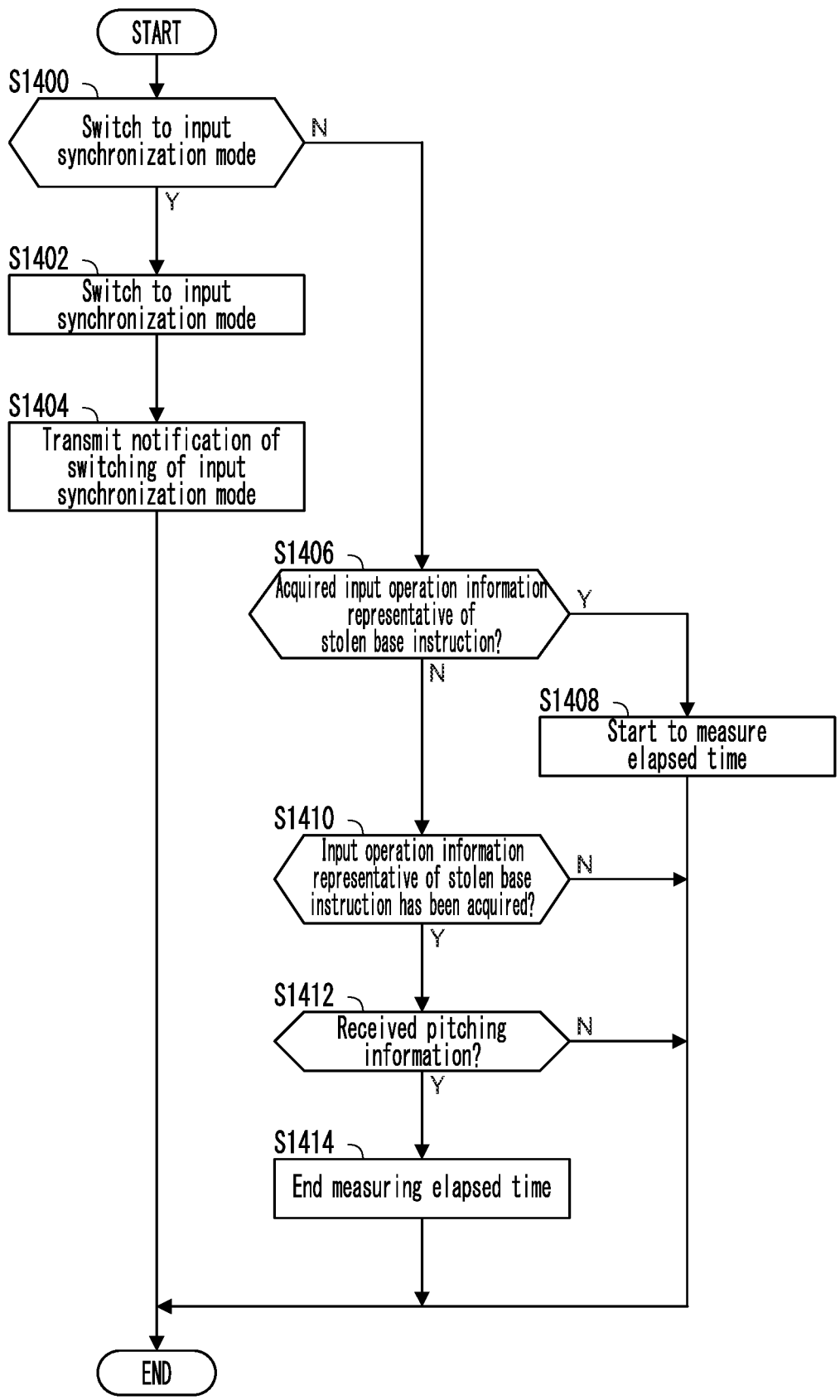
FIG. 23 is a flowchart showing an example switching control process.

FIG. 23 is a flowchart showing an example switching control process. The switching control process shown in FIG. 23 is an example of the switching control process at step S140 shown in FIG. 22. Therefore, in the period during which the result synchronization mode is continued, the switching control process shown in FIG. 23 is repeated, in the same period as a period of an update timing.

At step S1400, the progress controller 114A determines whether to switch the game progress from the result synchronization mode to the input synchronization mode. In one example, the progress controller 114A determines to switch the game progress to the input synchronization mode, when the information receiver 1121A receives, from another game apparatus 10A, a switching notification of switching the game progress from the result synchronization mode to the input synchronization mode. Alternatively, the progress controller 114A determines to switch the game progress to the input synchronous mode, when the information receiver 1121A does not receive the pitching information RINF by the time at which a waiting period WT for switching elapsed after the acquirer 111 acquires the input operation information IINF representative of a stolen base instruction.

When a result of the determination at step S1400 is affirmative, that is, when the game progress is switched to the input synchronization mode, the progress controller 114A moves the process to step S1402. In contrast, when the result of the determination at step S1400 is negative, that is, when the result synchronization mode is continued, the progress controller 114A moves the process to step S1406. Accordingly, a series of processes at steps S1402 and S1404 is executed when the game progress is switched to the input synchronization mode. A series of processes at steps S1406-S1414 is executed when the result synchronization mode is continued.

At step S1402, the progress controller 114A switches the game progress from the result synchronization mode to the input synchronization mode. When measurement of the elapsed time has been started at step S1408 (described below) by the previous update timing, the progress controller 114A switches the game progress from the result synchronization mode to the input synchronization mode, and thereafter ends the measurement of the elapsed time. The progress controller 114A switches the game progress from the result synchronized mode to the input synchronized mode, and thereafter moves the process to step S1404.

At step S1404, the information transmitter 1122A transmits, to the other game apparatus 10A, a switching notification of switching the game progress from the result synchronized mode to the input synchronized mode, and ends the switching control process. In a case in which the progress controller 114A switches the game progress to the input synchronous mode in response to the switching notification received from another game apparatus 10A, the process at step S1404 may be omitted. Alternatively, in a case in which the progress controller 114A switches the game progress to the input synchronization mode in response to the switching notification received from the other game apparatus 10A, the switching notification to be transmitted at step S1404 may be used as information with which the other game apparatus 10A confirms that the game progress is switched to the input synchronization mode.

Next, description will be given of a series of processes at steps S1406-S1414, which is executed when a result of the determination at step S1400 is negative (i.e., when the result synchronization mode is continued).

At step S1406, the progress controller 114A determines whether the acquirer 111 has been acquired input operation information IINF representative of a stolen base instruction at the current update timing. When a result of the determination at step S1406 is affirmative, that is, when the acquirer 111 has acquired the input operation information IINF representative of the stolen base instruction at the current update timing, the progress controller 114A starts to measure the elapsed time at step S1408, and ends the switching control process. In contrast, when the result of the determination at step S1406 is negative, that is, when the acquirer 111 has not acquired the input operation information IINF representative of the stolen base instruction at the current update timing, the progress controller 114A moves the process to step S1410.

At step S1410, the progress controller 114A determines whether the input operation information IINF representative of the stolen base instruction has been acquired by the acquirer 111 by the previous update timing. When a result of the determination at step S1410 is affirmative, that is, when the acquirer 111 has acquired the input operation information IINF representative of the stolen base instruction, the progress controller 114A moves the process to step S1412. In contrast, when the result of the determination at step S1410 is negative, that is, when the acquirer 111 has not acquired the input operation information IINF representative of the stolen base instruction, the progress controller 114A ends the switching control process without starting the measurement of the elapsed time.

At step S1412, the progress controller 114A determines whether the pitching information RINF has received by the information receiver 1121A at the current update timing. When a result of the determination at step S1412 is affirmative, that is, the pitching information RINF has received by the information receiver 1121A at the current update timing, the progress controller 114A ends the measurement of the elapsed time at step S1414, and ends the switching control process. In other words, when the pitching information RINF is received by the information receiver 1121A by the time at which the waiting period WT for switching elapses after the input operation information IINF representative of the stolen base instruction is acquired by the acquirer 111, the progress controller 114A ends the measurement of the elapsed time, and ends the switching control process. In contrast, when the result of the determination at step S1412 is negative, that is, the pitching information RINF has not been received by the information receiver 1121A at the current update timing, the progress controller 114A ends the switching control process with the measurement of the elapsed time continuing.

Next, with reference to FIG. 24, the game progression process in the input synchronization mode will be described.

Figure 24:
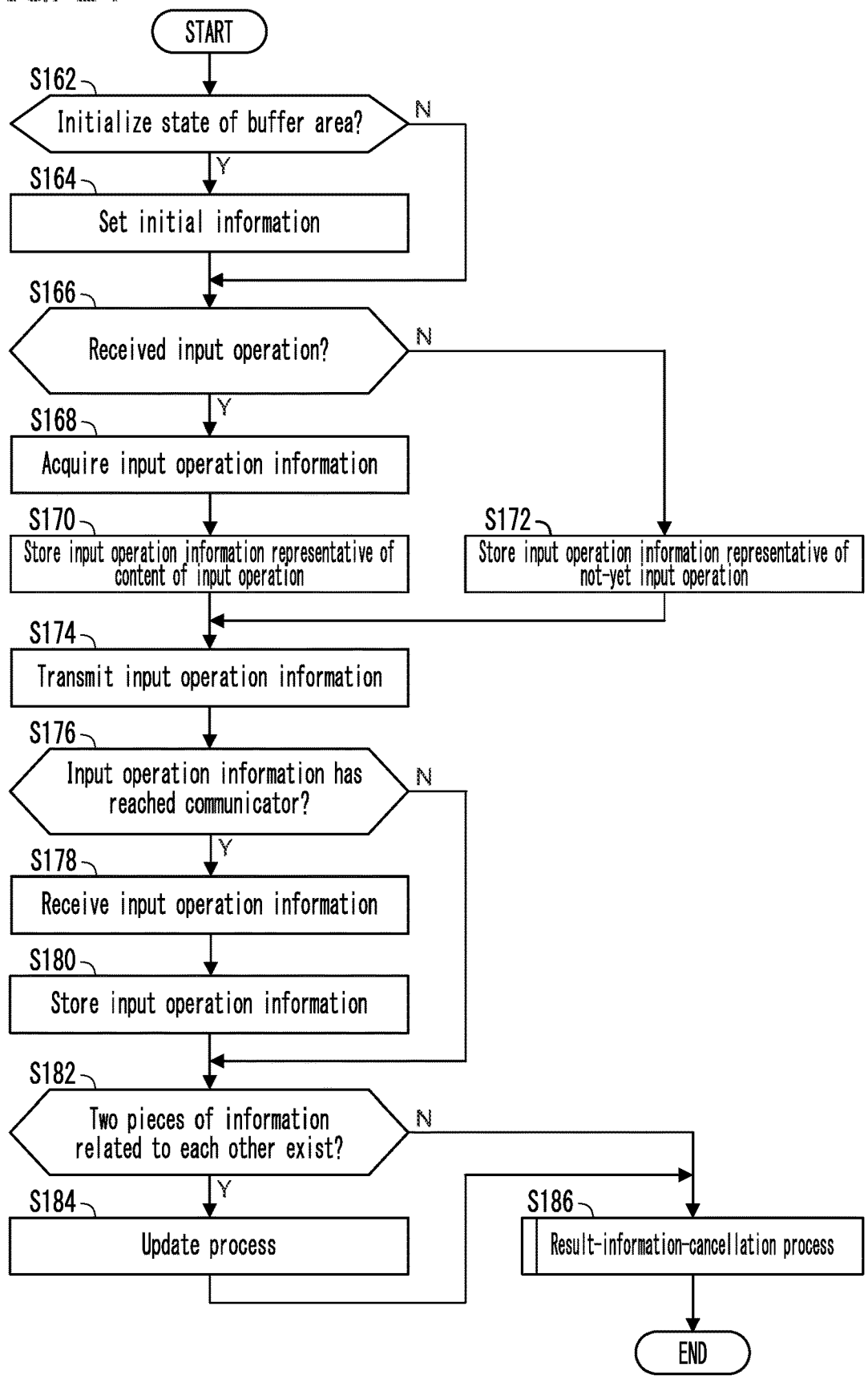
FIG. 24 is a flowchart showing an example game progress process in an input synchronization mode.

FIG. 24 is a flowchart showing an example game progress process in the input synchronization mode. Operations shown in FIG. 24 are example operations included in step S160A (a game progress process in the input synchronization mode) shown in FIG. 21. For this reason, the process at step S162 shown in FIG. 24 is executed, when the result of the determination at step S102 shown in FIG. 21 is affirmative. In other words, in the period during which the input synchronization mode is continued, the operations shown in FIG. 24 are repeated in the same cycle as a cycle of an update timing. The operations shown in FIG. 24 are the same as those shown in FIG. 12, except that the result-information-cancellation process at step S186 is added to the operations shown in FIG. 12. A series of processes at steps S162-S184 and the result-information-cancellation process at step S186 may be executed in parallel.

Process at step S162 shown in FIG. 24 is the same as that at step S162 shown in FIG. 12. In one example, at step S162, the progress controller 114A determines whether to initialize the state of the buffer area 132. Specifically, at step S162, when the game progress is started in the input synchronization mode, the progress controller 114A determines to initialize the state of the buffer area 132. Examples of a start of the game progress process in the input synchronization mode include a game progress being switched from the result synchronization mode to the input synchronization mode. For this reason, when the game progress is switched from the result synchronous mode to the input synchronous mode, the progress controller 114A determines to initialize the state of the buffer area 132. Accordingly, in the game apparatus 10A, when the game progress is switched from the result synchronization mode to the input synchronization mode, the storage controller 113 executes an initialization process to store one or more pieces of initial information in either the memory areas 1321 or 1322.

The series of processes at steps S164-S184 is the same as those at steps S164-S184 shown in FIG. 12. For this reason, a detailed description of a series of processes at steps S164-S184 is omitted.

In the operations shown in FIG. 12, when the result of the determination at step S182 is negative, the game progressing process is ended. However, in the operations shown in FIG. 24, the progress controller 114A moves the process to step S186.

The result-information-cancellation process at step S186 is executed, when the update process at step S184 is executed, or when the result of the determination at step S182 is negative. The progress controller 114A executes the result-information-cancellation process at step S186, and ends the game progress process at the current update timing. In one example, the result-information-cancellation process refers to a process for cancelling processes related to the result synchronization mode after the game progress is switched to the input synchronization mode. The result-information-cancellation process will be described in detail in relation to FIG. 25, which will be described later.

The operations carried out by the game apparatus 10A in the input synchronization mode at progression of the game is not limited to the example shown in FIG. 24. In one example, instead of a series of processes at steps S162-S184, the game apparatus 10A may execute those at steps S162-S185 shown in FIG. 13.

Figure 25:
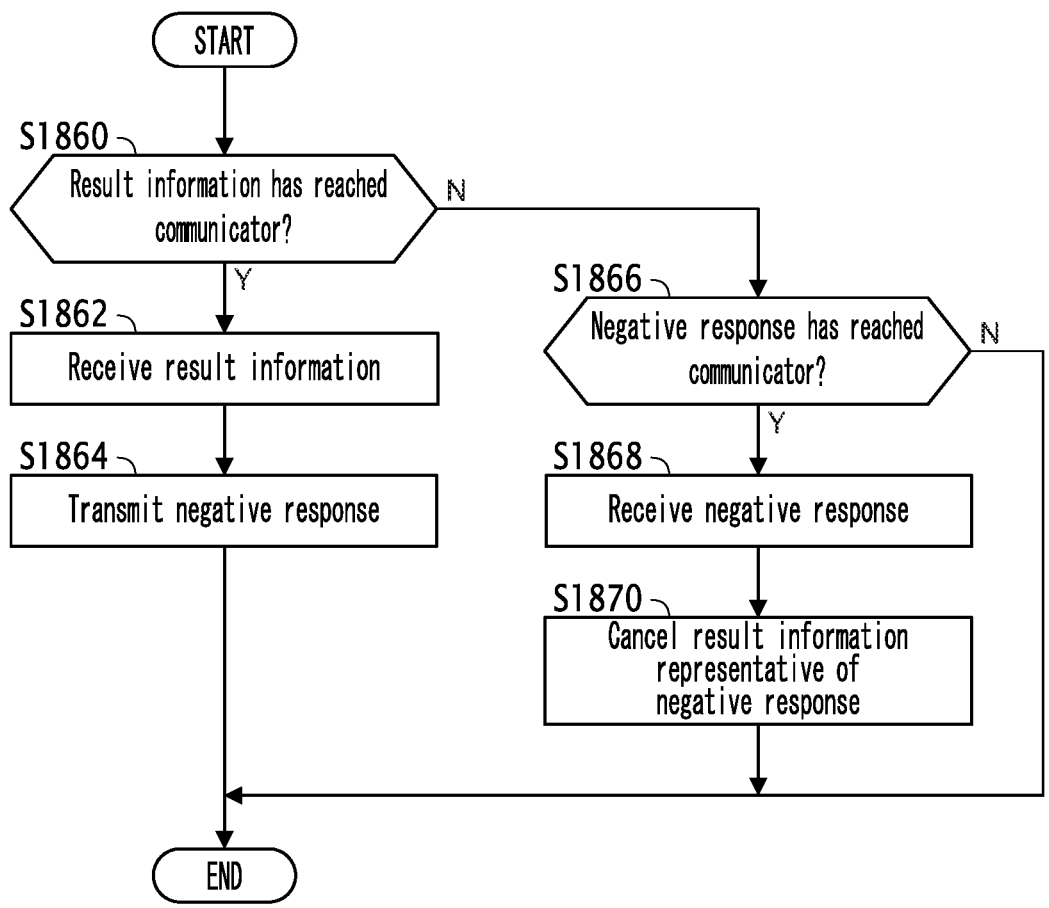
FIG. 25 is a flowchart showing an example result-information-cancellation process.

FIG. 25 is a flowchart showing an example result-information-cancellation process. The result-information-cancellation process shown in FIG. 25 is an example of the result information cancellation process at step S186 shown in FIG. 24. For this reason, process at step S1860 is executed after the update process at step S184 shown in FIG. 24 is executed, or when the result of the determination at step S182 shown in FIG. 24 is negative.

At step S1860, the information receiver 1121A determines whether result information RINF has reached the communicator 150. Here, the result information RINF represents a result of the pre-process in the result synchronization mode in another game apparatus 10A. When a result of the determination at step S1860 is affirmative, that is, when the result information RINF of the other game apparatus 10A has reached the communicator 150, the information receiver 1121A receives the result information RINF at step S1862, and moves the process to step S1864. At step S1864, the information transmitter 1122A transmits, to the other game apparatus 10A, a negative response to the result information RINF, and ends the result-information-cancellation process. In contrast, when the result of the determination at step S1860 is negative, that is, the result information RINF of the other game apparatus 10A has not yet reached the communicator 150, the information receiver 1121A moves the process to step S1866.

At step S1866, the information receiver 1121A determines whether a negative response to the result information RINF sent to the other game apparatus 10A in the result synchronization mode before switching the game progress to the input synchronization mode has reached the communicator 150. When a result of the determination at step S1866 is affirmative, that is, when the negative response has reached the communicator 150, the information receiver 1121A receives the negative response at step S1868, and moves the process to step S1870. In contrast, when the result of the determination at step S1866 is negative, that is, the negative response has not yet reached the communicator 150, the information receiver 1121A ends the result-information-cancellation process.

At step S1870, the progress controller 114A cancels the process corresponding to the result information RINF representative of the negative response. In one example, the cancellation of the process corresponding to the result information RINF representative of the negative response is to end the post-process of waiting for the positive response in the result synchronization mode before the game progress is switched to the input synchronization mode without executing the post-process. The result-information-cancellation process is ended as a result of the end of the process at step S1870. A series of processes at steps S1860-S1864 and a series of processes at steps S1866-S1870 may be executed in parallel. When the result-information-cancellation process is ended, the progress controller 114A moves the process to step S190 shown in FIG. 21.

2.4. Summary of the Second Embodiment

In the foregoing description of this embodiment, when the game progress process is started in the input synchronization mode, the storage controller 113 executes the initialization process for storing one or more pieces of initial information independent from an input operation made by the user U in either the memory areas 1321 or 1322, in the initialization period. In one example, the storage controller 113 executes the initialization process, when the game progress is switched from the result synchronization mode to the input synchronization mode. Accordingly, this embodiment provides the same effect as that of the first embodiment.

In one example, when the initial information is stored in the memory area 1322 in the initialization period, the game apparatus 10A enables an input operation made by the user U of the game apparatus 10A to be reflected in the game progress, before the game apparatus 10A receives the input operation information IINF from another game apparatus 10A. Therefore, as compared to a conventional game apparatus that does not use initial information for a game progress, the delay until an input operation is reflected in the game progress is reduced in the game apparatus 10A.

In one example, storing the initial information in the memory area 1321 in the initialization period enables delay until content of the input operation is reflected in the game progress to be reduced in another game apparatus 10A used by the opponent of the user U of the game apparatus 10A. Thus, in the second embodiment, it provides superior real-time performance in either of the two game apparatuses that execute an online competitive game, as compared to a conventional game apparatus.

Furthermore, in this embodiment, the progress controller 114A controls a game progress by use of a result synchronization mode and an input synchronization mode. The result synchronization mode is a mode for progressing the game, based on input operation information IINF acquired by the acquirer 111. The input synchronization mode is a mode for progressing the game, based on the following (i) and (ii): (i) input operation information IINF acquired by the acquirer 111; and (ii) input operation information IINF of the other game apparatus 10A received by the information receiver 1121A. Accordingly in this embodiment, the degree of difference in the game progress between the two game apparatuses 10A is reduced, as compared to a conventional game apparatus. In one example, in this embodiment, progression of the game in the input synchronization mode enables the game situation to be identical between the two game apparatuses 10A, as compared to a conventional game apparatus in which the input synchronization mode is not required for a game progress. Thus, in this embodiment, in one example, even when the game is being progressed in the result synchronized mode, switching the game progress from the result synchronized mode to the input synchronized mode enables an event, which has a premise that positions and states of characters and objects, etc. are identical between the two game apparatuses 10A, to be generated. This enables the limitation to types of events to be generated to be reduced.

2.5. Modifications of the Second Embodiment.

Examples will be given of specific aspects of modifications according to this embodiment below. Two or more aspects freely selected from the following examples may be combined as appropriate within the scope, as long as there is no conflict.

Modification 2.1

In the foregoing second embodiment, the defensive game apparatus 10A transmits pitching information RINF to the offensive game apparatus 10A once for each pitch. However, the present invention is not limited to such an aspect. In one example, the defensive game apparatus 10A may transmit the pitching information RINF to the offensive game apparatus 10A multiple times for each pitch, as shown in FIG. 26.

Figure 26:
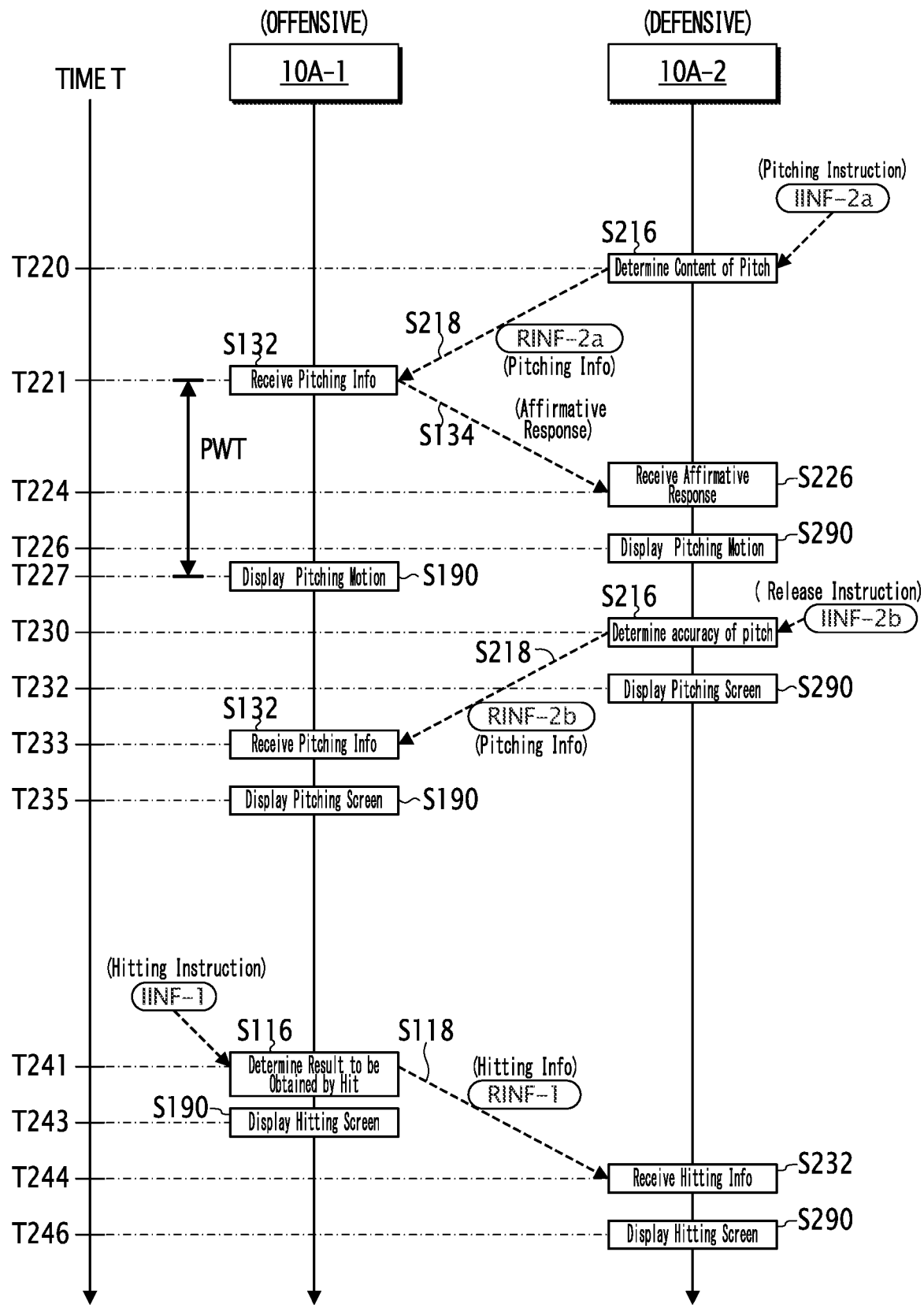
FIG. 26 is a sequence chart showing example operations of the game system 1A according to Modification 2.1.

FIG. 26 is a sequence chart showing example operations of the game system 1A according to Modification 2.1. In FIG. 26, as shown in FIG. 17, a lowercase letter (a, or b) is added to the end of each of input operation information IINF-2 and result information RINF-2. In operations shown in FIG. 26, a user U2 of the defensive game apparatus 10A-2 inputs, to the input operation controller 170-2 of the game apparatus 10A-2, (i) a pitching instruction to instruct content of a pitch, such as "pitch type" and "course," and (ii) a release instruction to instruct a release timing. The release timing refers to a timing at which the ball object Ob1 is released by the pitcher character Cpt. The operations shown in FIG. 26 are the same as those shown in FIG. 18, except that the release instruction is input to the input operation controller 170-2. For this reason, detailed description of the operations shown in FIG. 18 is omitted.

First, at time T220, the information transmitter 1122A-2 of the game apparatus 10A-2 transmits, to the game apparatus 10A-1, pitching information RINF-2a based on the input operation information IINF-2a representative of content of the pitching instruction (S218).

At time T221, the information receiver 1121A-1 of the game apparatus 10A-1 receives the pitching information RINF-2a (S132). The information transmitter 1122A-1 transmits, to the game apparatus 10A-2, an affirmative response to the pitching information RINF-2a (S134). Furthermore, at the time T227 after a pitch waiting time PWT has elapsed from the time T221, the post-process section 1142-1 of the progress controller 114A-1 controls the pitcher character Cpt such that a pitch based on the pitching information RINF-2a is started. This control causes the display 31-2 corresponding to the game apparatus 10A-2 to display a motion of the pitch at time T227 (S190). The time T227 is later than time T226 at which the motion of the pitch is displayed on the display 31-1 corresponding to the game apparatus 10A-1.

At time T224, the information receiver 1121A-2 of the game apparatus 10A-2 receives the affirmative response to the pitching information RINF-2a (S226). Then, at time T226, the progress controller 114A-2 causes the display section 31-2 to display the motion of the pitch which is performed by the pitcher character Cpt and is based on the pitching information RINF-2a (S290).

At time T230, when the acquirer 111-2 of the game apparatus 10A-2 acquires input operation information IINF-2b representative of a release instruction, the pre-process section 1141-2 of the progress controller 114A-2 determines accuracy of the pitch in accordance with the release timing (S216). In one example, the progress controller 114A-2 of the game apparatus 10A-2 displays the motion of the pitch performed by the pitcher character Cpt on the display section 31-2, and thereafter displays a timing gauge on the display section 31-2. When the user U2 inputs a release instruction (e.g., by pressing or releasing an input operation button) at the appropriate timing indicated by the timing gauge, the ball object Ob1 is thrown to the course selected by the pitching instruction. The more the timing of the input of the release instruction deviates from the appropriate timing, the more the position of the ball object Ob1 to be thrown deviate from the course selected in the pitching instruction.

Furthermore, the information transmitter 1122A-2 of the game apparatus 10A-2 transmits, to the game apparatus 10A-1, the pitching information RINF-2b based on the input operation information IINF-2b representative of the release instruction (S218). The pitching information RINF-2b includes information representative of the course in which the ball object Ob1, which is determined in accordance with the release instruction, is thrown. Here, a case is given in which a ball speed is adjusted from the ball speed selected in the pitching instruction in accordance with the timing at which the release instruction is input. In this case, the pitching information RINF-2b includes information representative of the ball speed of the ball object Ob1 determined in accordance with the pitching instruction.

At time T232, the progress controller 114A-2 of the game apparatus 10A-2 displays, on the display section 31-2, a pitching screen representative of the game situation updated based on the pitching information RINF-2b (S290). In an example shown in FIG. 26, in the pitching screen, the pitcher character Cpt and the ball object Ob1 are displayed after the motion of the pitch performed by the pitcher character Cpt is ended. For this reason, in the game apparatus 10A-2, the ball object Ob1 is released from the pitcher character Cpt at time T232.

At time T233, the information receiver 1121A-1 of the game apparatus 10A-1 receives the pitching information RINF-2b (S132). Then, at time T235, the progress controller 114A-1 causes the display section 31-1 to display a pitching screen representative of the game situation updated based on the pitching information RINF-2b (S190). Accordingly, in the game apparatus 10A-1, the ball object Ob1 is released from the pitcher character Cpt at time T235. Operations after time T235 (e.g., times T241, T243, T244, and T246) are the same as those shown in FIG. 18, and are therefore omitted.

Figure 27:
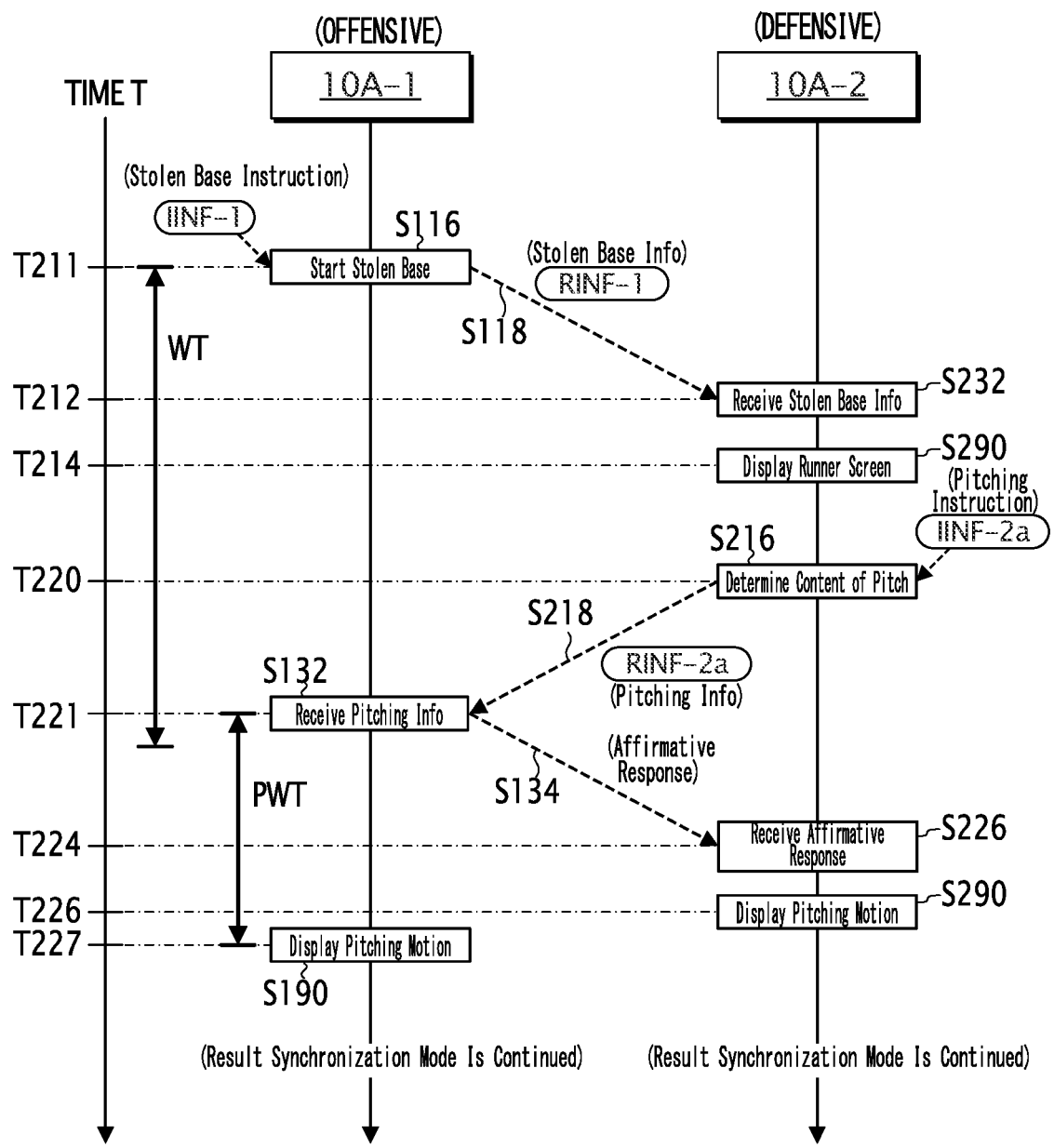
FIG. 27 is a sequence chart showing other example operations of the game system 1A according to Modification 2.1.

FIG. 27 is a sequence chart showing other example operations of the game system 1A according to Modification 2.1. Operations shown in FIG. 27 are the same as those shown in FIG. 26, except that a release instruction is input to the input operation controller 170-2. In addition, these operation are the same as those shown in FIG. 19, except that a release instruction is input to the input operation controller 170-2. Accordingly, detailed description of the operations shown in FIG. 19 and FIG. 26 is omitted.

A series of operations carried out by the game apparatuses 10A-1 and 10A-2 at times T211, T212 and T214 is the same as those at times T211, T212 and T214 shown in FIG. 19. In one example, at time T214, the progress controller 114A-2 of the game apparatus 10A-2 causes the display section 31-2 to display a runner screen of the game situation updated based on the stolen base information RINF-1 (S290).

At time T220, the information transmitter 1122A-2 of the game apparatus 10A-2 transmits, to the game apparatus 10A-1, pitching information RINF-2a based on the input operation information IINF-2a representative of content of the pitching instructions (S218).

At time T221, the information receiver 1121A-1 of the game apparatus 10A-1 receives the pitching information RINF-2a (S132). In the example shown in FIG. 27, the information receiver 1121A-1 receives the pitching information RINF-2a by the time at which the waiting period WT for switching elapses from time T211, which is the timing of the acquisition of the input operation information IINF-1 by the acquirer 111-1. Accordingly, the progress controller 114A-1 continues the game progress in the result synchronization mode. In one example, the information transmitter 1122A-1 transmits, to the game apparatus 10A-2, an affirmative response to the pitching information RINF-2a (S134).

In an example shown in FIG. 27, since the game progress continues in the result synchronization mode, operations of the game apparatuses 10A-1 and 10A-2 after time T220 are the same as those shown in FIG. 26.

When the information receiver 1121A-1 receives the pitching information RINF-2a after the waiting period WT for switching has elapsed from the time T211, which is the timing of the acquisition of the input operation information IINF-1 by the acquirer 111-1, the game progress is switched from the result synchronization mode to the input synchronization mode, in similar to the operations shown in FIG. 20. When the game progress is switched from the result synchronization mode to the synchronization mode, operations of the game apparatuses 10A-1 and 10A-2 in Modification 2.1 are the same as those shown in FIG. 20, and is therefore omitted.

Modification 2.2.

In the foregoing second embodiment and Modification 2.1, when the game is progressing in the input synchronization mode, the progress controller 114A displays, on the display section 31, an image of an overhead view of the virtual space related to the game. However, the present invention is not limited such an aspect. In one example, in the input synchronization mode, the progress controller 114A may display, on the display section 31, an image in which both the following (i) and (ii) are fit on one screen: (i) game elements, such as the runner character Crn operated by the user U1; and (ii) game elements, such as the pitcher character Cpt operated by the user U2.

3. Appendices

From the foregoing description, the following will be clear.

Appendix 1

A game apparatus according to an aspect of the present invention is a game apparatus (e.g., a game apparatus 10) for executing a game, including: at least one memory (e.g., memory 13) configured to store instructions, and that includes a first memory area (e.g., a memory area 1321) and a second memory area (e.g., a memory area 1322); and at least one processor (e.g., a processor 11) configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; execute an initialization process for storing, in the second memory area, one or more pieces of initial information independent from an input operation of either the user of the game apparatus or the other user of the other game apparatus, in an initialization period; progress the game, in a first period after the initialization period, based on: the first input operation information stored in the first memory area, and any one of the one or more pieces of initial information stored in the second memory area; and progress the game, in a second period after the first period, based on: the first input operation information stored in the first memory area, and the second input operation information stored in the second memory area.

In this aspect, the game apparatus can reflect, in the game apparatus, the input operation made by the user of the game apparatus (indicated by first input operation information) before receiving the second input operation information representative of content of the input operation made by another user of another game apparatus. This aspect enables the game apparatus to reduce delay until content of the input operation is reflected in the game progress, as compared to a conventional game apparatus that does not use initial information for the game progress. Thus, in an online competitive game executed using two game apparatuses, this aspect provides superior real-time performance, as compared to a conventional game apparatus.

In this aspect, the "first input operation information" may be information representative of an input operation made by a user to an "input operation controller," such as a game controller of the game apparatus, or may be information representative of process assigned to the input operation made by the user.

In one example, in a case in which the user presses one operation button from among operation buttons provided on the input operation controller, the "information representative of an input operation" may be information for identifying one operation button from among the operation buttons. Alternatively, in one example, in a case in which the input operation made by the user is to select one of choices listed in a menu, the "information representative of an input operation" may be information for identifying one of choices listed in a menu. Specifically, in a case in which the input operation made by the user is to select a choice "B" from among choices "A", "B", and "C" listed in a menu, the "information representative of an input operation" may be information representative of the selection of the choice "B."

Furthermore, in one example, in a case in which a press of an operation button is assigned to an instruction to move the character upward in the game, and in this state the user presses one operation button, the "information representative of process assigned to an input operation" may be information representative of an instruction to move the character upward.

In this aspect, the "second input operation information" may be information representative of an input operation made by another user to "another input operation controller," such as another game controller of another game apparatus, or may be information representative of process assigned to the input operation made by the other user of the other game apparatus.

The "information representative of an input operation" and the "information representative of a process assigned to an input operation" are the same as those described in the expression "first input operation information."

In one example, in a case in which another user of another game apparatus presses one operation button from among operation buttons provided on another input operation controller, the "information representative of an input operation" may be information for identifying one operation button from among the operation buttons. Alternatively, in one example, in a case in which the input operation made by the other user of the other game apparatus is to select one of choices listed in a menu, the "information representative of an input operation" may be information for identifying one of choices listed in a menu.

In this aspect, in one example, the "initial information" refers to information that is not related to an input operation made by a user. The "information that is not related to an input operation made by a user" may be dedicated information representative of the following (i) and (ii): (i) input operation information being treated as being stored; and (ii) not used for the game progress. In one example, the "information that is not related to an input operation made by a user" may refer to a fixed value, or a random value.

In this aspect, the "progressing a game" is an aspect of updating a game situation in synchronization with an update timing that arrives periodically or regularly. The "updating a game situation" may be a concept including "changing the game situation," and "maintaining the game situation without any change." In one example, between the "changing a game situation" and the "maintaining a game situation without any change," the "changing the game situation" corresponds to the "progressing a game." In one example, the "update timing" may be a timing of updating an image displayed on a display apparatus or the like.

In one example, the "game situation" may be a situation of a game element in the virtual space related to the game. Here, the "game element" may refer to, for example, a virtual object that exists in the virtual space related to the game, or a virtual camera that captures an image of the virtual space related to the game.

In one example, the "virtual object that exists in the virtual space related to the game" may be a concept including a character related to the game, and an object related to the game.

The "situation of a game" may be a position and state of a game element. Here, the "state of a game element" may be a concept including a movement of the game element. In one example, in the baseball game, the "movement of the game element" corresponds to a movement of a character, such as a pitch, a hit, or stealing a base.

In this aspect, the "initialization period" may be a period before a game progress is started by the progress controller, based on the information stored in the first memory area and the information stored in the second memory area.

Appendix 2

A game apparatus according to another aspect of the present invention is the game apparatus according to Appendix 1, in which the game is a baseball game in which a pitch is executed by a pitcher character (e.g., a pitcher character Cpt), and a hit is executed by a batter character (e.g., a batter character Cbt), the game apparatus is used for operating the pitcher character, and the other game apparatus is used for operating the batter character.

This aspect enables the game apparatus to reduce delay until content of the input operation is reflected in the game progress, as compared to a conventional game apparatus that does not use initial information for the game progress. Thus, in a game apparatus used for operating a pitcher character, this aspect provides superior real-time performance, as compared to a conventional game apparatus.

Appendix 3

A game apparatus according to another aspect of the present invention is a game apparatus for executing a game, including: at least one memory configured to store instructions, and that includes a first memory area and a second memory area; and at least one processor configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; execute an initialization process for storing, in the first memory area, one or more pieces of initial information independent from an input operation of either the user of the game apparatus or the other user of the other game apparatus, in an initialization period; progress the game, in a first period after the initialization period, based on: any one of the one or more pieces of initial information stored in the first memory area, and the second input operation information stored in the second memory area; and progress the game, in a second period after the first period, based on: the first input operation information stored in the first memory area, and the second input operation information stored in the second memory area.

This aspect enables the game apparatus to reduce delay until content of the input operation is reflected in the game progress in another game apparatus, as compared to a conventional game apparatus. Thus, this aspect provides superior real-time performance in the other game apparatus, as compared to a conventional game apparatus.

Appendix 4

A game apparatus according to another aspect of the present invention is the game apparatus according to appendix 3, in which the game is a baseball game in which a pitch is executed by a pitcher character, and a hit is executed by a batter character, the game apparatus is used for operating the pitcher character, and the other game apparatus is used for operating the batter character.

This aspect enables another game apparatus for operating a pitcher character to reduce delay until content of the input operation is reflected in the game progress, as compared to a conventional game apparatus that does not use initial information for the game progress. Thus, in a game apparatus used for operating a pitcher character, this aspect provides superior real-time performance, as compared to a conventional game apparatus.

Appendix 5

A game apparatus according to another aspect of the present invention is a game apparatus for executing a game, including: at least one memory configured to store instructions, and that includes a first memory area and a second memory area; and at least one processor configured to implement the instructions to: acquire first input operation information representative of content of an input operation made by a user of the game apparatus; receive second input operation information representative of content of an input operation made by another user of another game apparatus for executing the game; store the acquired first input operation information in the first memory area; store the received second input operation information in the second memory area; progress the game, based on information stored in the first memory area and information stored in the second memory area; and execute an initialization process for storing, in either the first memory or the second memory area, one or more pieces of initial information independent from an input operation of either the user of the game apparatus or the other user of the other game apparatus, in an initialization period, when the initial information is stored in the second memory area in the initialization period, the at least one processor is configured to: progress the game, in a first period after the initialization period, based on: the first input operation information stored in the first memory area, and any one of the one or more pieces of initial information stored in the second memory area, and progress the game, in a second period after the first period, based on: the first input operation information stored in the first memory area, and the second input operation information stored in the second memory area, when the one or more pieces of initial information are stored in the first memory area in the initialization period, the at least one processor is further configured to: progress the game, in the first period, based on: any one of the one or more pieces of initial information stored in the first memory area, and the second input operation information stored in the second memory area, and progress the game, in the second period, based on: the first input operation information stored in the first memory area, and the second input operation information stored in the second memory area.

In this aspect, when the game apparatus stores the initial information in the second memory area in the initialization period, the game apparatus can reflect an input operation made by the user of the game apparatus in the game progress before receiving the second input operation information representative of content of the input operation made by another user of another game apparatus. This aspect enables the game apparatus to reduce delay until content of the input operation is reflected in the game progress, as compared to a conventional game apparatus that does not use initial information for the game progress.

Furthermore, storing the initial information in the first memory area in the initialization period enables delay until content of the input operation is reflected in the game progress to be reduced in another game apparatus, as compared to a conventional game apparatus. In other words, in this aspect, it provides superior real-time performance in either of the two game apparatuses that execute an online competitive game, as compared to a conventional game apparatus.

Appendix 6

A game apparatus according to another aspect of the present invention is the game apparatus according to Appendix 5, in which the game is a baseball game in which a pitch is executed by a pitcher character, and a hit is executed by a batter character, and the at least one processor is configured to determine, based on inning information, a memory area that stores one or more pieces of initial information from among the first memory area and the second memory area, the one or more pieces of initial information are independent from an input operation of either the user of the game apparatus or the other user of the other game apparatus, and the inning information represents which one of the pitcher character and the batter character is operated by the game apparatus.

In this aspect, on the basis of which of the pitcher character and the batter character is used to operate the game apparatus, the game apparatus can determine which of the first memory area and the second memory area to store the initial information in.

Appendix 7

A game apparatus according to another aspect of the present invention is the game apparatus according to any one of Appendices 1 to 6, in which the at least one processor is configured to control a game progress in synchronization with an update timing that arrives periodically.

This aspect provides the same effect as in any one of Appendices 1 to 6.

In this aspect, the "controlling the game progress" may be a process of determining whether to update a game situation at an update timing that arrives periodically. Alternatively, the "controlling the game progress" may be a process for carrying out the following (i) and (ii): (i) determining whether to update a game situation at an update timing; and (ii) updating the game situation when the game situation is updated.

Appendix 8

A game apparatus according to another aspect of the present invention is the game apparatus according to Appendix 7, in which the at least one processor is configured to: refer to the first memory area and the second memory area in synchronization with the update timing, and wait for the game progress, when the second input operation information corresponding to the information stored in the first memory area is not stored in the second memory area.

This aspect provides the same effect as Appendix 7.

Appendix 9

A game apparatus according to another aspect of the present invention is the game apparatus according to any one of Appendices 1 to 8, in which, the at least one processor is configured to control a game progress by switching the game progress between: a first progress mode for progressing the game, based on the information stored in the first memory area and the information stored in the second memory area; and a second progress mode for progressing the game, based on the first input operation information representative of content of the input operation made by the user of the game apparatus, without use of the second input operation information representative of content of the input operation made by the other user of the other game apparatus.

This aspect provides the same effect as in any one of Appendices 1 to 8.

In this aspect, the "first progress mode" may be a progress mode in which the game situation is updated based on the same two pieces of input operation information that are used for progressing the game in another game apparatus. In this aspect, the "second progression mode" may be a progress mode in which the game situation is updated based on the first input operation information, when the first input operation information exist at the update timing for progressing the game.

In the "second progress mode," the at least one processor may progress the game, based on a result of the input operation on the game apparatus. Alternatively, the at least one processor may progress the game, based on a result of the game progress on another game apparatus.

Appendix 10

A game apparatus according to another aspect of the present invention is the game apparatus according to Appendix 9, in which the at least one processor is configured to execute the initialization process, when the game progress is switched from the second progress mode to the first progress mode.

This aspect provides the same effect as in any one of Appendix 9.

Appendix 11

A recording medium according to an aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the second memory area, one or more pieces of initial information independent from an input operation of either the user of the game apparatus or the other user of the other game apparatus, in an initialization period; progressing the game, in a first period after the initialization period, based on: the first input operation information stored in the first memory area, and any one of the one or more pieces of initial information stored in the second memory area; and progressing the game, in a second period after the first period, based on: the first input operation information stored in the first memory area, and the second input operation information stored in the second memory area.

This aspect provides the same effect as Appendix 1.

Appendix 12

A recording medium according to another aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the first memory area, one or more pieces of initial information independent from an input operation of either the user of the game apparatus or the other user of the other game apparatus, in an initialization period; progressing the game, in a first period after the initialization period, based on: any one of the one or more pieces of initial information stored in the first memory area, and the second input operation information stored in the second memory area; and progressing the game, in a second period after the first period, based on: the first input operation information stored in the first memory area, and the second input operation information stored in the second memory area.

This aspect provides the same effect as Appendix 3.

Appendix 13

A recording medium according to another aspect of the present invention is a non-transitory recording medium for storing a program executable by a processor, which is included in a game apparatus for executing a game, to execute a method including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; and executing an initialization process for storing, in either the first memory or the second memory area, one or more pieces of initial information independent from an input operation of either the user of the game apparatus or the other user of the other game apparatus, in an initialization period, when the initial information is stored in the second memory area in the initialization period, progressing the game, in a first period after the initialization period, based on: the first input operation information stored in the first memory area, and any one of the one or more pieces of initial information stored in the second memory area, and progressing the game, in a second period after the first period, based on: the first input operation information stored in the first memory area, and the second input operation information stored in the second memory area, when the one or more pieces of initial information are stored in the first memory area in the initialization period, progressing the game, in the first period, based on: any one of the one or more pieces of initial information stored in the first memory area, and the second input operation information stored in the second memory area, and progressing the game, in the second period, based on: the first input operation information stored in the first memory area, and the second input operation information stored in the second memory area.

This aspect provides the same effect as Appendix 5.

Appendix 14

A game system according to an aspect of the present invention is a game system including: a first game apparatus; and a second game apparatus, in which: the first game apparatus and the second apparatus are communicable with each other cooperatively execute a game, the first game apparatus includes: at least one first memory configured to store first instructions, and that includes a first memory area and a second memory area; and at least one first processor configured to implement the first instructions to: acquire first input operation information representative of content of an input operation made by a first user of the first game apparatus; receive second input operation information representative of content of an input operation made by a second user of the second game apparatus; store the acquired first input operation information in the first memory area; store the received second input operation information in the second memory area; progress the game, based on information stored in the first memory area and information stored in the second memory area; execute a first initialization process for storing, in the second memory area, one or more pieces of initial information independent from an input operation of either the first user of the first game apparatus or the second user of the second game apparatus, in a first initialization period; progress the game, in a first period after the first initialization period, based on: the first input operation information stored in the first memory area, and any one of the one or more pieces of initial information stored in the second memory area; and progress the game, in a second period after the first period, based on: the first input operation information stored in the first memory area, and the second input operation information stored in the second memory area, the second game apparatus includes: at least one second memory configured to store second instructions, and that includes a third memory area and a fourth memory area; and at least one second processor configured to implement the second instructions to: acquire the second input operation information representative of content of the input operation made by the second user of the second game apparatus; receive the first input operation information representative of content of the input operation made by the first user of the first game apparatus; store the acquired second input operation information in the third memory area; store the received first input operation information in the fourth memory area; progress the game, based on information stored in the third memory area and information stored in the fourth memory area; execute a second initialization process for storing, in the third memory area, one or more pieces of initial information independent from an input operation of either the first user of the first game apparatus or the second user of the second game apparatus, in a second initialization period; progress the game, in a third period after the second initialization period, based on: any one of the one or more pieces of initial information stored in the third memory area, and the first input operation information stored in the fourth memory area; and progress the game, in a fourth period after the third period, based on: the second input operation information stored in the third memory area, and the first input operation information stored in the fourth memory area, and a number of pieces of initial information stored in the third memory area is identical to that stored in the second memory area.

This aspect provides the same effect as Appendix 5.

In this aspect, the "first initialization period" may be a period before the game progress is started by the at least one processor, based on the information stored in the first memory area and the information stored in the second memory area.

In this aspect, the "second initialization period" may be a period before the game progress is started by the at least one processor, based on the information stored in the third memory area and the information stored in the fourth memory area.

Appendix 15

A game apparatus according to another aspect of the present invention is a game apparatus for executing a game, including: at least one memory configured to store instructions, and that includes a buffer area; and at least one processor configured to implement the instructions to: acquire first input operation information representative of content of an input operation made by a user of the game apparatus; receive second input operation information representative of content of an input operation made by another user of another game apparatus for executing the game;

initialize a state of the buffer area, and store the first input operation information and the second input operation information in the buffer area; progress the game α times (the α is a natural number that is one or more), based on either the first input operation information or the second input operation information, after the state of the buffer area is initialized; and progress the game, based on the first input operation information and the second input operation information, after the game is progressed only the α times.

This aspect provides the same effect as Appendix 5.

Appendix 16

A game control method according to an aspect of the present invention is a game control method, implemented by a processor included in a game apparatus for executing a game, including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the second memory area, one or more pieces of initial information independent from an input operation of either the user of the game apparatus or the other user of the other game apparatus, in an initialization period; progressing the game, in a first period after the initialization period, based on: the first input operation information stored in the first memory area, and any one of the one or more pieces of initial information stored in the second memory area; and progressing the game, in a second period after the first period, based on: the first input operation information stored in the first memory area, and the second input operation information stored in the second memory area.

This aspect provides the same effect as Appendix 1.

Appendix 17

A game control method according to another aspect of the present invention is a game control method, implemented by a processor included in a game apparatus for executing a game, including: acquiring first input operation information representative of content of an input operation made by a user of the game apparatus; receiving second input operation information representative of content of an input operation made by another user of another game apparatus for executing the game; storing the acquired first input operation information in a first memory area; storing the received second input operation information in a second memory area; progressing the game, based on information stored in the first memory area and information stored in the second memory area; executing an initialization process for storing, in the first memory area, one or more pieces of initial information independent from an input operation of either the user of the game apparatus or the other user of the other game apparatus, in an initialization period; progressing the game, in a first period after the initialization period, based on: any one of the one or more pieces of initial information stored in the first memory area, and the second input operation information stored in the second memory area; and progressing the game, in a second period after the first period, based on: the first input operation information stored in the first memory area, and the second input operation information stored in the second memory area.

This aspect provides the same effect as Appendix 3.

DESCRIPTION OF REFERENCE SIGNS 1, 1A . . . game system; 10, 10A . . . game apparatus; 11 . . . processor; 13 . . . memory; 15 . . . communication apparatus; 17 . . . input operation apparatus; 19 . . . disk apparatus; 30 . . . display apparatus; 31 . . . display section; 110, 110A . . . game controller; 111 . . . acquirer; 112, 112A . . . communication controller; 113 . . . storage controller; 114, 114A . . . progress controller; 130 . . . storage unit; 132 . . . buffer area; 150 . . . communicator; 170 . . . input operation controller; 190 . . . information reader; 1121, 1121A . . . information receiver; 1122, 1122A . . . information transmitter; 1141 . . . pre-process section; 1142 . . . post-process section; 1321, 1322 . . . memory area.

What is claimed is:

1. A game apparatus for executing a game in which the game apparatus is connected to another game apparatus via a network, the game apparatus comprising:
   at least one memory configured to store instructions, and that includes a first memory area and a second memory area; and
   at least one processor configured to access the at least one memory and execute the instructions to at least:
   execute, in an initialization period, an initialization process for storing, in the second memory area, one or more pieces of initial information independent from an input operation of either a user of the game apparatus or another user of the another game apparatus for executing the game;
   acquire first input operation information representative of content of an input operation made by the user of the game apparatus;
   store the acquired first input operation information in the first memory area;
   receive, via the network, second input operation information representative of content of an input operation made by the another user of the another game apparatus for executing the game; and
   store the received second input operation information in the second memory area,
   wherein the at least one processor—progresses the game, in a first period after the initialization period and before the second input operation is received, based on:
   the first input operation information stored in the first memory area, and any one of the one or more pieces of initial information stored in the second memory area; and
   the at least one processor progresses the game, in a second period after the first period and after the second input operation is received, based on:
   the first input operation information stored in the first memory area, and
   the second input operation information stored in the second memory area.

2. The game apparatus according to claim 1, wherein:
   the game is a baseball game in which a pitch is executed by a pitcher character, and a hit is executed by a batter character,
   the game apparatus is used for operating the pitcher character, and
   the another game apparatus is used for operating the batter character.

3. A game apparatus for executing a game in which the game apparatus is connected to another game apparatus via a network, the game apparatus comprising:
- at least one memory configured to store instructions, and that includes a first memory area and a second memory area; and
- at least one processor configured to access the at least one memory and execute the instructions to at least:
- execute, in an initialization period, an initialization process for storing, in the first memory area, one or more pieces of initial information independent from an input operation of either the user of the game apparatus or another user of the another game apparatus for executing the game;
- acquire first input operation information representative of content of an input operation made by the user of the game apparatus;
- receive, via the network, second input operation information representative of content of an input operation made by the another user of the another game apparatus for executing the game;
- store the acquired first input operation information in the first memory area; and
- store the received second input operation information in the second memory area;
- wherein the at least one processor:
- progresses the game, based on information stored in the first memory area and information stored in the second memory area;
- progresses the game, in a first period after the initialization period, based on:
  - any one of the one or more pieces of initial information stored in the first memory area, and
  - the second input operation information stored in the second memory area; and
- progresses the game, in a second period after the first period, based on:
  - the first input operation information stored in the first memory area, and
  - the second input operation information stored in the second memory area.

4. The game apparatus according to claim 3, wherein:
- the game is a baseball game in which a pitch is executed by a pitcher character, and a hit is executed by a batter character,
- the game apparatus is used for operating the pitcher character, and
- the another game apparatus is used for operating the batter character.

5. The game apparatus according to claim 1, wherein:
- the at least one processor executes the instructions to control a game progress by switching between:
- a first mode for progressing the game, based on the information stored in the first memory area and the information stored in the second memory area; and
- a second mode for progressing the game, based on the first input operation information representative of content of the input operation made by the user of the game apparatus, without use of the second input operation information representative of content of the input operation made by the another user of the another game apparatus.

6. A non-transitory recording medium for storing a program which, when executed by a processor which is included in a game apparatus for executing a game in which the game apparatus is connected to another game apparatus via a network, causes the processor to execute a method comprising:
- executing, in an initialization period, an initialization process for storing, in the second memory area, one or more pieces of initial information independent from an input operation of either the user of the game apparatus or another user of the another game apparatus, for executing the game;
- acquiring first input operation information representative of content of an input operation made by a user of the game apparatus;
- receiving, via the network, second input operation information representative of content of an input operation made by the another user of the another game apparatus for executing the game;
- storing the acquired first input operation information in a first memory area;
- storing the received second input operation information in a second memory area;
- progressing the game, based on information stored in the first memory area and information stored in the second memory area;
- progressing the game, in a first period after the initialization period, based on:
  - the first input operation information stored in the first memory area, and
  - any one of the one or more pieces of initial information stored in the second memory area; and
- progressing the game, in a second period after the first period, based on:
  - the first input operation information stored in the first memory area, and
  - the second input operation information stored in the second memory area.

7. A non-transitory recording medium for storing a program which, when executed by a processor, which is included in a game apparatus for executing a game in which the game apparatus is connected to another game apparatus via a network, causes the processor to execute a method comprising:
- executing, in an initialization period, an initialization process for storing, in the first memory area, one or more pieces of initial information independent from an input operation of either the user of the game apparatus or another user of the another game apparatus, for executing the game;
- acquiring first input operation information representative of content of an input operation made by a user of the game apparatus;
- receiving, via the network, second input operation information representative of content of an input operation made by the another user of the another game apparatus for executing the game;
- storing the acquired first input operation information in a first memory area;
- storing the received second input operation information in a second memory area;
- progressing the game, based on information stored in the first memory area and information stored in the second memory area;
- progressing the game, in a first period after the initialization period, based on:
  - any one of the one or more pieces of initial information stored in the first memory area, and
  - the second input operation information stored in the second memory area; and progressing the game, in a second period after the first period, based on:
the first input operation information stored in the first memory area, and
the second input operation information stored in the second memory area.

8. A game system comprising:
a first game apparatus; and
a second game apparatus connected to the first game apparatus via a network,
wherein:
the first game apparatus and the second apparatus are communicable with each other via the network to cooperatively execute a game,
wherein the first game apparatus includes:
at least one first memory configured to store first instructions, and that includes a first memory area and a second memory area; and
at least one first processor configured to access the at least one first memory and execute the first instructions to at least:
execute, in a first initialization period, a first initialization process for storing, in the second memory area, one or more pieces of initial information independent from an input operation of either a first user of the first game apparatus or a second user of the second game apparatus, for executing the game;
acquire first input operation information representative of content of an input operation made by a first user of the first game apparatus;
receive, via the network, second input operation information representative of content of an input operation made by the second user of the second game apparatus;
store the acquired first input operation information in the first memory area;
store the received second input operation information in the second memory area;
progress the game, based on information stored in the first memory area and information stored in the second memory area;
progress the game, in a first period after the first initialization period, based on:
the first input operation information stored in the first memory area, and
any one of the one or more pieces of initial information stored in the second memory area; and
progress the game, in a second period after the first period, based on:
the first input operation information stored in the first memory area, and
the second input operation information stored in the second memory area, and
wherein the second game apparatus includes:
at least one second memory configured to store second instructions, and that includes a third memory area and a fourth memory area; and
at least one second processor configured to access the at least one second memory and execute the second instructions to at least:
execute, in a second initialization period, a second initialization process for storing, in the third memory area, one or more pieces of initial information independent from an input operation of either the first user of the first game apparatus or the second user of the second game apparatus, for executing the game;

acquire the second input operation information representative of content of the input operation made by the second user of the second game apparatus;
receive, via the network, the first input operation information representative of content of the input operation made by the first user of the first game apparatus;
store the acquired second input operation information in the third memory area;
store the received first input operation information in the fourth memory area;
progress the game, based on information stored in the third memory area and information stored in the fourth memory area;
progress the game, in a third period after the second initialization period, based on:
any one of the one or more pieces of initial information stored in the third memory area, and
the first input operation information stored in the fourth memory area; and
progress the game, in a fourth period after the third period, based on:
the second input operation information stored in the third memory area, and
the first input operation information stored in the fourth memory area, and
wherein a number of the one or more pieces of initial information stored in the third memory area is identical to a number of the one or more pieces of initial information stored in the second memory area.

9. A game apparatus for executing a game in which the game apparatus is connected to another game apparatus via a network, the game apparatus comprising:
at least one memory configured to store instructions, and that includes a buffer area; and
at least one processor configured to access the at least one memory and execute the instructions to at least:
acquire first input operation information representative of content of an input operation made by a user of the game apparatus;
receive, via the network, second input operation information representative of content of an input operation made by another user of the another game apparatus for executing the game;
initialize a state of the buffer area, and store the first input operation information and the second input operation information in the buffer area;
after the state of the buffer is initialized, progress the game $\alpha$ times (the $\alpha$ is a natural number that is one or more), based on either the first input operation information or the second input operation information; and
after the game is progressed only the $\alpha$ times, progress the game, based on both the first input operation information and the second input operation information.

10. A game control method, implemented by a processor included in a game apparatus for executing a game in which the game apparatus is connected to another game apparatus via a network, the game control method comprising:
executing, in an initialization period, an initialization process for storing, in the second memory area, one or more pieces of initial information independent from an input operation of either the user of the game apparatus or another user of the another game apparatus, for executing the game;
acquiring first input operation information representative of content of an input operation made by a user of the game apparatus;

receiving, via the network, second input operation information representative of content of an input operation made by another user of the another game apparatus for executing the game;

storing the acquired first input operation information in a first memory area;

storing the received second input operation information in a second memory area;

progressing the game, based on information stored in the first memory area and information stored in the second memory area;

progressing the game, in a first period after the initialization period, based on:
  the first input operation information stored in the first memory area, and
  any one of the one or more pieces of initial information stored in the second memory area; and progressing the game, in a second period after the first period, based on:
  the first input operation information stored in the first memory area, and
  the second input operation information stored in the second memory area.

11. A game control method, implemented by a processor included in a game apparatus for executing a game in which the game apparatus is connected to another game apparatus via a network, the game control method comprising:

executing, in an initialization period, an initialization process for storing, in the first memory area, one or more pieces of initial information independent from an input operation of either the user of the game apparatus or another user of the another game apparatus, for executing the game;

acquiring first input operation information representative of content of an input operation made by a user of the game apparatus;

receiving, via the network, second input operation information representative of content of an input operation made by the another user of the another game apparatus for executing the game;

storing the acquired first input operation information in a first memory area;

storing the received second input operation information in a second memory area;

progressing the game, based on information stored in the first memory area and information stored in the second memory area;

progressing the game, in a first period after the initialization period, based on:
  any one of the one or more pieces of initial information stored in the first memory area, and
  the second input operation information stored in the second memory area; and progressing the game, in a second period after the first period, based on:
  the first input operation information stored in the first memory area, and
  the second input operation information stored in the second memory area.

12. The game apparatus according to claim 3, wherein:
the at least one processor executes the instructions to control a game progress by switching between:
a first mode for progressing the game, based on the information stored in the first memory area and the information stored in the second memory area; and
a second mode for progressing the game, based on the first input operation information representative of content of the input operation made by the user of the game apparatus, without use of the second input operation information representative of content of the input operation made by the another user of the another game apparatus.

* * * * *

UNITED STATES PATENT AND TRADEMARK OFFICE
CERTIFICATE OF CORRECTION

PATENT NO. : 12,097,426 B2  
APPLICATION NO. : 17/471910  
DATED : September 24, 2024  
INVENTOR(S) : Junichi Fujita Page 1 of 1

It is certified that error appears in the above-identified patent and that said Letters Patent is hereby corrected as shown below:

In the Claims

Claim 1, on Column 60, Line 46, delete "--"

Signed and Sealed this  
Twenty-ninth Day of April, 2025

Coke Morgan Stewart  
*Acting Director of the United States Patent and Trademark Office*